United States Patent
Baino et al.

(10) Patent No.: US 8,348,806 B2
(45) Date of Patent: Jan. 8, 2013

(54) CONSTRUCTION MACHINE AND CONTROL METHOD THEREOF

(75) Inventors: Makoto Baino, Kobe (JP); Masaaki Higashi, Kobe (JP); Kenji Yoshimura, Kobe (JP); Makoto Azuma, Kakogawa (JP); Koji Nishiumi, Kakogawa (JP); Susumu Harada, Kobe (JP); Yunosuke Kobayashi, Kakogawa (JP); Nobuo Hamada, Kobe (JP); Hidekazu Matsuba, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 563 days.

(21) Appl. No.: 12/580,161

(22) Filed: Oct. 15, 2009

(65) Prior Publication Data
US 2011/0092334 A1 Apr. 21, 2011

(51) Int. Cl.
*H02P 17/00* (2006.01)
*F16H 3/72* (2006.01)
*F16H 37/06* (2006.01)
*B60K 1/00* (2006.01)
*B60K 6/445* (2007.10)
*B60W 10/06* (2006.01)
*B60W 20/00* (2006.01)

(52) U.S. Cl. ...... 477/15; 477/20; 180/65.1; 180/65.235; 180/65.28; 180/65.31; 475/4; 475/5

(58) Field of Classification Search .................. 477/5, 6, 477/8, 12, 14, 15, 20; 180/65.1–65.235, 180/65.275–65.31; 701/22; 475/4, 5
See application file for complete search history.

(56) References Cited

U.S. PATENT DOCUMENTS

| 6,359,404 | B1* | 3/2002 | Sugiyama et al. | 318/432 |
| 2002/0035006 | A1* | 3/2002 | Suzuki et al. | 477/3 |
| 2007/0275823 | A1* | 11/2007 | Motosugi et al. | 477/176 |
| 2011/0231048 | A1* | 9/2011 | Matsubara et al. | 701/22 |

FOREIGN PATENT DOCUMENTS

| JP | 8135762 A | 5/1996 |
| JP | 9014385 A | 1/1997 |

* cited by examiner

*Primary Examiner* — Tisha Lewis
(74) *Attorney, Agent, or Firm* — Alleman Hall McCoy Russell & Tuttle LLP

(57) ABSTRACT

A construction machine comprises an electric motor/generator coupled to an electricity accumulator, an engine, a transmission coupled to drive wheels, an epicyclic gearing for coupling an output shaft of the electric motor/generator, an output shaft of the engine, and an input shaft of the transmission, the engine torque and/or the generator torque being transmitted to drive wheels, a clutch for directly coupling two among the output shaft of the electric motor/generator, the output shaft of the engine, and the input shaft of the transmission, and a controller configured to, under a condition in which the clutch is in an off-state, control engine speed based on the degree to which the accelerator is open and on the amount of electricity in the electricity accumulator, to control shifting of the transmission gear position based on the accelerator opening degree, operational state of the generator, and the electricity amount.

10 Claims, 44 Drawing Sheets

CONSTRUCTION MACHINE AND CONTROL METHOD THEREOF

TECHNICAL FIELD

The present invention generally relates to a construction machine including an engine and an electric motor/generator. More particularly, the present invention relates to wheel loaders and similar construction machines that repeatedly accelerate and decelerate, and relates to methods of controlling such construction machines.

BACKGROUND ART

A construction machine such as a wheel loader does not frequently drive continuously at a constant speed. Therefore, the construction machine requires driving capability different from that of general vehicles such as automobiles.

FIGS. 50A to 50F are plan views showing a V-patterned operation which occupies a large part of the operation of the wheel loader. As shown in FIG. 50A, a wheel loader 100 is driving forward toward dirt (earth) 102 to shovel the dirt 102. Then, as shown in FIG. 50B, the wheel loader 100 is shoveling the dirt 102. In this case, the wheel loader needs a great traction force in a range from zero speed to a very low speed (stall mode).

After completing shoveling the dirt 102, the wheel loader 100 is driving backward and then forward toward a truck 101 as shown in FIG. 50C (switch back). Then, as shown in FIG. 50D, the wheel loader 100 is driving forward toward the truck 101. Then, as shown in FIG. 50E, the wheel loader 100 is loading the dirt 102 into the truck 101.

After completing loading the dirt 102 into the truck 101, the wheel loader 100 is driving backward and then forward toward the dirt 102 again (switch back) as shown in FIG. 50F.

In the above mentioned V-patterned operation, a great traction force is needed in a very low-speed range, or acceleration and deceleration must be repeated and the switch back must be repeated in a low-speed range. Such a need is unique to the construction machine.

In recent years, attention has been focused on hybrid vehicles, which include a combination of an engine and an electric motor/generator, and a variety of associated devices have been developed. By way of example, Japanese Patent No. 3344848 discloses a starting device for hybrid vehicles (hereinafter referred to as Prior Art Example 1) and Japanese Laid-Open Patent Application Publication No. Hei. 9-14385 discloses a driving device for hybrid vehicles (hereinafter referred to as Prior Art Example 2).

In the Prior Art Example 1, a target rotational speed of gears coupled to an output shaft of an engine is determined based on the extent to which the accelerator is actuated, and an electric rotation device is driven to generate a braking torque, thereby controlling the electric motor/generator so that the rotational speed of the gears becomes the set target rotational speed. With such a configuration, the vehicle can be started efficiently.

In the Prior Art Example 2, ring gears of an epicyclic gearing are coupled to an electric motor/generator, a sun gear of the epicyclic gearing is coupled to the engine, and drive power is output from a carrier of the epicyclic gearing to drive wheels, while two of the ring gears, the carrier, and the sun gear are integrally coupled at the point in time when their coupling rotational speeds become equal, and are integrally rotated at the coupling rotational speed or higher. With such a configuration, the vehicle is able to start smoothly.

To obtain the above mentioned driving capability which is unique to the construction machine, wheel loaders of medium and larger sizes are typically equipped with torque converters. FIG. 51 is a graph showing the relationship between torque ratio and efficiency, and torque ratio and absorption torque coefficient, with respect to speed ratio of the torque converter. FIG. 52 is a graph showing the relationship between input torque of the torque converter and engine speed.

Turning to FIG. 51, it is confirmed that the torque converter has a low efficiency as a whole and a very low efficiency particularly in a low-speed ratio (see R1 region). As described above, the wheel loader requires driving capability in the low-speed range, such as acceleration, deceleration, stall, or switch back, and drives more frequently in the low efficiency region of the torque converter. Therefore, efficiency of the torque converter in the low-speed range must be improved.

Turning to FIG. 52, a transmitted torque depends on the rotational speed of the input shaft (output shaft of the engine). Therefore, it is confirmed that the transmitted torque is smaller when the engine speed is lower (see R2 region). For this reason, during the acceleration, a sufficient torque cannot be transmitted before the engine speed rises. This is disadvantageous to the construction machine which repeats acceleration and deceleration within a short distance.

In the construction machine such as the wheel loader which is configured as a hybrid vehicle, to obtain driving capability which is equal to or higher than that obtained using the torque converter, an engine torque, a motor/generator torque, and upshifting or downshifting of a gear position must be controlled mainly in a state where a direct-coupling clutch is in an off-state in a low-speed range.

Whereas in the Prior Art Example 1 and the Prior Art Example 2, control is executed during a period from when the vehicle is in a stopped state until the direct-coupling clutch is turned on or brought into engagement, the control for the engine torque, the motor/generator torque, and the upshifting or downshifting of the gear position is not executed in a state where the direct-coupling clutch is not turned on or in a disengagement state. For this reason, it is difficult to attain a hybrid construction machine using the Prior Art Examples 1 and 2.

SUMMARY OF THE INVENTION

The present invention addresses the above described conditions, and an object of the present invention is to provide a construction machine and a control method thereof, which is capable of attaining good driving capability in a low-speed range in a state where a direct-coupling clutch is not turned on, i.e., the clutch is in a disengagement state.

The inventors intensively studied how to configure the construction machine such as the wheel loader to the hybrid vehicle.

It is generally known that hybrid systems for trucks or railways are classified into a series system, a parallel system, and a series/parallel (split) system.

In the parallel system, the torque converter is needed. However, the torque converter has very low efficiency in the low-speed range. Therefore, the parallel system is not compatible with the construction machine. In addition, in the parallel system, electric power is generated while the engine output need not be great—in cases other than regenerative electric-power generation during deceleration, such as during gradual acceleration or constant-speed driving. However, in most cases, the wheel loader requires a great output. In addition, the electric power which is obtained by deceleration regeneration is small in amount. If the parallel system is applied to the wheel loader, the electric power becomes small in amount.

On the other hand, in the case of an automobile using the series system or the series/parallel system, the torque for accelerating the automobile is sufficient for the torque at the time of starting. For this reason, in an automobile equipped with the electric motor/generator for generating a great torque at zero speed, the transmission may be omitted in many cases.

The wheel loader which requires a great traction force in the low-speed range as described above must be equipped with the transmission as an essential component, if it is going to use the electric motor/generator in actual applications. FIGS. 53 to 55 are driving characteristic views showing the relationship between a vehicle speed and a traction force in the case where the wheel loader is driven by the electric motor/generator. To gain a maximum traction force in the case where the transmission is in a first gear position, a gear reduction ratio is set higher and a desired driving force is gained with a maximum torque of the electric motor/generator. On the other hand, a maximum vehicle speed is restricted because of a restriction of a maximum rotational speed of the electric motor/generator (in the example shown in FIG. 53, the maximum vehicle speed in the first gear position is approximately 7 km/h). FIGS. 54 and 55 show the case where the transmission is in a second gear position and the case where the transmission is in a third gear position, respectively.

As should be understood from the above, the maximum torque and maximum rotational speed of the electric motor/generator have a trade-off relationship. Therefore, it is difficult to attain an electric motor/generator which is capable of generating a high torque with a low rotational speed and which has a high maximum rotational speed. Therefore, the transmission is an essential component for the wheel loader.

Since the wheel loader must be equipped with the transmission as described above, it cannot achieve an advantage that the transmission may be omitted even if using the series system or the series-parallel system. In the series system and the series-parallel system, two sets of electric motor/generators and inverters are needed, increasing costs.

According to an aspect of the present invention, a construction machine comprises an electric motor/generator coupled to an electricity accumulator and is configured to generate a torque; an engine configured to generate a torque; a transmission coupled to drive wheels and configured to shift between plural gear positions; an epicyclic gearing configured to couple an output shaft of the electric motor/generator, an output shaft of the engine, and an input shaft of the transmission, the torque generated by the electric motor/generator and/or the engine being transmitted to the drive wheels to enable the construction machine to drive; a clutch configured to directly couple two among the output shaft of the electric motor/generator, the output shaft of the engine, and the input shaft of the transmission; and a controller configured: to, under a condition in which the clutch is in an off-state, control engine speed of the engine based on the degree to which the accelerator is open and on the amount of electricity in the electricity accumulator, to control shifting of the transmission gear position based on the accelerator opening degree, operational state (power running or regenerative braking) of the electric motor/generator, and the amount of electricity in the electricity accumulator, and to determine the torque generated in the engine and the torque generated in the electric motor/generator, based on the accelerator opening degree, vehicle speed of the construction machine, and the transmission gear position.

In such a configuration, the construction machine is able to drive while repeating electric charging and electric discharging within a limited electric capacitance of the electricity accumulator while maintaining the engine torque and the motor/generator torque in a well-balanced manner.

The controller may be configured to increase the engine speed of the engine when the electricity amount in the electricity accumulator is small and the accelerator has been pressed down by a machine operator. The controller may be configured to decrease the engine speed of the engine when the electricity amount in the electricity accumulator is large and the accelerator has been pressed down by the machine operator.

The controller may be configured to upshift the transmission gear position when the accelerator has been pressed down by the machine operator, the electric motor/generator is in a power running mode, and the electricity amount in the electricity accumulator is small. The controller may be configured to downshift the transmission gear position when the accelerator has been pressed down by the machine operator, the electric motor/generator is in a regenerative braking mode, and the electricity amount in the electricity accumulator is large.

The construction machine may further comprise a reverse rotation inhibiting unit configured to inhibit reverse rotation of the engine. The controller may be configured to stop the engine when it is determined that the electric motor/generator is in a regenerative braking mode and the electricity amount in the electricity accumulator is excessive.

The construction machine may further comprise a hydraulic pump which is directly coupled to the engine and is configured to drive a loading device. The controller may be configured to determine the torque generated in the engine and the torque generated in the electric motor/generator, based on the accelerator opening degree, the vehicle speed of the construction machine, the transmission gear position, and torque required for operation of the hydraulic pump.

The construction machine may further comprise a hydraulic pump which is directly coupled to the engine. The controller may be configured to control an output amount and a relief pressure of the hydraulic pump to cause the engine to generate a negative torque when the construction machine is decelerated.

According to another aspect of the present invention, a method of controlling a construction machine that includes an electric motor/generator coupled to an electricity accumulator and configured to generate a torque, an engine configured to generate a torque, a transmission coupled to drive wheels and configured to shift between plural gear positions, an epicyclic gearing configured to couple an output shaft of the electric motor/generator, an output shaft of the engine, and an input shaft of the transmission, with the torque generated by the electric motor/generator and/or the engine being transmitted to the drive wheels to enable the construction machine to drive, and a clutch configured to directly couple two among the output shaft of the electric motor/generator, the output shaft of the engine, and the input shaft of the transmission comprises: controlling engine speed of the engine based on the degree to which the accelerator is open and on the amount of electricity in the electricity accumulator, under a condition in which the clutch is in an off-state; controlling shifting of the transmission gear position based on the accelerator opening degree, operational state of the electric motor/generator, and the amount of electricity in the electricity accumulator; and determining the torque generated in the engine and the torque generated in the electric motor/generator, based on the accelerator opening degree, vehicle speed of the construction machine, and the transmission gear position.

The step of controlling the engine speed of the engine may include increasing the engine speed when the electricity amount in the electricity accumulator is small and the accelerator has been pressed down by a machine operator. The step of controlling the engine speed of the engine may include decreasing the engine speed when the electricity amount in the electricity accumulator is large and the accelerator has been pressed down by the machine operator.

The step of controlling shifting of the transmission gear position may include upshifting of the gear position when the accelerator has been pressed down by the machine operator, the electric motor/generator is in a power running mode, and the electricity amount in the electricity accumulator is small. The step of controlling shifting of the transmission gear position may include downshifting of the gear position when the accelerator has been pressed down by the machine operator, the electric motor/generator is in a regenerative braking mode, and the electricity amount in the electricity accumulator is large.

The construction machine may further comprise a hydraulic pump which is directly coupled to the engine and is configured to drive a loading device. The step of determining the torque includes determining the torque generated in the engine and the torque generated in the electric motor/generator, based on the accelerator opening degree, the vehicle speed of the construction machine, the gear position of the transmission and a torque required for operation of the hydraulic pump.

The above and further objects and features of the invention will more fully be apparent from the following detailed description with accompanying drawings.

BRIEF DESCRIPTION OF THE DRAWINGS

FIGS. 50A to 50F are plan views showing a V-patterned operation of a construction machine such as a wheel loader.

DETAILED DESCRIPTION OF THE PREFERRED EMBODIMENTS

Hereinafter, preferred embodiments of the present invention will be described with reference to the drawings.

Embodiment 1

Figure 1:
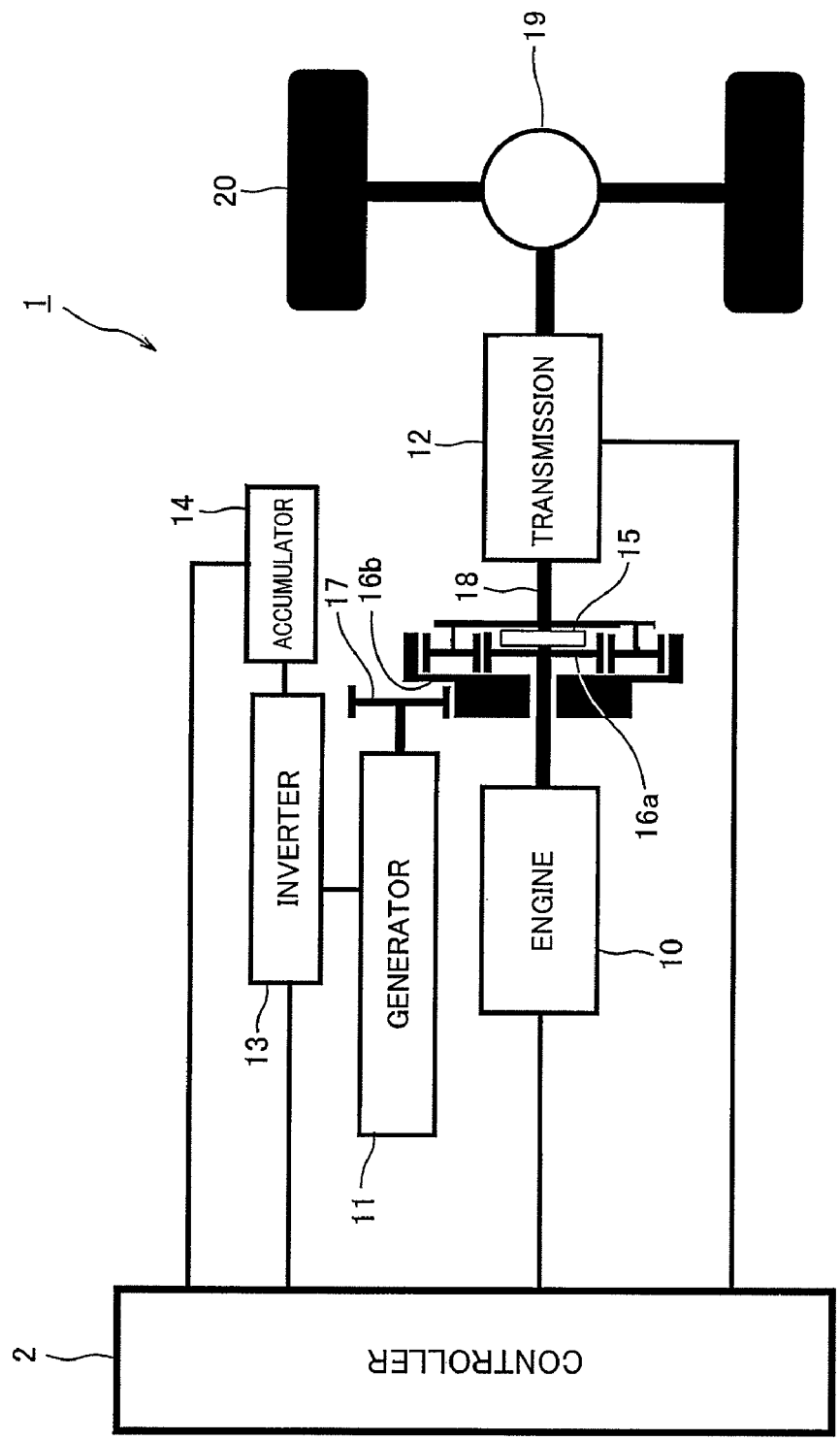
FIG. 1 is a block diagram showing a configuration of main components of a construction machine according to Embodiment 1 of the present invention.

FIG. 1 is a block diagram showing a configuration of main components of a construction machine according to Embodiment 1 of the present invention. Turning to FIG. 1, a construction machine 1 according to this embodiment comprises an engine 10 and an electric motor/generator 11 (hereinafter referred to as "generator 11"). The output shaft of the engine 10 is coupled to a sun gear 16a of an epicyclic gearing, while the output shaft of the generator 11 is coupled to a gear 17 coupled to a ring gear 16b of the epicyclic gearing. A carrier shaft 18 of the epicyclic gearing is coupled to an input shaft of a transmission 12 which is electronically controlled so that the transmission 12 is capable of automatically shifting between plural gear positions. The epicyclic gearing is provided with a direct-coupling clutch 15 (hereinafter referred to as "clutch 15") for directly coupling two among the sun gear 16a, the ring gear 16b, and the carrier shaft 18. In the configuration shown in FIG. 1, the clutch 15 directly couples the sun gear 16b to the carrier shaft 18. As used herein, the term "direct-coupling clutch" refers to a clutch for mechanically coupling an input shaft to an output shaft without using a fluid.

The transmission 12 is coupled to drive wheels 20 via a differential gear 19. Alternatively, the transmission 12 may be directly coupled to the drive wheels 20 without the differential gear 19. The transmission 12 is coupled to the engine 10 via the clutch 15.

The generator 11 is coupled to an electricity accumulator 14 via an inverter 13. The generator 11 serves as a regenerative braking unit or an electric-power based operation driving power source.

Although not shown in FIG. 1, the construction machine 1 includes a brake circuit configured to electronically control a mechanical brake as described later.

The construction machine 1 further comprises a controller 2 configured to control the operation of the engine 10, the operation of the generator 11 and the operation of the transmission 12. The detail of the controller 2 will be described below.

Figure 2:
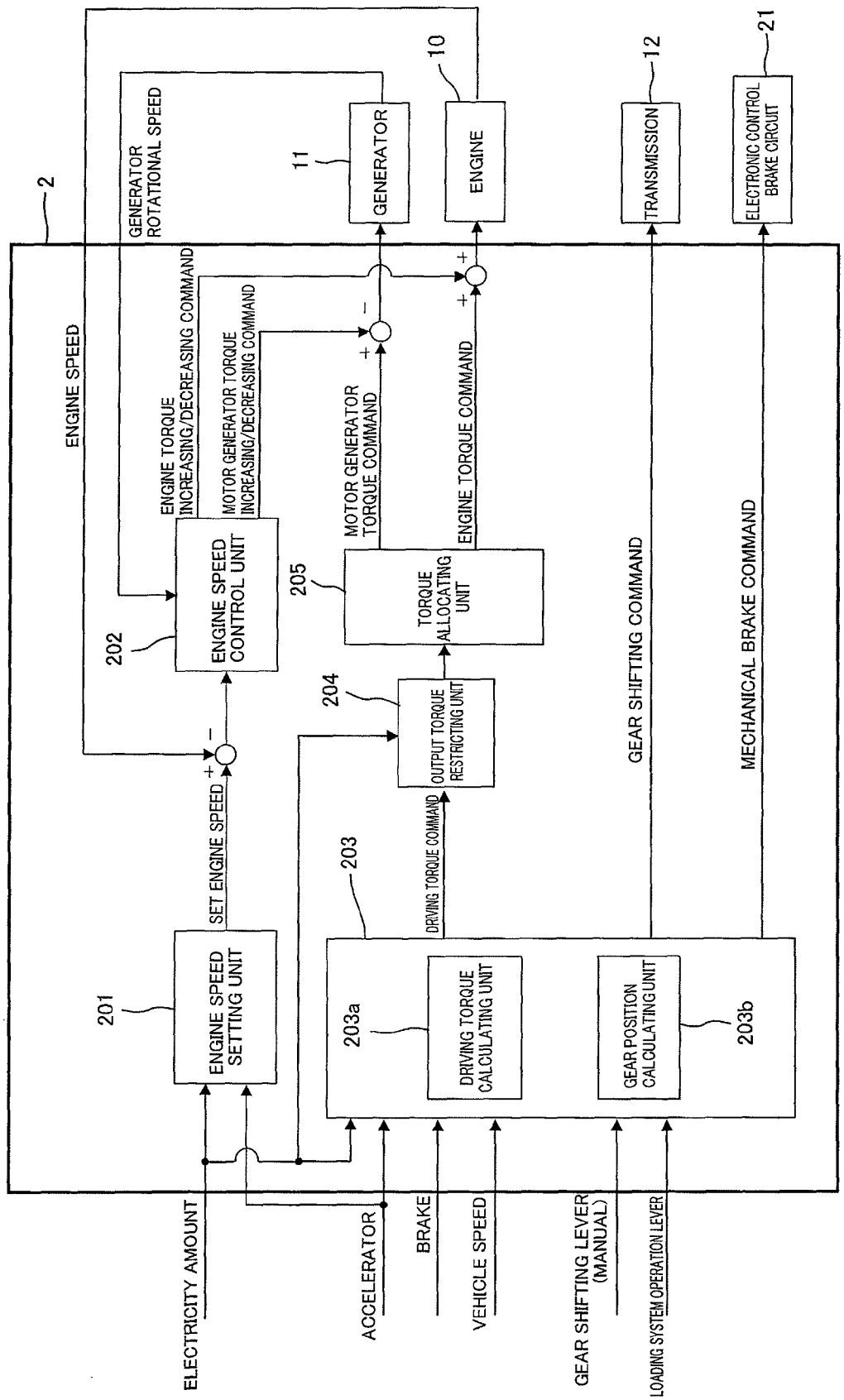
FIG. 2 is a functional block diagram showing a configuration of a controller included in the construction machine according to Embodiment 1.

FIG. 2 is a functional block diagram showing a configuration of the controller 2 included in the construction machine 1 according to Embodiment 1.

Turning to FIG. 2, the controller 2 receives, as inputs, the electricity amount in an electricity accumulator 14, the operation amount of an accelerator, the operation amount of the mechanical brake, a vehicle speed of the construction machine 1, the rotational speed and torque (corresponding to the charge amount and discharge amount of the electricity accumulator 14) of the generator 11, the engine speed of the engine 10, and the lever position of a forward/backward driving lever. An engine speed setting unit 201 is configured to set the engine speed based on the electricity amount in the electricity accumulator 14 and the operation amount of the accelerator. An engine speed control unit 202 is configured to receive as inputs, the set engine speed which is set by the engine speed setting unit 201, an actual engine speed of the engine 10, and an actual rotational speed of the generator 11, to calculate a torque required for the engine 10 and the generator 11 based on these inputs, and to output the calculated values indicating an engine torque increasing/decreasing command and a motor/generator torque increasing/decreasing command.

A driving torque calculating unit 203a included in the calculating unit 203 is configured to calculate a driving torque required for driving based on the operation amount of the accelerator, the operation amount of the brake, etc, and to output the calculated value indicating a driving torque command. An output torque restricting unit 204 is configured to receive the driving torque command from the driving torque calculating unit 203a and to output the restricted torque to the torque allocating unit 205, to restrict the output of the generator 11 in the case where the electricity amount in the electricity accumulator 14 is deficient or excessive with respect to the driving torque command. Alternatively, the output torque restricting unit 204 may be omitted, and the driving torque calculating unit 203a may be configured to directly output the driving torque command to the torque allocating unit 205.

The driving torque calculating unit 203a is configured to calculate and output the driving torque required for the driving based on the operation amount of the accelerator, and the operation amount of the brake. Therefore, it is possible to avoid an event in which energy is wasted by applying driving power in the state in which the brake is actuated, or the brake is excessively burdened.

The torque allocating unit 205 calculates the torque of the generator 11 and the torque of the engine 10 based on the driving torque command as described later, and outputs a generator toque command and an engine torque command to the generator 11 and to the engine 10, respectively. A signal which is obtained by adding the motor/generator torque increasing/decreasing command output from the engine speed control unit 202 to the motor/generator torque command is input to the generator 11. On the other hand, a signal which is obtained by adding the engine torque increasing/decreasing command output from the engine speed control unit 202 to the engine torque command is input to the engine 10.

A gear position calculating unit 203b of the calculating unit 203 calculates the transmission 12 gear position, based on the operation amount of the accelerator, the amount of electricity in the electricity accumulator 14, and the operational state (regenerative braking mode or power running mode) of the generator 11 as described later and outputs to the transmission 12 a gear shifting command indicating whether or not upshifting or downshifting is necessary, based on the calculated value.

The calculating unit 203 outputs a mechanical brake command to an electronic control brake circuit 21 configured to control a mechanical brake, to avoid degradation of a machine operator's steering feeling which is caused by the fact that a clutch is turned off and deceleration is diminished (torque is free) when the gear position is shifted during the deceleration. This enables the auxiliary use of the mechanical brake. As a result, the machine operator's steering feeling can be kept good even when the torque-free state occurs during the deceleration when driving is switched between the forward driving and the backward driving (switch back).

The control of the present invention is basically executed such that the torque calculating unit 203a calculates a desired driving power from the accelerator operation amount and the vehicle speed, and the torque allocating unit 205 determines the torque allocated to the generator 11 and the torque allocated to the engine 10 (they are uniquely determined based on the gear ratio of the epicyclic gearing), and outputs them to the generator 11 and to the engine 10, respectively.

If the accelerator is released under the state where the construction machine 1 is in a stopped state, the engine speed usually becomes an idling engine speed. However, according to the present invention, the engine speed is basically independent of the accelerator operation amount, and is set primarily based on the electricity amount in the electricity accumulator 14. The reason is as follows. When the engine speed is low, an upper limit speed of the vehicle speed (to be precise, speed at the transition from the regenerative braking to the power running) is associated with the regenerative braking (electric power generation) of the generator 11 in the same gear position, while when the engine speed is high, the upper limit speed is correspondingly high. If the vehicle speed is above the upper limit speed associated with the regenerative braking (electric power generation state), the generator 11 moves to the power running mode. However, because of the limited electricity amount in the electricity accumulator 14, the power running mode cannot continue for a long time. Accordingly, by setting the engine speed based on the electricity amount as described later, the control is executed so that the electricity amount is optimal in the regenerative braking mode and the power running mode of the generator 11.

In the control of the engine speed, it is necessary to change only the engine speed without negatively affecting the machine operator's steering feeling. That is, it is necessary to change only the engine speed in the state where the driving power according to the accelerator operation amount is generated in the generator 11 and the engine 10. To this end, in the present invention, as described later, the engine speed is increased or decreased by changing the ratio between the torque of the generator 11 and the torque of the engine 10 while maintaining the torque of the carrier shaft, which is the output shaft of the epicyclic gearing, at a constant level.

The upper limit speed associated with the regenerative braking mode is varied according to the engine speed. If the acceleration is further performed, the gear position is upshifted, increasing the upper limit speed associated with the regenerative braking. In the case where the vehicle speed is increased by the acceleration in this manner, the engine speed and the gear position are controlled so that the electricity amount in the electricity accumulator 14 is optimized.

Subsequently, the process which is performed by the engine speed setting unit 201, the torque allocating unit 205, and the gear position calculating unit 203b will be specifically described with reference to the flow chart and others. It should be noted that the process occurs during driving in a low-speed range in which the clutch 15 is in an off-state, for example, during driving in the V-patterned operation in which acceleration and deceleration are repeated or switch back is repeated, for example.

Figure 3:
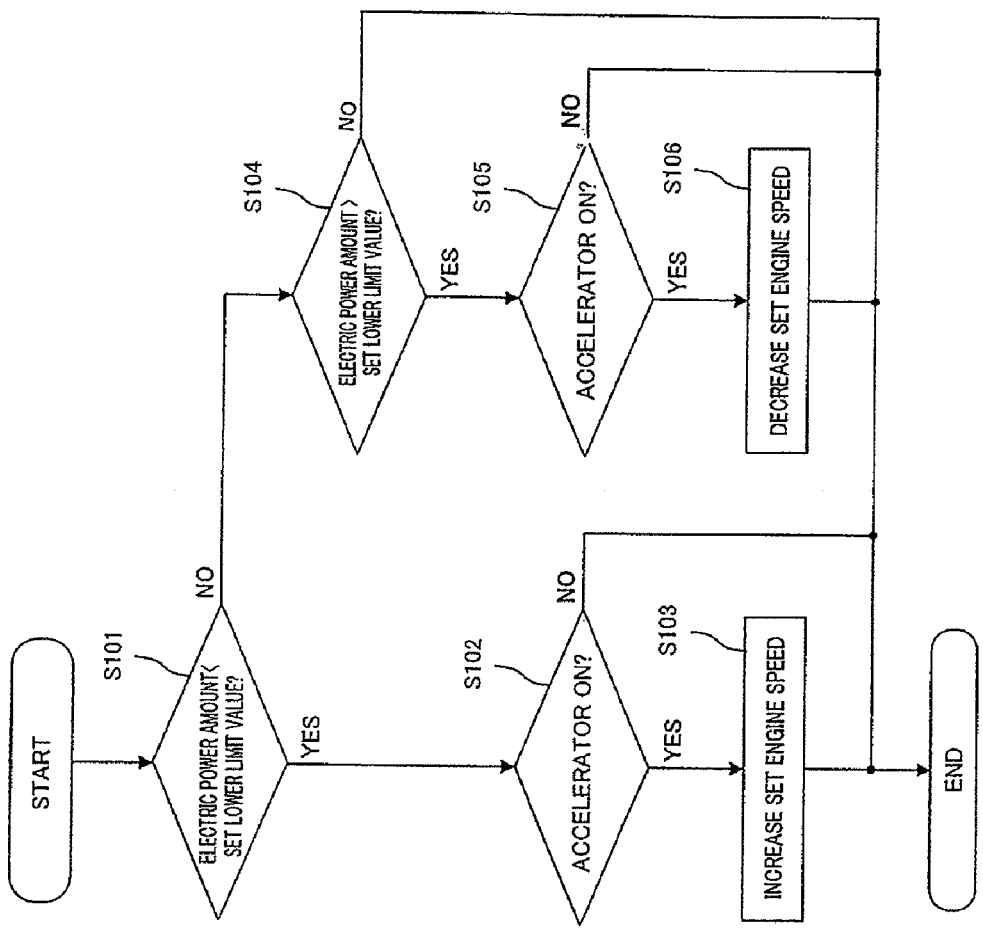
FIG. 3 is a flowchart showing a calculation process of a set engine speed which is executed by an engine speed setting unit.

FIG. 3 is a flowchart showing the calculation process of the set engine speed which is executed by the engine speed setting unit 201. Turning to FIG. 3, initially, the engine speed setting unit 201 determines whether or not the electricity amount in the electricity accumulator 14 is smaller than a preset lower limit value (set lower limit value) (S101). If it is determined that the electricity amount is smaller than the set lower limit value (YES in S101), i.e., the electricity amount is deficient, the engine speed setting unit 201 determines whether or not the accelerator has been pressed down by the machine operator (the accelerator is turned on) (S102). If it is determined that the accelerator has not been pressed down by the machine operator (NO in S102), the process terminates, whereas if it is determined that the accelerator has been pressed down by the machine operator (YES in S102), the set engine speed is increased (S103).

On the other hand, if it is determined that the electricity amount is not smaller than the set lower limit value in step S101 (NO in S101), i.e., the electricity amount is sufficient, the engine speed setting unit 201 determines whether or not the electricity amount in the electricity accumulator 14 is larger than a preset upper limit value (set upper limit value) of the electricity amount (S104). If it is determined that the electricity amount is not larger than the set upper limit value (NO in S104), i.e., the electricity amount is adequate, the process terminates. On the other hand, if it is determined that the electricity amount is larger than the set upper limit value (YES in S104), the engine speed setting unit 201 determines whether or not the accelerator has been pressed down by the operator (S105). If it is determined that the accelerator has not been pressed down by the machine operator (NO in S105), the process terminates, whereas if it is determined that the accelerator has been pressed down by the machine operator (YES in S105), the set engine speed is decreased (S106).

Through the above process, the engine speed according to the electricity amount can be set properly.

Figure 4:
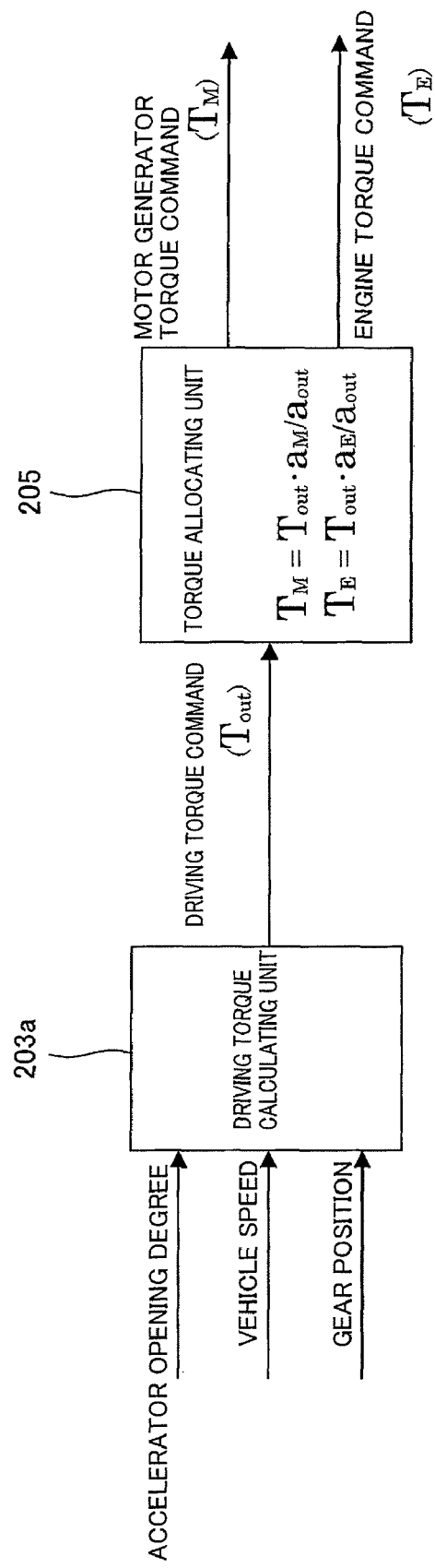
FIG. 4 is a view showing an example of a calculation process of a motor/generator torque command and an engine torque command which is executed by a torque allocating unit.

FIG. 4 is a view showing an example of the calculation process of the motor/generator torque command and the engine torque command which is executed by the torque allocating unit 205. Hereinafter, by way of example, description will be given of a case where the output torque restricting unit 204 is omitted and the driving torque calculating unit 203a and the torque allocating unit 205 are directly coupled to each other.

Basic formulae of the epicyclic gearing according to which the motor/generator torque command and the engine torque command are calculated are shown below.

$$a_E \omega_E + a_M \omega_M + a_{out} \omega_{out} = 0 \quad \text{(first formula: relationship of rotational speeds)}$$

$$T_E/a_{E-TM}/a_M = T_{out}/a_{out} \quad \text{(second formula: relationship of torques)}$$

$$a_E + a_M + a_{out} = 0 \quad \text{(third formula: relationship of coefficients)}$$

where $\omega_E$, $\omega_M$ and $\omega_{out}$ indicate the rotational speed of the engine (sun gear), the rotational speed of the generator (ring gear), and the rotational speed of output gear (carrier shaft), respectively, $T_E$, $T_M$, and $T_{out}$ indicate the torque of the engine (sun gear), the torque of the generator (ring gear), and the torque of output shaft (carrier shaft), respectively, and $a_E$, $a_M$, and $a_{out}$ indicate the epicyclic parameters, respectively.

As shown in FIG. 4, the driving torque calculating unit 203a calculates the torque required for driving based on an accelerator opening degree, the vehicle speed, and the gear position, and outputs to the torque allocating unit 205 the calculated value indicating the driving torque command (Tout).

Receiving the driving torque command (Tout), the torque allocating unit 205 calculates $T_M = T_{out} \cdot a_M/a_{out}$ and $T_E = T_{out} \cdot a_M/a_{out}$, and outputs the calculated value indicating the motor/generator torque command ($T_M$) and the engine torque command ($T_E$) to the generator 11 and the engine 10, respectively.

In the case of normal driving which does not require a traction force other than the traction force required for the vehicle to drive, the driving torque is uniquely determined by the accelerator opening degree and the vehicle speed (including a change rate of the vehicle speed). In calculation of the driving torque, the gear position of the transmission 12 should be taken into account so that the same acceleration is attained irrespective of the gear position. Thus, the same driving torque command is output and the same acceleration is obtained with an equal vehicle speed and an equal accelerator opening degree even when the gear position is different depending on the electricity amount in the electricity accumulator 14. Therefore, the machine operator need not consider the gear position at that point of time.

In the case of a driving situation in which the traction force is needed, such as pulling of a heavy object or shoveling of dirt (earth), the vehicle speed does not increase even if the driving torque command is output. Therefore, there is a need to increase the driving torque command as desired. In this case, the upper limit of an integrator of integration control incorporated into the driving torque calculation process may be set based on the accelerator opening degree. With this configuration, when pulling the heavy object or shoveling of the dirt (earth), the traction force is increased if the vehicle speed is not increased even though the accelerator has been pressed down by the machine operator, and the upper limit value of the traction force is set based on the accelerator opening degree, attaining a desired traction force by the operation of the operation.

In the case of the driving situation in which the traction force is needed as described above, driving in the regenerative braking mode frequently occurs, and the electric power generation state continues. Therefore, as a result of the processing of the gear position calculating unit 203b as described later, downshifting is performed and the resulting traction force is increased. In a case where the machine operator judges that it is necessary to increase the traction force in advance in shoveling of dirt, or the like, the machine operator manually performs downshifting, thereby facilitating the work.

Figure 5:
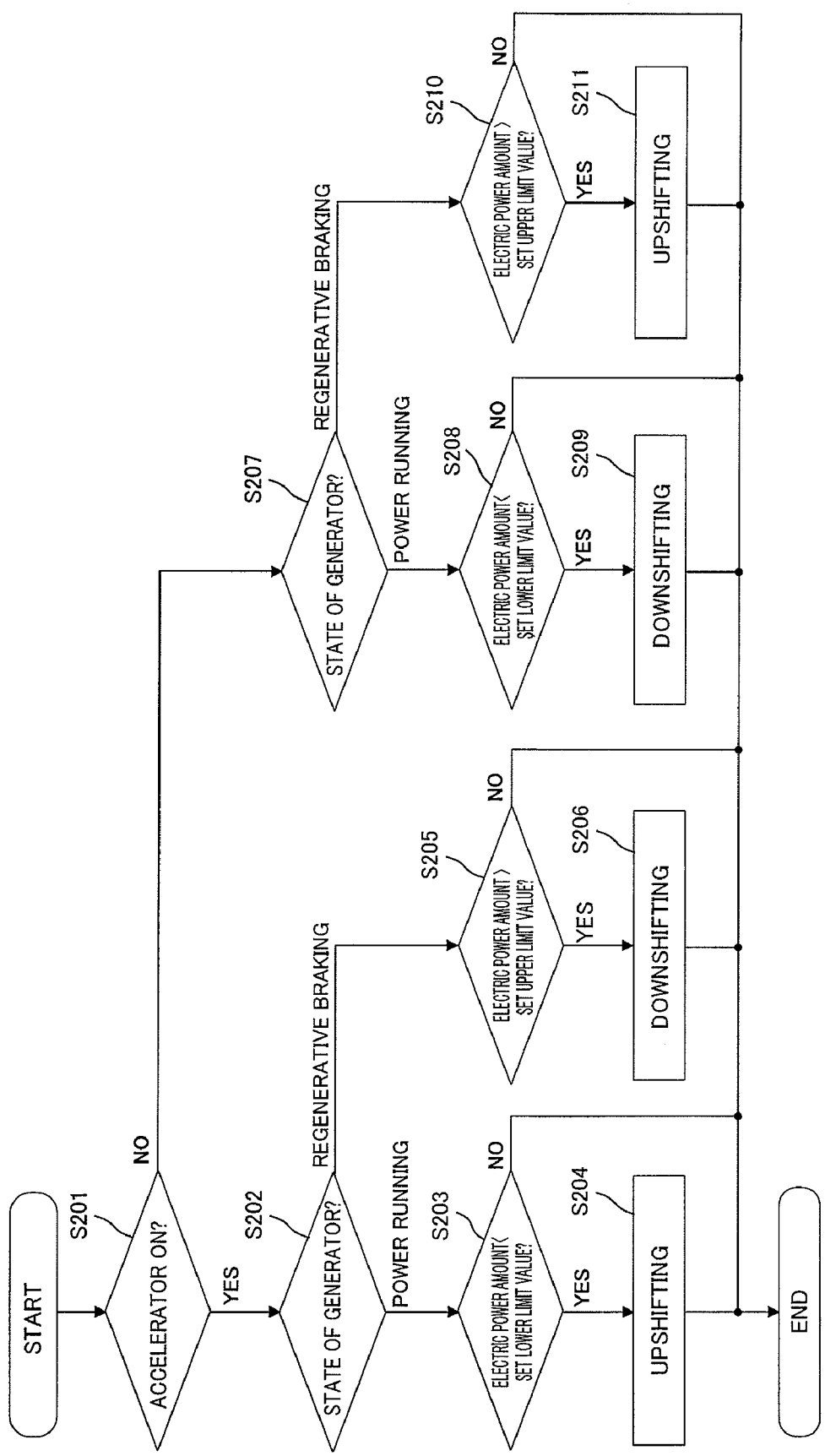
FIG. 5 is a flowchart showing a calculation process of a transmission gear position which is executed by a transmission gear position calculating unit.

FIG. 5 is a flowchart showing the calculation process of the gear position which is executed by the gear position calculating unit 203b. Turning to FIG. 5, the gear position calculating unit 203b determines whether or not the accelerator has been pressed down by the machine operator (accelerator is turned on) (S201). If it is determined that the accelerator has been pressed down by the machine operator (YES in S201), i.e., the construction machine 1 is being accelerated, the gear position calculating unit 203b determines whether the generator 11 is in the regenerative braking mode or in the power running mode (S202).

If it is determined that the generator 11 is in the power running mode (generator 11 is rotating normally) in step S202 ("power running mode" in S202), the gear position calculating unit 203b determines whether or not the electricity amount is smaller than the set lower limit value (S203). If it is determined that the electricity amount is not smaller than the set lower limit value, i.e., the electricity amount is sufficient (NO in S203), the process terminates. On the other hand, if the electricity amount is smaller than the set lower limit value, i.e., the electricity amount is deficient (YES in S203), the gear position calculating unit 203b outputs a gear upshifting command to the transmission 12 (S204).

If it is determined that the generator 11 is in the regenerative braking mode (the generator 11 is rotating reversely) in step S202 ("regenerative braking" in S202), the gear position calculating unit 203b determines whether or not the electricity amount is larger than the set upper limit value (S205). If it is determined that the electricity amount is not larger than the set upper limit value, i.e., the electricity amount is adequate (NO in S205), the process terminates. On the other hand, if it is determined that the electricity amount is larger than the set upper limit value, i.e., the electricity amount is in excess (YES in S205), the gear position calculating unit 203b outputs a gear downshifting command to the transmission 12 (S206).

If it is determined that the accelerator has not been pressed down by the machine operator in step S201 (NO in S201), i.e., the engine brake is being actuated, the gear position calculating unit 203b determines whether or not the generator 11 is in the regenerative braking mode (S207).

If it is determined that the generator 11 is in the power running mode in step S207 (power running mode in S207), the gear position calculating unit 203b determines whether or not the electricity amount is smaller than the set lower limit value (S208). If it is determined that the electricity amount is not smaller than the set lower limit value, i.e., the electricity amount is sufficient (NO in S208), the process terminates. On the other hand, if it is determined that the electricity amount is smaller than the set lower limit value, i.e., the electricity amount is deficient (YES in S208), the gear position calculating unit 203b outputs a gear downshifting command to the transmission 12 (S209).

If it is determined that the generator 11 is in the regenerative braking mode in step S207 ("regenerative braking" in S207), the gear position calculating unit 203b determines whether or not the electricity amount is larger than the set upper limit value (S210). If it is determined that the electricity amount is not larger than the set upper limit value, i.e., the electricity amount is adequate (NO in S210), the process terminates. On the other hand, if it is determined that the electricity amount is larger than the set upper limit value, i.e., the electricity amount is in excess (YES in S210), the gear position calculating unit 203b outputs a gear upshifting command to the transmission 12 (S211).

Through the above process, the gear position can be shifted properly according to the state of the generator 11 and the electricity amount in the electricity accumulator 14.

Subsequently, the driving operation of the construction machine 1 of this embodiment which occurs under the above mentioned control will be described with reference to velocity diagrams of the epicyclic gearing.

Figure 6:
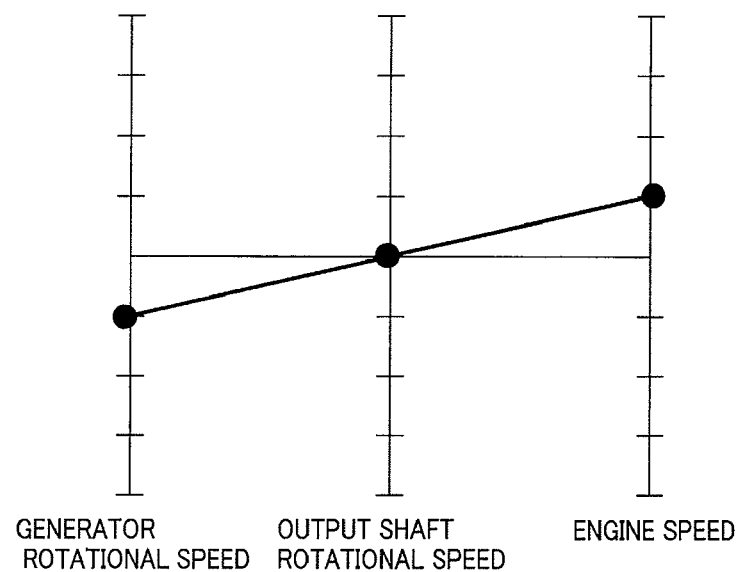
FIG. 6 is a velocity diagram of an epicyclic gearing in an idling state.

FIG. 6 is a velocity diagram of the epicyclic gearing in an idling state. In a case where the construction machine 1 is in a stopped state, the transmission 12 is set in the first gear position, and the engine 10 is running at an idling engine speed, the engine 10 is not generating a torque, a vehicle body of the construction machine 1 is in a stopped state, and therefore the vehicle speed is zero as shown in FIG. 6. In this case, the generator 11 is subjected to no load, and is rotated reversely. However, to be more precise, the engine 10 maintains the idling engine speed, and therefore a torque derived from mechanical friction of the engine 10 and mechanical friction of the generator 11 is generated.

Figure 7:
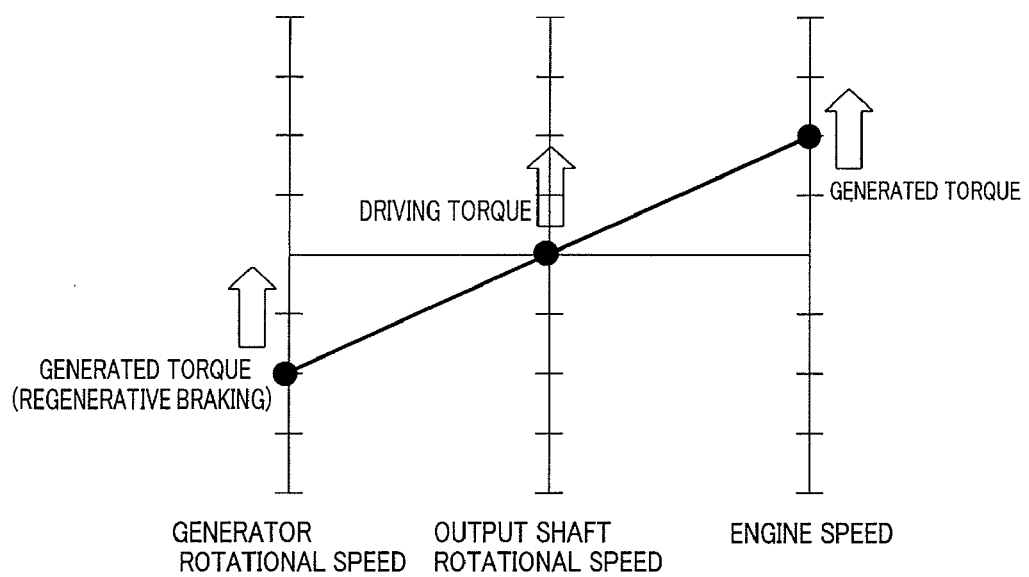
FIG. 7 is a velocity diagram of the epicyclic gearing during a first gear position starting state (or in a traction state).

Under this condition, if the machine operator presses down the accelerator, the torque allocating unit 205 allocates the motor/generator torque to the generator 11 and the engine torque to the engine 10. As shown in FIG. 7, a desired torque is generated in the generator 11 and in the engine 10. Thereby, the torque according to the operation amount of the accelerator is generated at the output shaft of the epicyclic gearing. As can be seen from FIG. 7, when the rotational speed of the output shaft is low, the generator 11 generates the torque in a braking direction, and generates the electric power in the regenerative braking mode. The electric power generated at this time is stored in the electricity accumulator 14 as electricity. By changing the balance between the torque generated in the engine 10 and the torque generated in the generator 11, the engine speed of the engine 10 and the rotational speed of the generator 11 can be controlled. This will be described later with reference to FIGS. 13 to 15.

Figure 8:
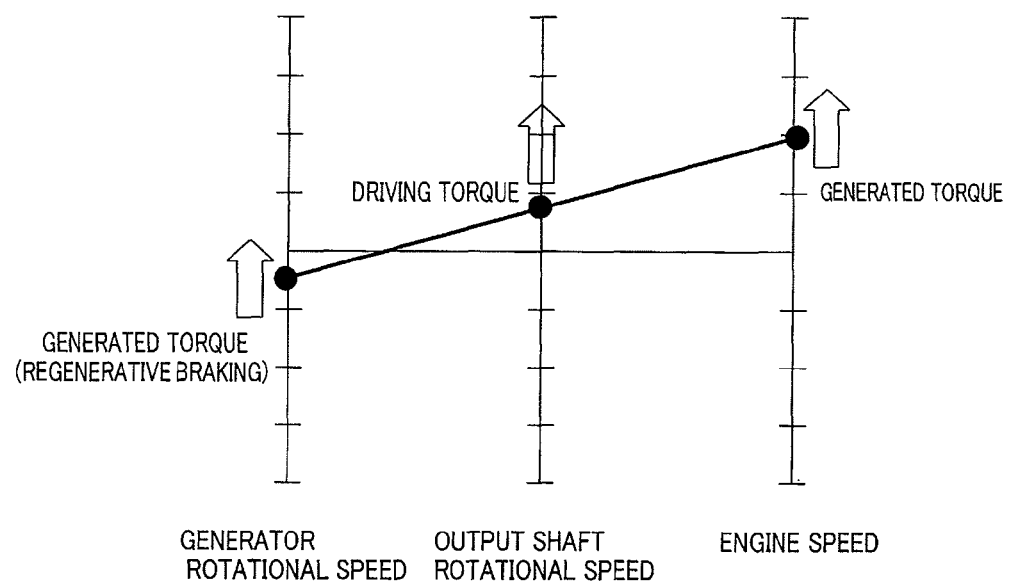
FIG. 8 is a velocity diagram of the epicyclic gearing during a first gear position acceleration state.
Figure 9:
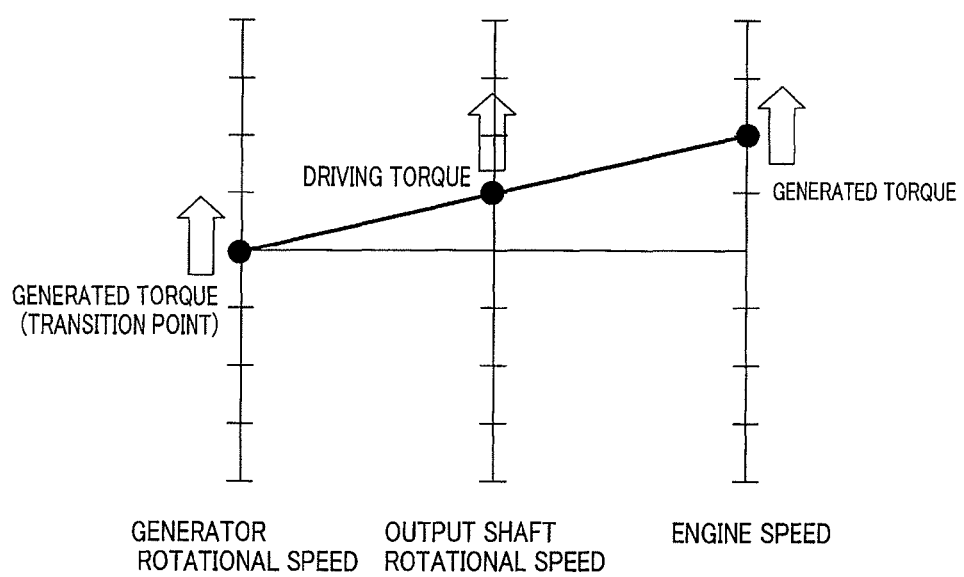
FIG. 9 is a velocity diagram of the epicyclic gearing during the first gear position acceleration state.
Figure 10:
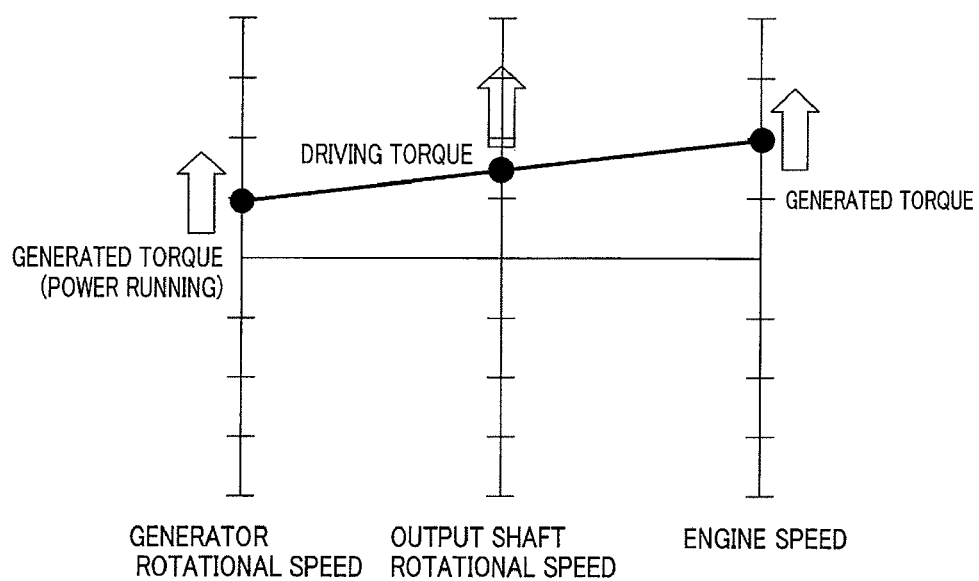
FIG. 10 is a velocity diagram of the epicyclic gearing during the first gear position acceleration state.

The rotational speed of the output shaft increases as the vehicle speed increases. Correspondingly, as shown in FIG. 8, the rotational speed of the generator 11 becomes close to zero. If the acceleration continues under this condition, the vehicle speed further increases, so that the rotational speed of the generator 11 becomes zero as shown in FIG. 9. If the vehicle speed further increases, the state of the generator 11 transitions from the regenerative braking mode to the power running mode, as shown in FIG. 10. At this time, the generator 11 performs the power running using the electricity stored in the electricity accumulator 14 (electricity stored by the acceleration in the regenerative braking mode plus the electricity stored before that point of time).

Figure 11:
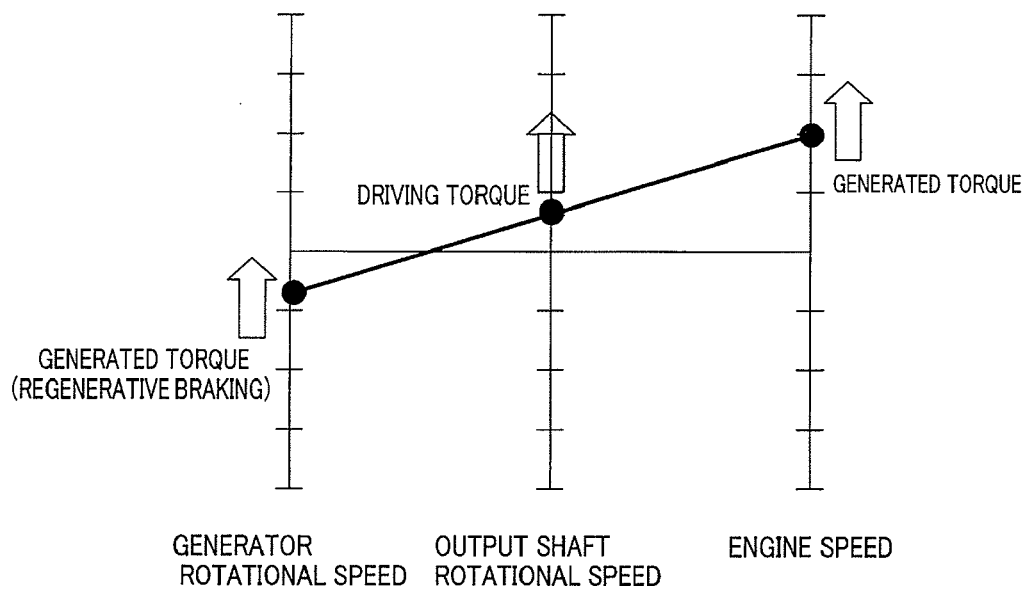
FIG. 11 is a velocity diagram of the epicyclic gearing during a second gear position acceleration state.
Figure 12:
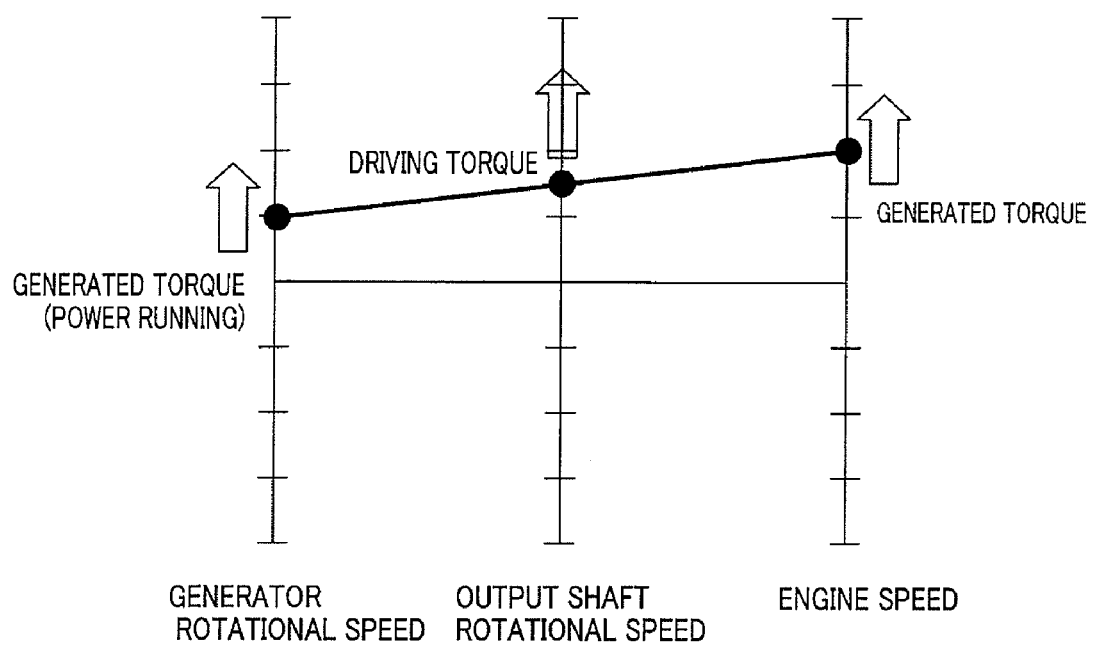
FIG. 12 is a velocity diagram of the epicyclic gearing during the second gear position acceleration state.

If the acceleration continues with the electricity amount being smaller under the state where generator 11 is in the power running mode, the gear position calculating unit 203b outputs a gear position upshifting command to the transmission 12 as described above. As a result, the gear ratio is changed, and the rotational speed of the output shaft is decreased. Therefore, the generator 11 is caused to rotate reversely again and is turned to the regenerative braking mode. Under this condition, the acceleration continues while the generator 11 is generating the electric power (see FIG. 11). Thereafter, when the acceleration continues, the generator 11 turns to the power running mode again, as shown in FIG. 12.

In the manner as described above, the gear position calculating unit 203b controls the transmission 12 gear position, and as a result, the construction machine 1 is able to continue driving while repeating electric charging and discharging within a range of a limited electric capacitance of the electricity accumulator 14.

Subsequently, a method of controlling the engine speed of the engine 10 and the rotational speed of the generator 11 by changing the balance between the torque generated in the engine 10 and the torque generated in the generator 11 will be described.

As should be understood from the basic second formula of the epicyclic gearing, the torque balance of the shafts conform to each other. For this reason, if the torque of the engine 10 and the torque of the generator 11 are balanced, the engine 10 increases the engine speed and the generator 11 increases the rotational speed, enabling the vehicle body of the construction machine 1 to be accelerated (increasing the rotational speed of the output shaft). If the torque balance between the engine 10 and the generator 11 is changed so as to, for example, increase the engine torque, the engine speed increases but the rotational speed of the generator 11 decreases. By controlling the engine speed of the engine 10 and the rotational speed of the generator 11 by changing the balance between the torque of the engine 10 and the torque of the generator 11, the construction machine 1 is able to continue driving while repeating electric charging and electric discharging. This will be described with reference to FIGS. 13 to 15.

Figure 13:
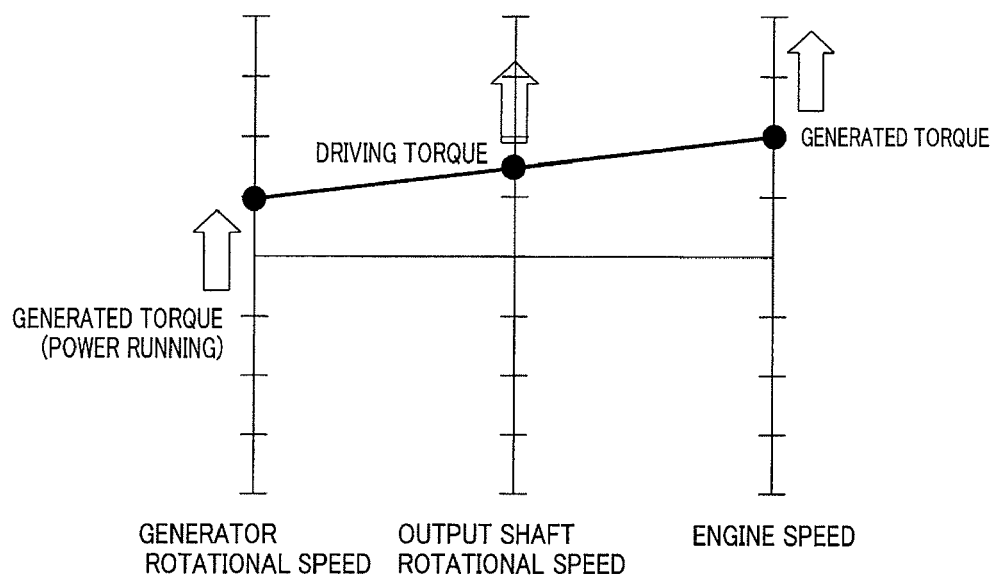
FIG. 13 is a velocity diagram of the epicyclic gearing during the second gear position acceleration state.
Figure 14:
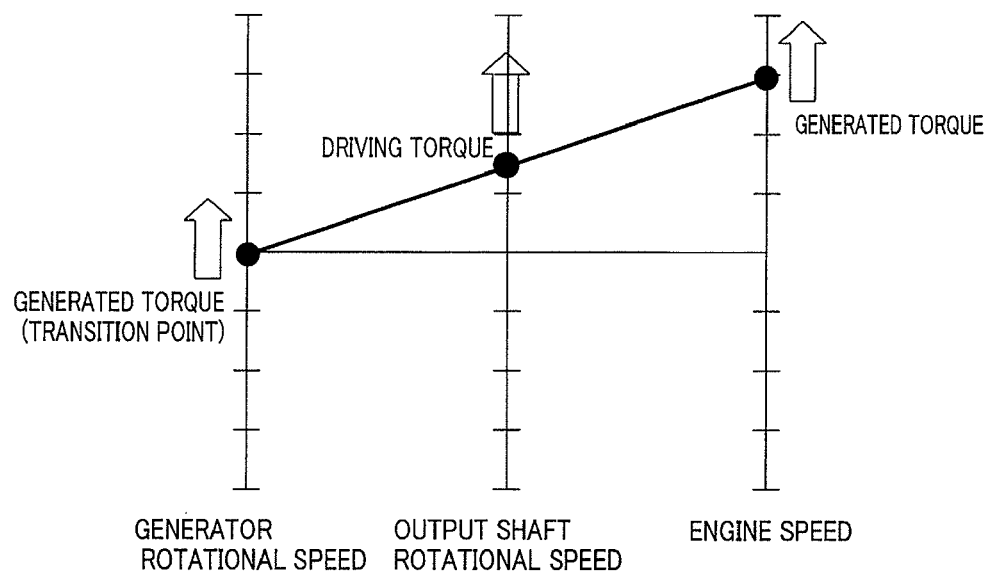
FIG. 14 is a velocity diagram of the epicyclic gearing during the second gear position acceleration state.
Figure 15:
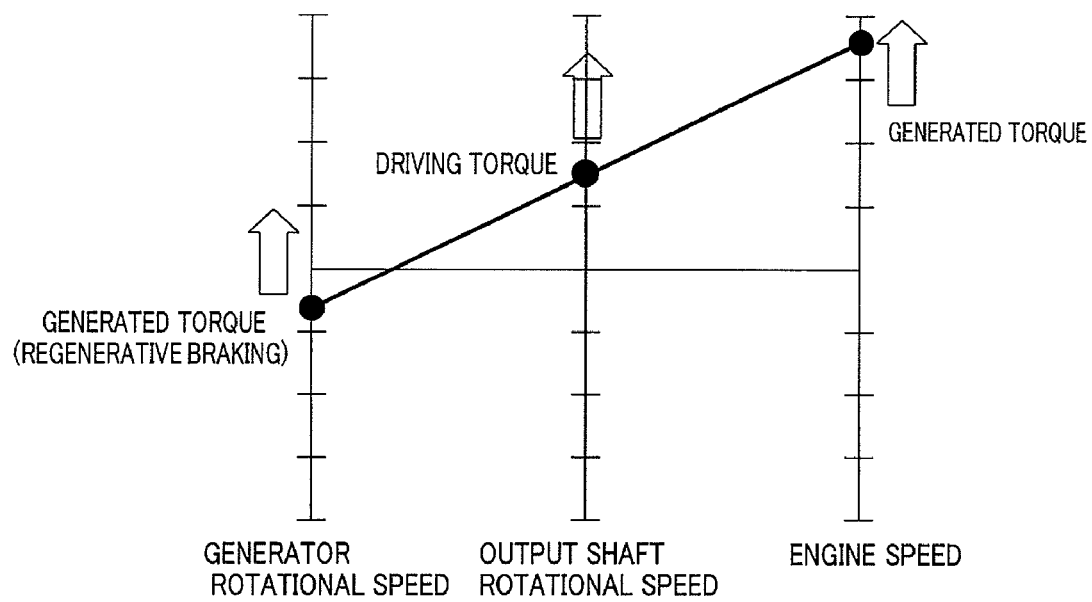
FIG. 15 is a velocity diagram of the epicyclic gearing during the second gear position acceleration state.

FIGS. 13 to 15 are velocity diagrams of the epicyclic gearing during an acceleration state in a second gear position. In the examples shown in FIGS. 13 to 15, the rotational speeds of the output shaft of the epicyclic gearing are equal. As shown in FIG. 14, when the generator 11 is at a transition point between the regenerative braking mode and the power running mode, electric charging and electric discharging do not occur. When the balance between the torque of the engine 10 and the torque of the generator 11 is changed so as to decrease the engine torque, the engine speed of the engine 10 decreases but the rotational speed of the generator 11 increases. As a result, as shown in FIG. 13, the generator 11 turns to the power running mode, and consumes the electricity stored in the electricity accumulator 11. On the other hand, when the engine torque is increased, the engine speed of the engine 10 increases but the rotational speed of the generator 11 decreases. As a result, as shown in FIG. 15, the generator 11 turns to the regenerative braking mode, and stores the electricity in the electricity accumulator 14.

As should be understood from the above, even at an equal vehicle speed, the generator 11 can have the power running mode or the regenerative braking mode depending on the engine speed of the engine 10. Thus, electric charging and discharging of the generator 11 can be controlled based on the engine speed.

Figure 16:
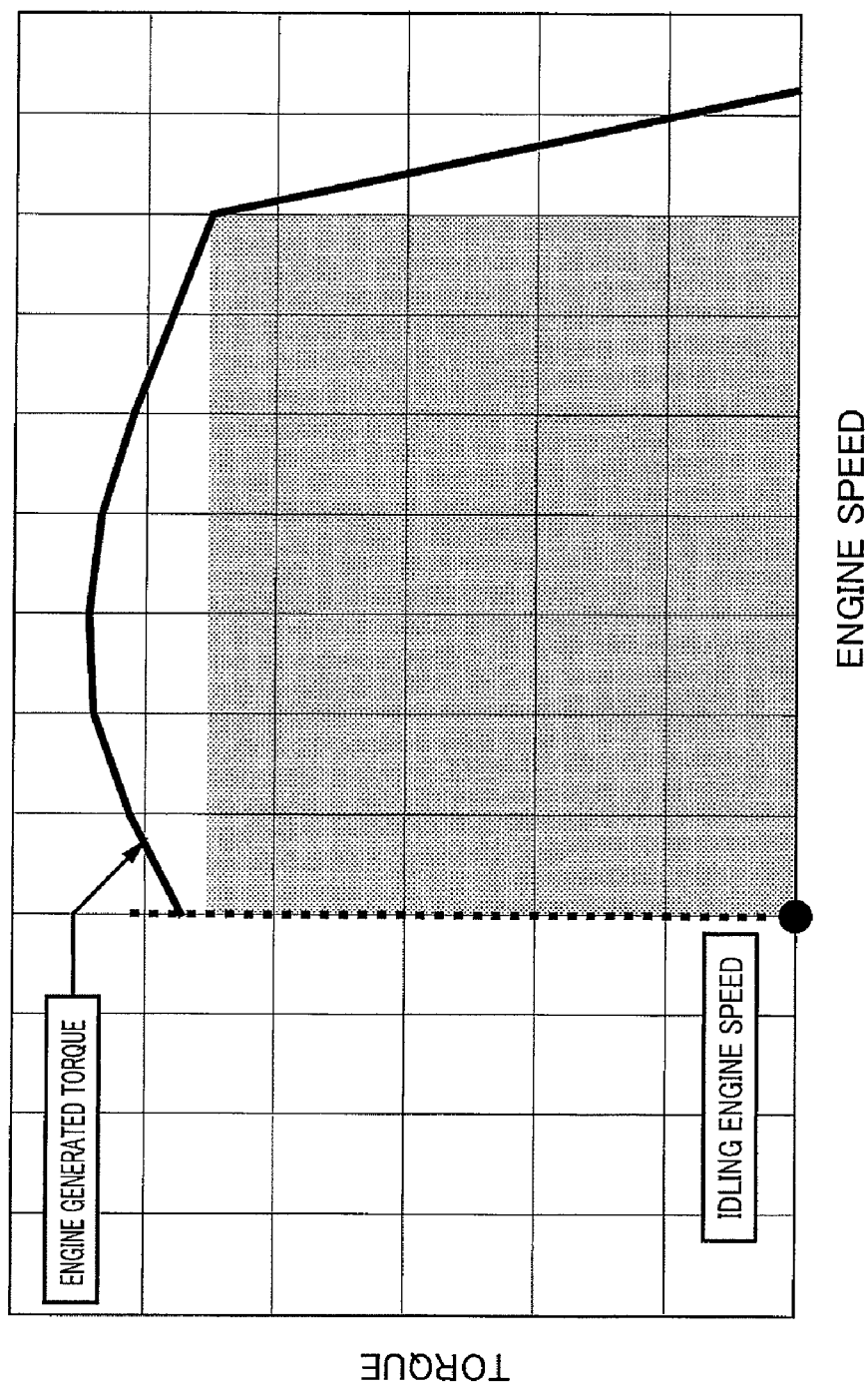
FIG. 16 is a graph showing the relationship between an engine speed and a torque.
Figure 17:
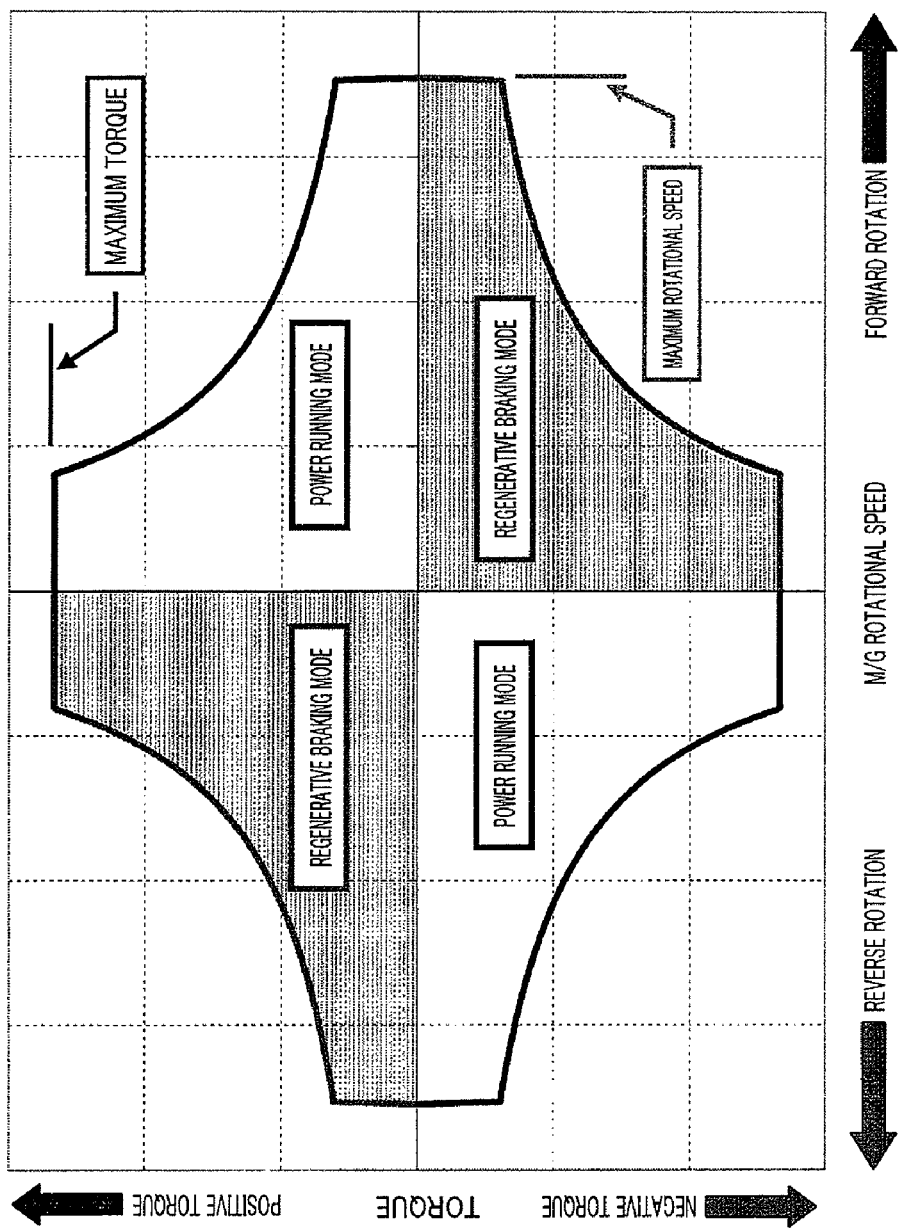
FIG. 17 is a graph showing a generator rotational speed and a torque.

Subsequently, the above described driving operation will be described with reference to the driving characteristic view showing the relationship between the speed and the traction force. FIGS. 16 and 17 show an engine characteristic and a generator characteristic which are required to create the driving characteristic view, respectively. It is supposed that the engine 10 does not rotate below an idling engine speed (or a minimum engine speed at which an effective torque is generated) and the torque is generated in a hatched region (region where the torque is constant irrespective of the engine speed) in FIG. 16. These characteristics are used for the convenience to create the driving characteristic view as described later, although the actual characteristic is indicated by a line showing the torque generated in the engine 10 of FIG. 16.

As shown in FIG. 17, in the power running mode, the generator 11 is rotating normally and generating a positive torque, or the generator 11 is rotating reversely and generating a reverse torque. On the other hand, in the regenerative braking mode, the generator 11 is rotating normally and generating a reverse torque, or the generator 11 is rotating reversibly and generating a positive torque.

Figure 18:
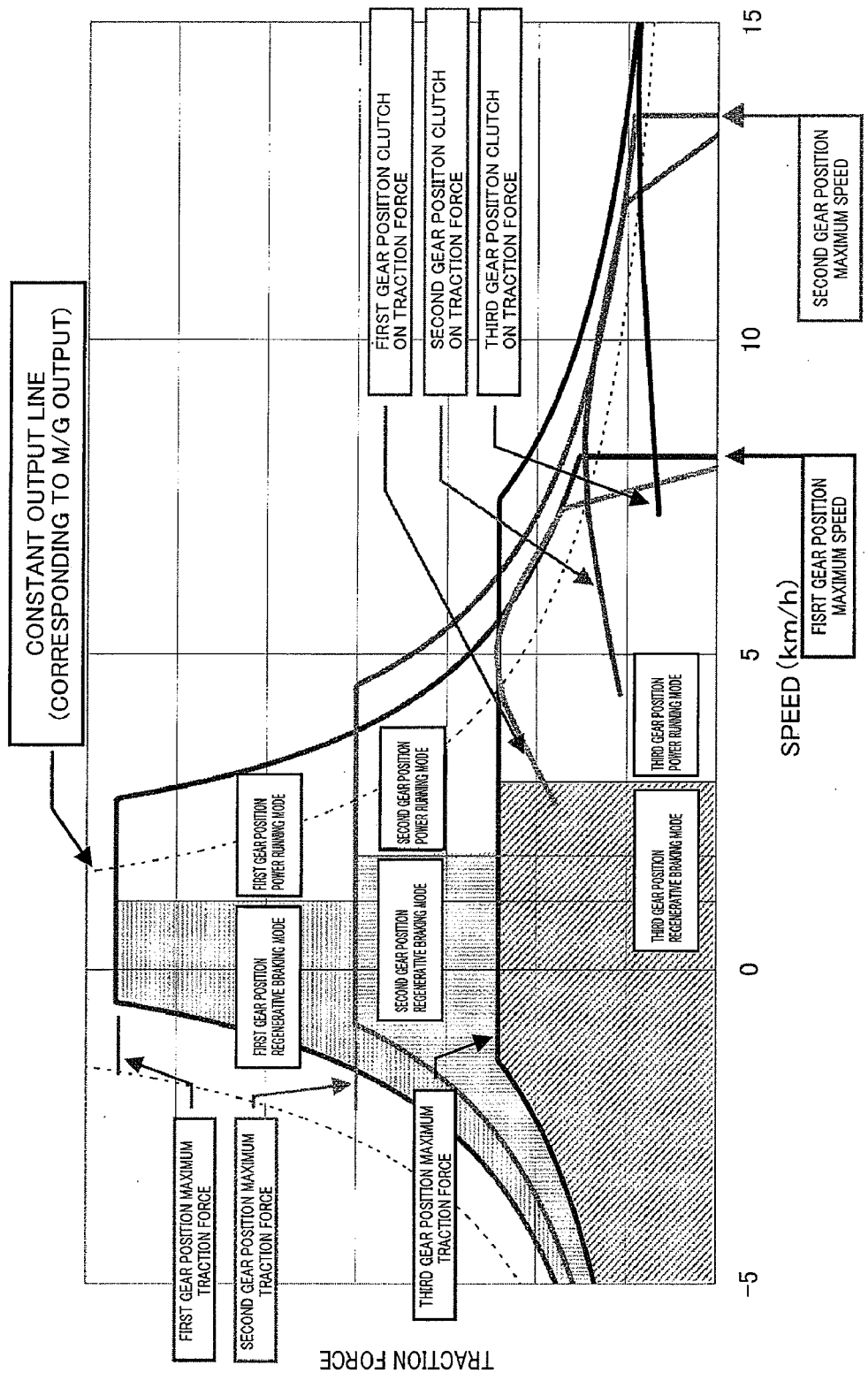
FIG. 18 is a driving characteristic view showing the relationship between a vehicle speed and a traction force in the construction machine according to Embodiment 1 of the present invention.
Figure 19:
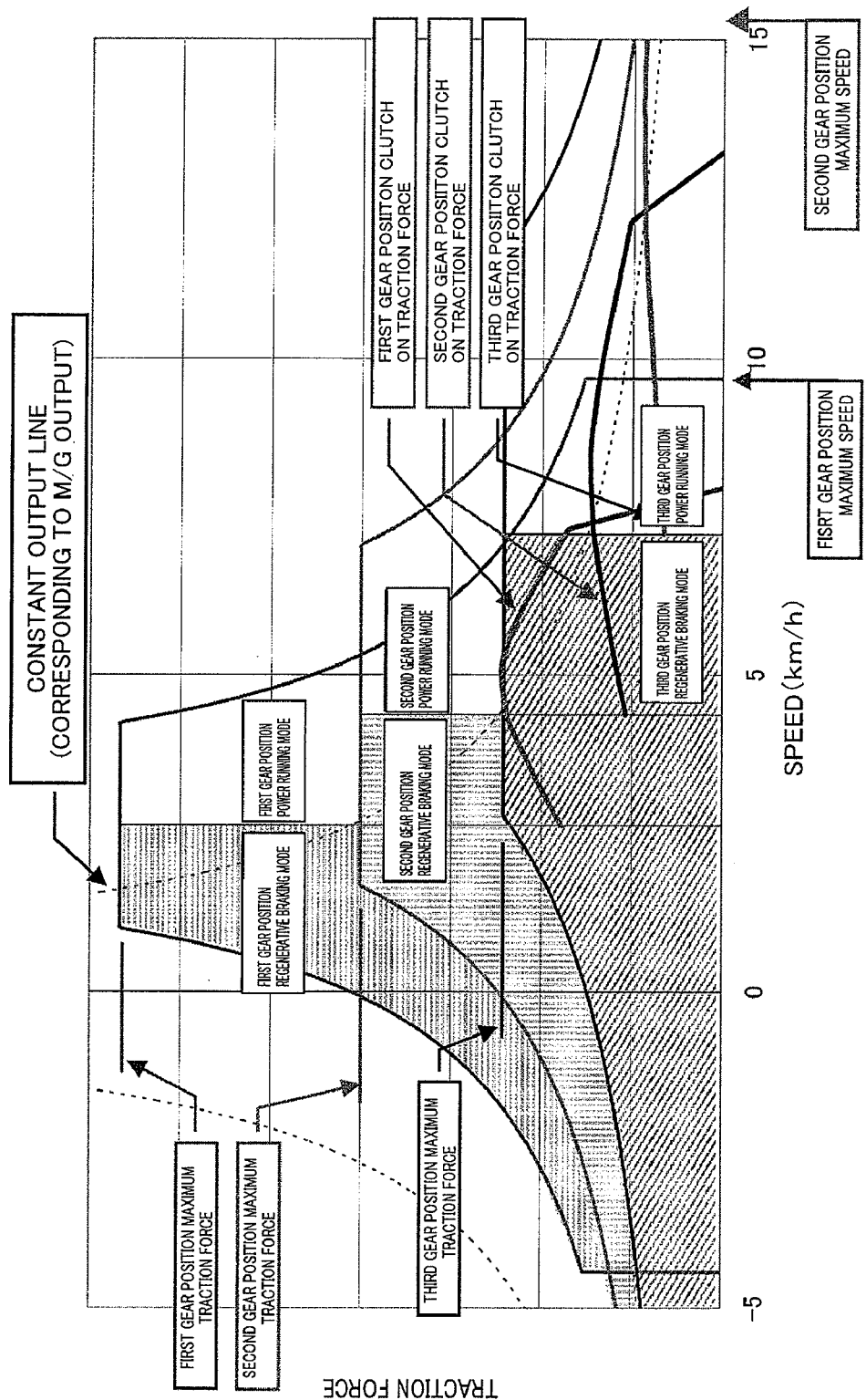
FIG. 19 is a driving characteristic view showing the relationship between the vehicle speed and the traction force in the construction machine according to Embodiment 1.
Figure 20:
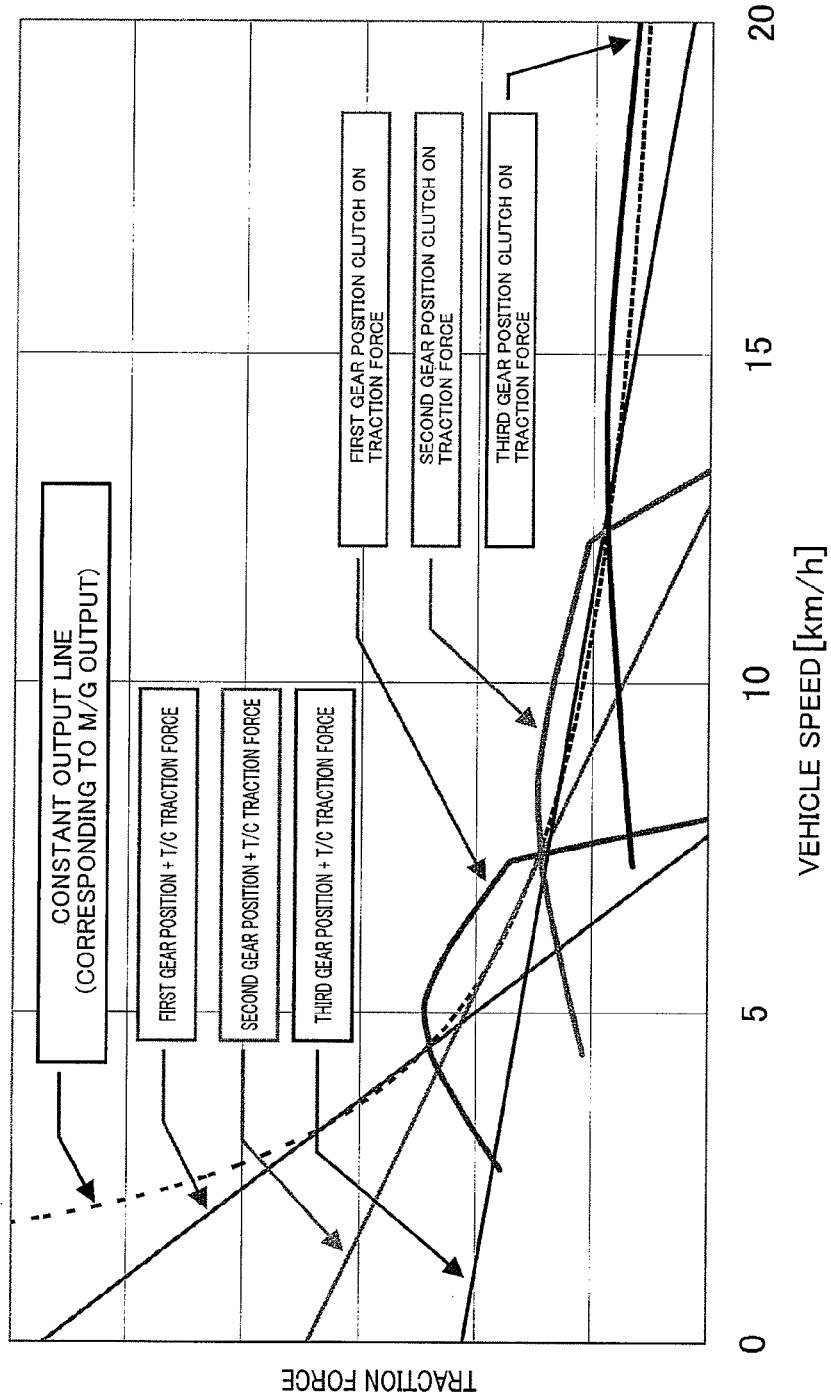
FIG. 20 is a driving characteristic view showing the relationship between a vehicle speed and a traction force in a conventional torque converter equipped vehicle.

FIGS. 18 and 19 are driving characteristic views each showing the relationship between the vehicle speed and the traction force in the construction machine 1 according to Embodiment 1. FIG. 18 shows a case where the engine speed is low, and FIG. 19 shows a case where the engine speed is high. FIG. 20 is a driving characteristic view showing the relationship between the vehicle speed and the traction force in a conventional torque converter equipped vehicle (wheel loader including a torque converter, three-gear transmission, and a mechanism for locking up the torque converter).

In FIGS. 18, 19, and 20, dotted lines indicate the power outputs of the generator 11 loaded in the construction machine 1. As shown in FIG. 20, the output line is set to be similar to the traction forces corresponding to the first gear position to the third gear position of the conventional torque converter equipped vehicle.

Figure 51:
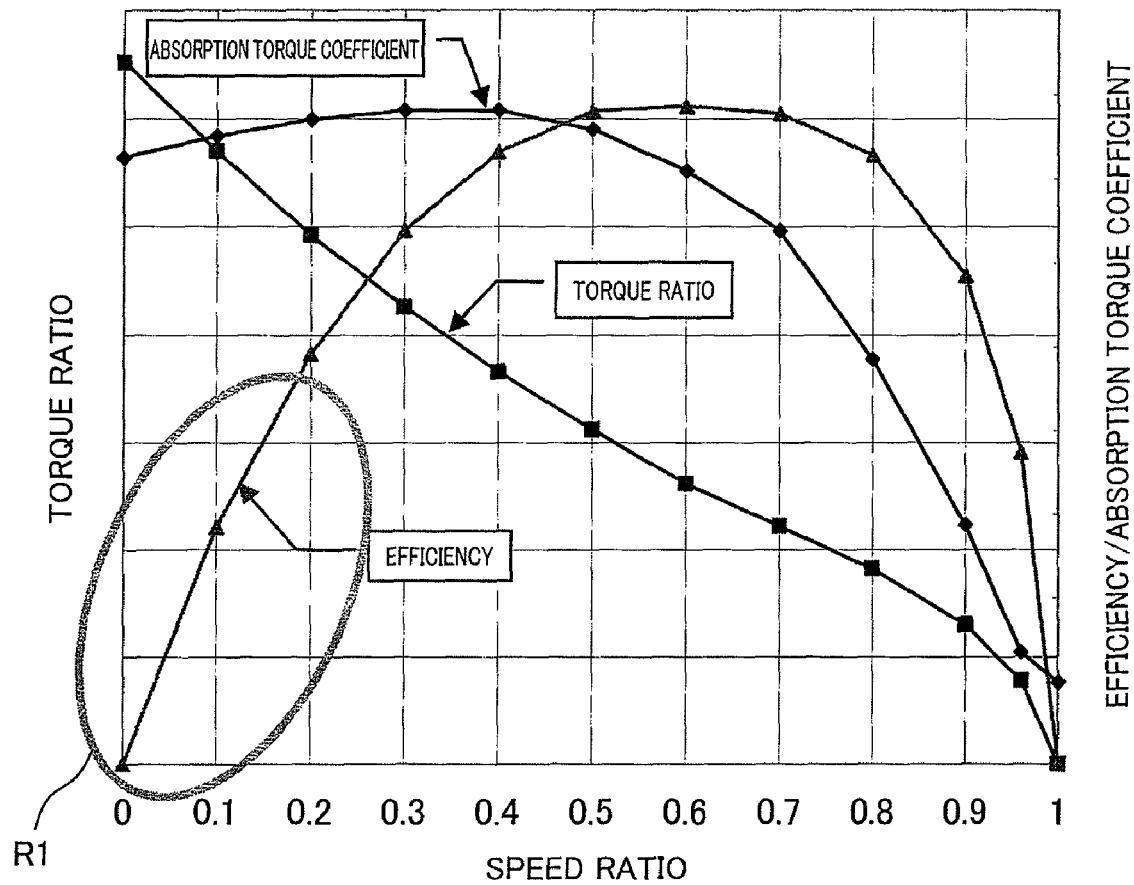
FIG. 51 is a graph showing the relationship between a torque ratio and an efficiency/absorption torque coefficient with respect to a speed ratio in the torque converter.
Figure 52:
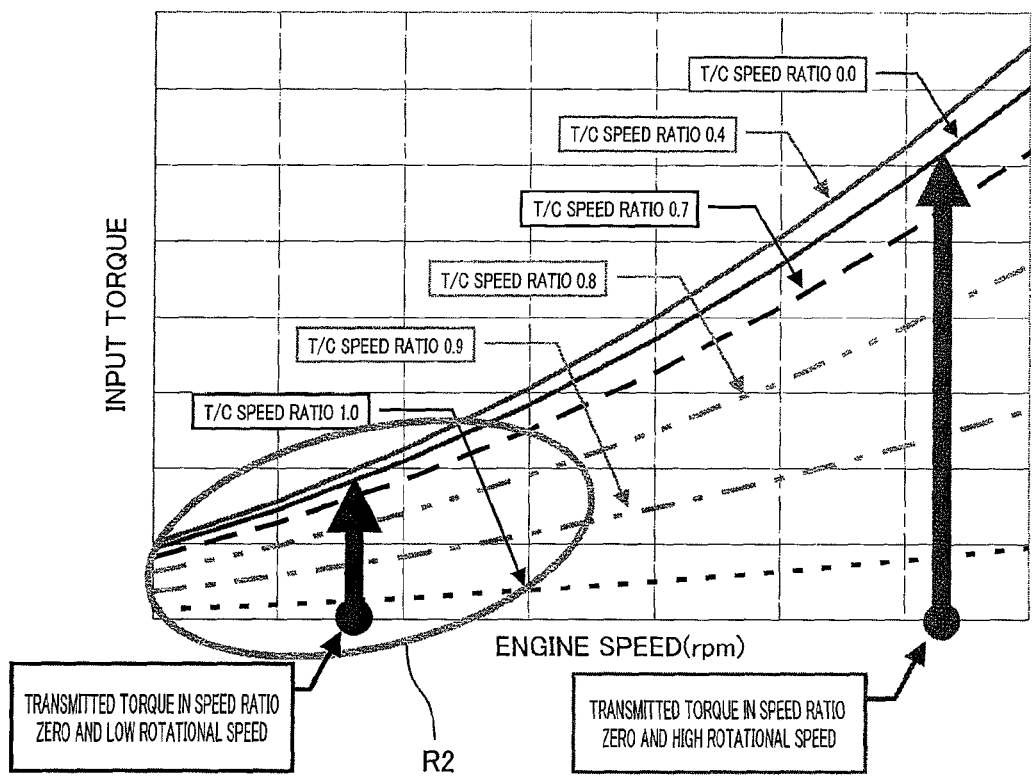
FIG. 52 is a graph showing the relationship between an input torque of the torque converter and an engine speed.
Figure 53:
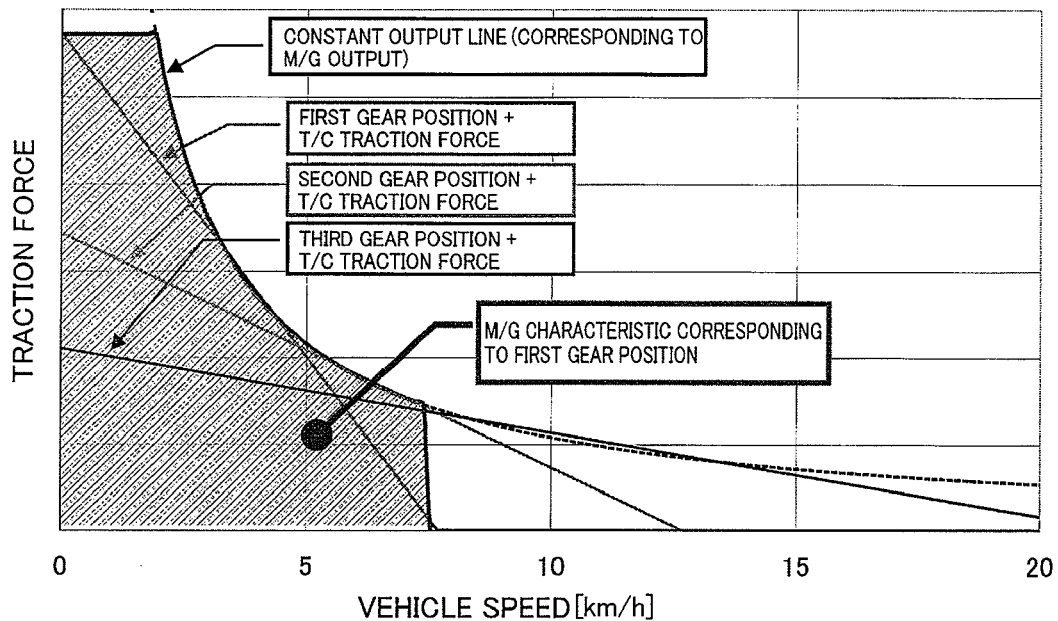
FIG. 53 is a driving characteristic view showing the relationship between a vehicle speed and a traction force in the case where the wheel loader is driven by the electric motor/generator.
Figure 54:
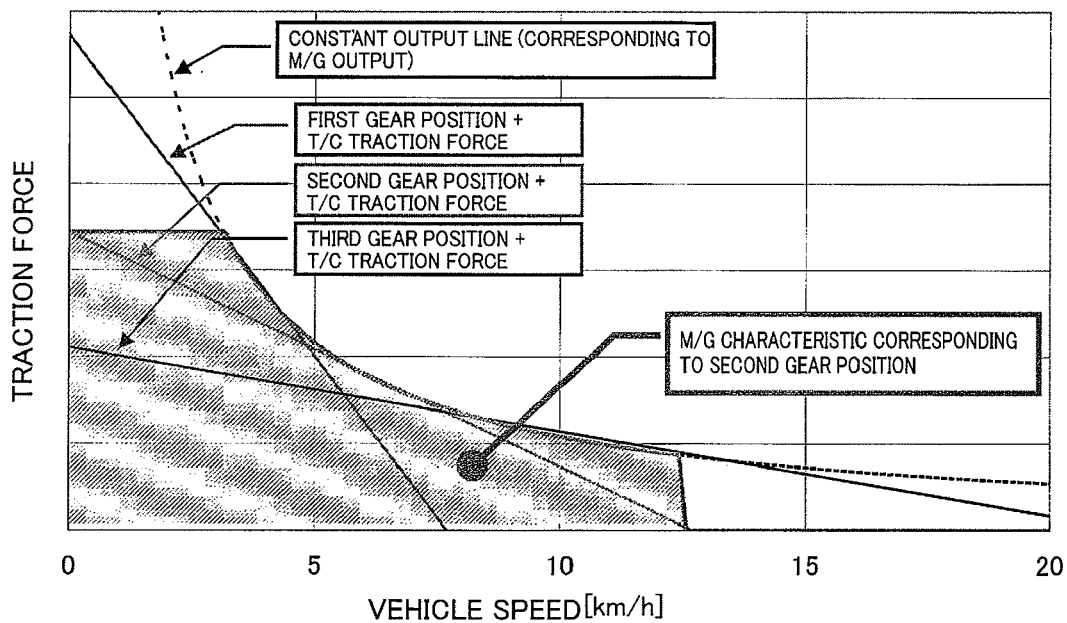
FIG. 54 is a driving characteristic view showing the relationship between the vehicle speed and the traction force in the case where the wheel loader is driven by the electric motor/generator.
Figure 55:
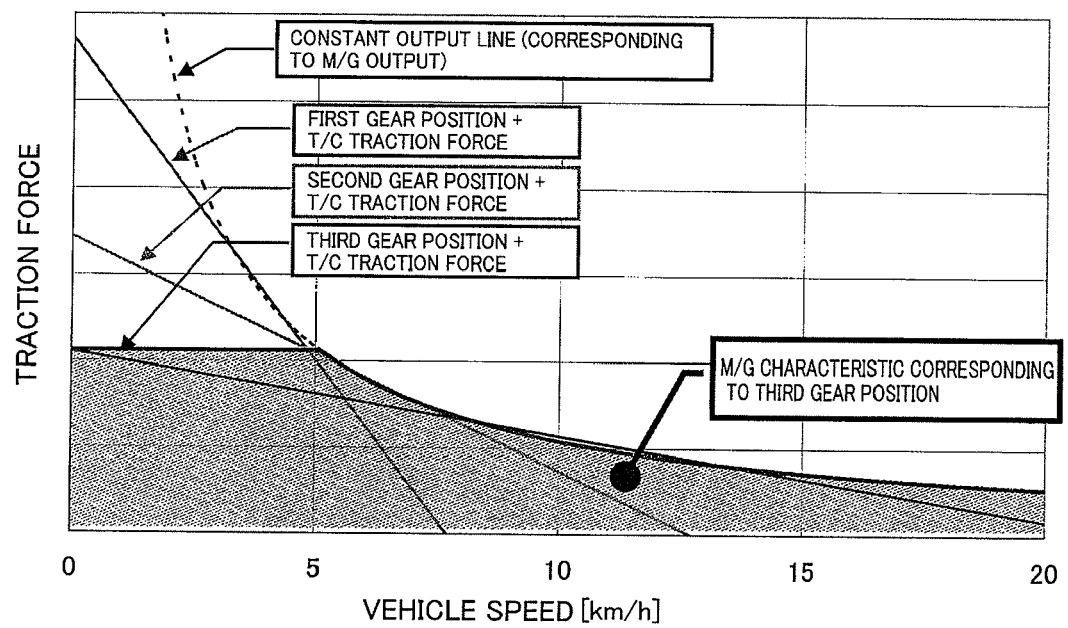
FIG. 55 is a driving characteristic view showing the relationship between the vehicle speed and the traction force in the case where the wheel loader is driven by the generator.

First, the driving characteristic of the conventional torque converter equipped vehicle will be described with reference to FIG. 20. The relationship between a maximum traction force and a vehicle speed in the case where the gear position is a first gear position is indicated by the line of "first gear position+T/C traction force" in FIG. 20. As shown in FIG. 51, when the vehicle speed is zero, the torque ratio (output torque/input torque) is high. As shown in FIG. 52, when the engine speed is maximum, the transmitted torque is maximum. Therefore, a maximum traction force is generated when the engine speed is maximum. The speed ratio increases and the torque ratio decreases as the vehicle speed increases, so that the traction force decreases. When the speed ratio is 1, the torque ratio is zero, and therefore the traction force is zero. The same applies to the second gear position and the third gear position.

The relationship between the maximum traction force and the vehicle speed in the case where the torque converter is locked up in the first gear position, i.e., with the clutch 15 being in an on-state, is indicated by a line of "first gear position clutch-on traction force" of FIG. 20. In this case, the torque ratio is 1, the torque converter does not increase the torque effectively, and the traction force is small. The construction machine 1 is unable to drive when the engine speed is not higher than a certain engine speed (about 3 km/h in FIG. 20) at which the engine generates an effective torque. The same applies to the second gear position and the third gear position.

In the V-patterned operation described with reference to FIG. 50, the construction machine 1 typically repeats forward driving and backward driving at speeds which are about 10 km/h or lower. For this reason, the conventional vehicle uses only the operation of the torque converter in the second gear position during driving, and uses the operation of the torque converter in the first gear position during the work such as shoveling of dirt. When the conventional vehicle is driving at a high speed which is 20 km/h or higher, the torque converter is locked up.

FIG. 20 shows a constant output line corresponding to the output of the generator 11 according to this embodiment. Supposing that the vehicle drives using only the generator 11, the driving capability which is equal to that of the torque converter equipped vehicle without the transmission is obtained, if the maximum torque and maximum rotational speed of the generator 11 are sufficiently large. However, actually, the maximum torque and the maximum rotational speed are restricted, it is very difficult to attain excellent driving capability without the transmission, using the generator which is currently used. For this reason, in the present invention, the construction machine 1 includes the transmission 12.

Subsequently, the driving characteristics of the construction machine 1 according to this embodiment will be described with reference to FIGS. 18 and 19. FIG. 18 is created supposing that the engine 10 is able to generate a high torque based on a balance of the epicyclic gearing as compared to the maximum torque of the generator 11. In this case, it is supposed that the engine 10 is rotating at a constant low speed.

The maximum traction force in the first gear position, the maximum traction force in the second gear position, and the maximum traction force in the third gear position are determined by the maximum torque of the generator 11 as shown in FIG. 17, and the maximum speeds in the respective gear positions are determined by the maximum rotational speed of the generator 11. In FIG. 18, a left half region (hatched region) of the characteristic in each gear position indicates the regenerative braking mode of the generator 11 and a right half region thereof indicates the power running mode of the generator 11.

As shown in FIG. 18, when the gear position is the first gear position in the construction machine 1 of this embodiment, the construction machine 1 is able to continue to have an equal traction force until it reaches a certain speed (about 3 km/h in FIG. 18), unlike the conventional vehicle. When the gear position is upshifted in this state, the maximum traction force decreases but the maximum speed in the regenerative braking mode increases. For this reason, the construction machine 1 is accelerated while generating the electric power in the regenerative braking mode in a lower gear position, and then is further accelerated in the power running mode while consuming the electric power stored in the electricity accumulator 14 from a speed range in which the generator 11 rotates normally. When the electricity amount in the electricity accumulator 14 is deficient, the gear position is upshifted and the generator 11 turns to the regenerative braking mode. The construction machine 1 is accelerated while generating the electric power in the generator 11. In this way, the construction machine 1 of this embodiment is accelerated while repeating electric charging and electric discharging.

In the case where the construction machine 1 is driving at a constant high speed under this condition, the clutch 15 is turned on at a time point when the vehicle speed reaches a speed (clutch-on speed) at which the clutch 15 can be turned on. As a result, the construction machine 1 drives only using the engine 10. Normally, the clutch 15 may be turned on while maintaining a third gear position from the clutch-off state in the third gear position (driving state in which the regenerative braking or the power running of the generator 11 is used). However, in a case where the electricity stored in the electricity accumulator 14 is lessened because the acceleration and deceleration in the power running mode in the third gear position are repeated before the clutch 15 is turned on and thereby the construction machine 1 cannot be accelerated up to the clutch-on speed in the third gear position in the power running mode in the third gear position, the third gear position may be downshifted to the second gear position and then the clutch 15 may be turned on. In this case, the construction machine 1 is accelerated in the clutch-on state in the second gear position and the second gear position is upshifted to the third gear position after the vehicle speed reaches the clutch-on speed in the third gear position. In the case of driving in this speed range (speed range which is higher than about 10 km/h in FIG. 18), the gear position of the transmission 12 may be shifted with the clutch 15 being in an on-state. This gear shifting operation is performed as in the normal gear shifting operation of an automobile.

As shown in FIG. 19, when the engine 10 is running at a high speed, the traction force parallel-shifts to the high-speed side traction force according to an increase in the engine speed. For example, the maximum traction force in the first gear position is equal from zero speed up to about 3 km/h which is the transition point between the regenerative braking and the power running. In contrast, as shown in FIG. 20, in the conventional vehicle, the maximum traction force in the case where the vehicle speed is about 3 km/h is about 60% of the maximum traction force in the case where the vehicle speed is zero. Thus, in the construction machine 1 of this embodiment, driving capability which is not attained by the conventional vehicle is attainable.

With reference to the constant output line of FIG. 19, the regenerative braking mode from the first gear position to the third gear position covers the vehicle speed up to about 7 km/h. This means that at this engine speed, the construction machine 1 is able to obtain in the regenerative braking mode a traction force which is equal to that of the conventional vehicle even in the state where the electricity is not stored in the electricity accumulator 14. That is, this driving capability is attained only by the electric power generation in the regenerative braking mode without consuming the electric power. For this reason, if the electricity amount is deficient, then the engine speed is increased, and the speed range covered with the regenerative braking mode is enlarged. Thus, the construction machine 1 is acceleratively driving while generating the electric power. On the other hand, if the electricity amount is sufficient, then the engine speed is decreased. Thus, the construction machine 1 is acceleratively driving in the power running mode. In this way, the construction machine 1 is able to continue driving while repeating electric power generation in the regenerative brake mode and electric discharge in the power running mode within a range of a limited electricity amount in the electricity accumulator 14.

Subsequently, the driving operation of the construction machine 1 of this embodiment in the case where it is decelerated will be described with reference to FIGS. 21 to 23.

Figure 21:
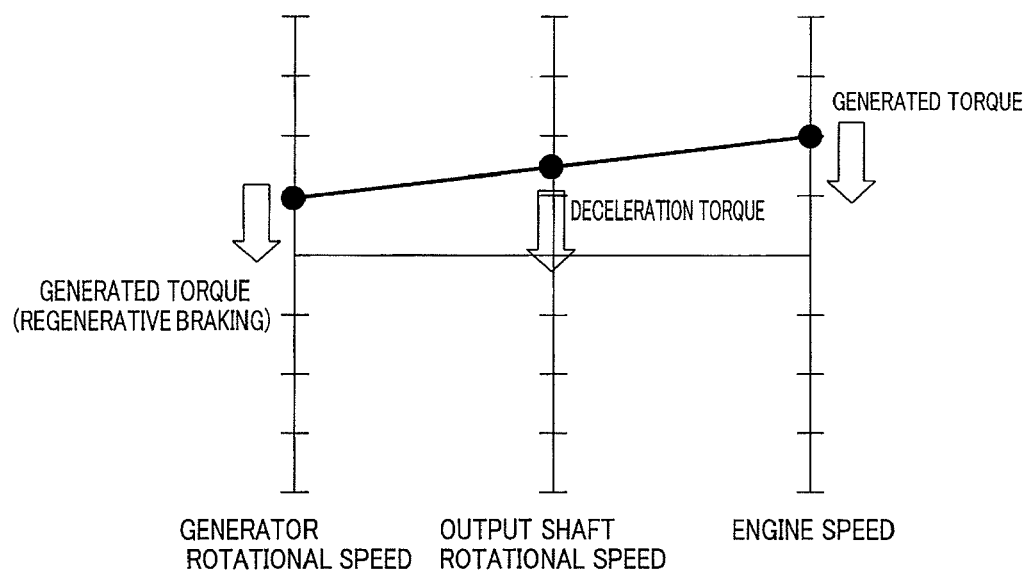
FIG. 21 is a velocity diagram of the epicyclic gearing during a deceleration state.

FIG. 21 is a velocity diagram of the epicyclic gearing in the case where the transmission 12 is in the second gear position and the construction machine 1 is decelerated in the state where the construction machine 1 is accelerated with the generator 11 being in the power running mode or the construction machine 1 is driving at a constant speed. As shown in FIG. 21, in this case, the construction machine 1 is decelerated while generating the electric power by the regenerative braking of the generator 11.

Figure 22:
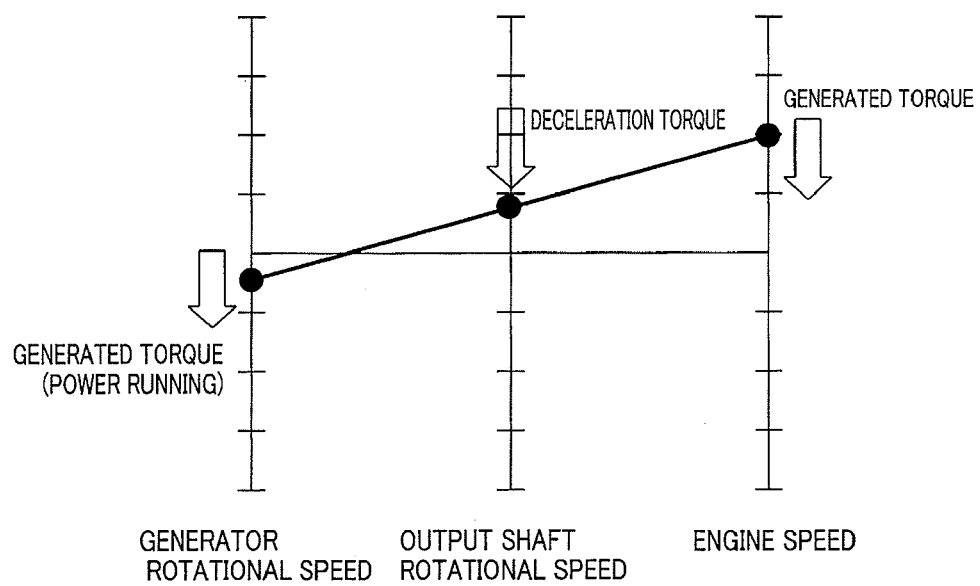
FIG. 22 is a velocity diagram of the epicyclic gearing during the deceleration state.
Figure 23:
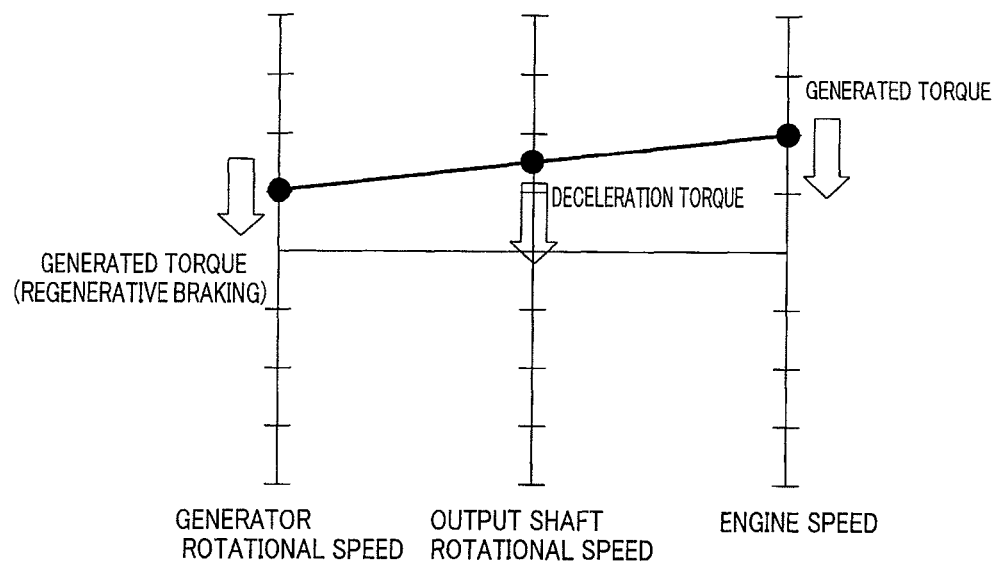
FIG. 23 is a velocity diagram of the epicyclic gearing during the deceleration state.

FIG. 22 is a velocity diagram of the epicyclic gearing in the case where the transmission 12 is in the second gear position and the construction machine 1 is decelerated in the state where the construction machine 1 is accelerated with the generator 11 being in the regenerative braking mode or the construction machine 1 is driving at a constant speed. As shown in FIG. 22, in this case, the construction machine 1 is decelerated while performing electric discharge by the power running of the generator 11.

In the case where it is necessary to perform electric discharge because the electricity accumulator 14 is close to a fully charged state, the construction machine 1 may be decelerated in a way as shown in FIG. 22. However, commonly, the deceleration energy is regenerated and electric charging is performed. So, the construction machine 1 may be decelerated in such a manner that the second gear position is downshifted to the first gear position, and the generator 11 is caused to transition from the power running mode to the regenerative braking mode, as shown in FIG. 23.

Subsequently, the driving operation of the construction machine 1 according to this embodiment in the case where switch back occurs will be described with reference to FIGS. 24 to 33.

In the conventional vehicle, during the switch back, the braking energy is consumed by the friction of the clutch and the resistance of the torque converter. In contrast, in the present invention, the electric power is generated using a great regenerative energy during the switch back, and the electricity is stored in the electricity accumulator 14. Thus, re-use of the energy is enabled.

The driving during the switch back is classified into two methods according to the gear shifting timing between the forward driving and the backward driving. The first method is to switch between the forward driving and the backward driving in an earlier state, and the second method is to switch between the forward driving and the backward driving after the vehicle speed is sufficiently decreased.

Figure 24:
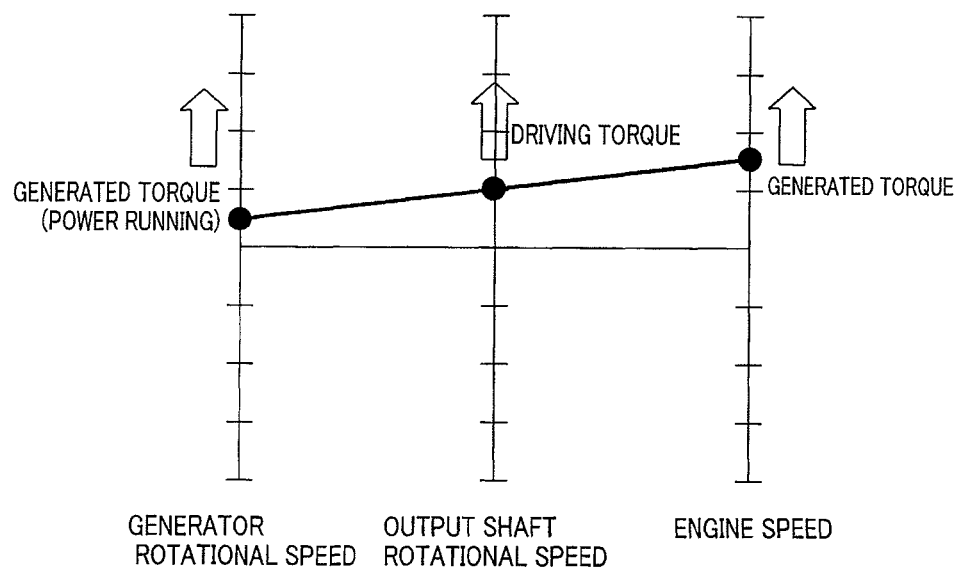
FIG. 24 is a velocity diagram of the epicyclic gearing during a switch back state.
Figure 25:
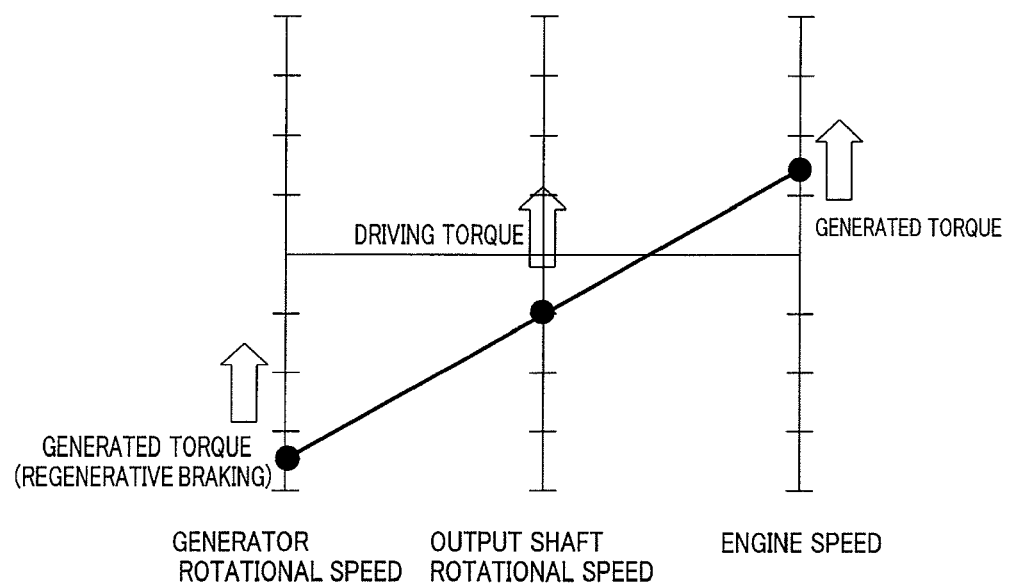
FIG. 25 is a velocity diagram of the epicyclic gearing during the switch back state.

Initially, the first method will be described. FIG. 24 is a velocity diagram of the epicyclic gearing in the case where the transmission 12 is in the second gear position and the construction machine 1 is driving backward acceleratively or is driving backward at a constant speed. In this case, as shown in FIG. 24, the generator 11 is in the power running mode. Under this condition, when the machine operator operates the forward/backward driving lever to cause the construction machine 1 to drive forward, the controller 2 instructs the transmission 12 to shift the gear position to forward driving gear position. Thereby, the output shaft of the epicyclic gearing (input shaft of the transmission 12) rotates at an equal rotational speed in a reverse direction, so long as the gear ratio is equal between the forward driving and the backward driving in the second gear position. As a result, as shown in FIG. 25, the generator 11 turns to the regenerative braking mode. In the state of FIG. 25, the backward driving gear position has been shifted to the forward driving gear position, and therefore, a direction of the driving torque changes from a backward driving direction (FIG. 24) to a forward driving direction (FIG. 25). In FIG. 24, the transmission 12 is in the backward driving gear position, and therefore, an upward direction indicates a backward driving acceleration direction, while in the state of FIG. 25, the transmission 12 is in the forward driving gear position, and therefore, an upward direction indicates a forward diving acceleration direction. When the gear position is shifted between the forward driving gear position and the backward driving gear position, the rotational speed of the generator 11 is controlled while the gear shifting clutch is in an off-state so that the rotational speed conforms to the rotational speed at the time point when the gear shifting clutch is turned on after the gear shifting is completed, thereby relieving a gear shifting shock.

Figure 26:
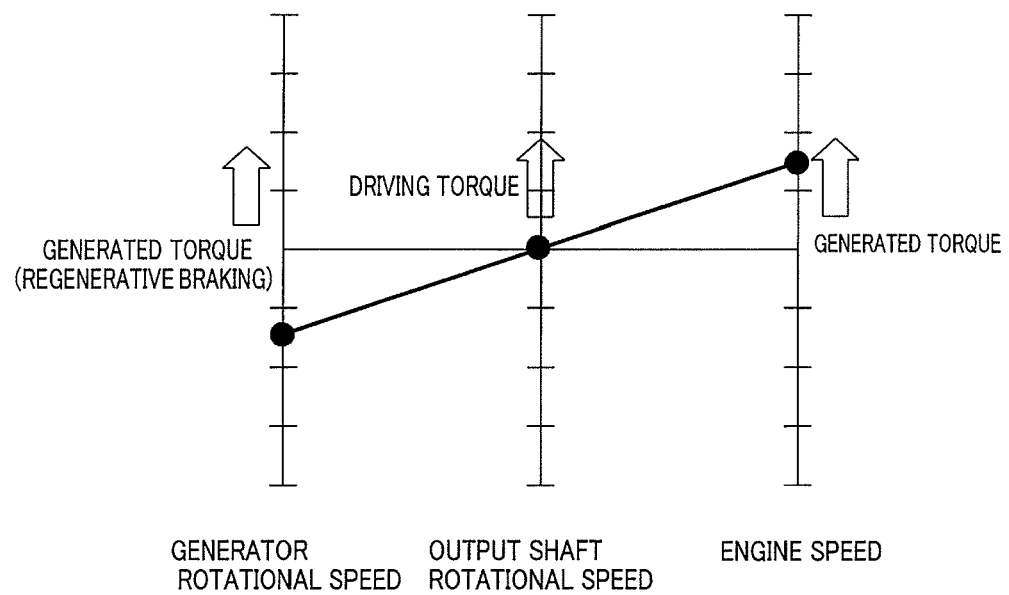
FIG. 26 is a velocity diagram of the epicyclic gearing during the switch back state.
Figure 27:
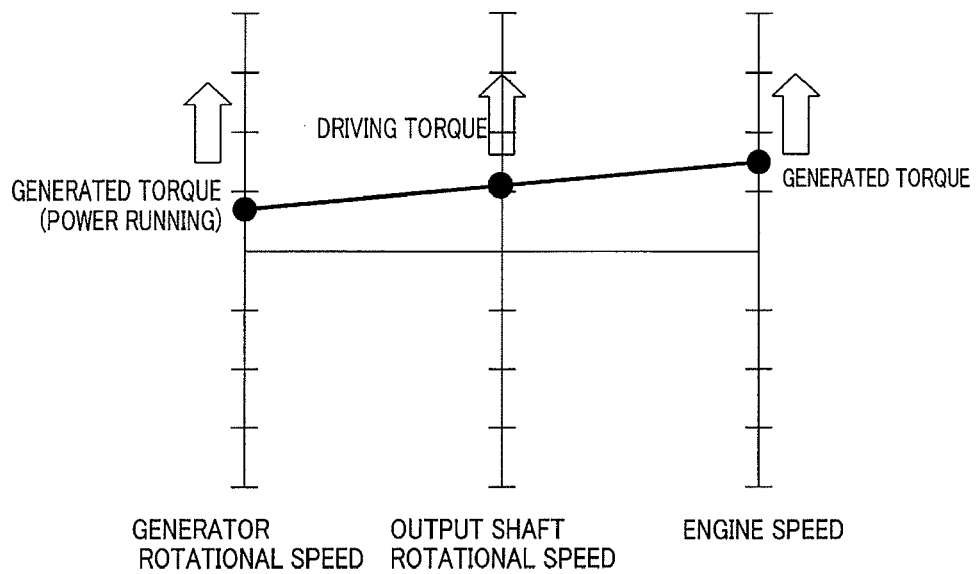
FIG. 27 is a velocity diagram of the epicyclic gearing during the switch back state.

When the shifting between the forward driving gear position and the backward driving gear position is completed, the generator 11 turns to the regenerative braking mode and the construction machine 1 is driving forward acceleratively while performing electric charging. Thereafter, the rotational speed of the generator 11 increases and transitions to the power running mode, as shown in FIGS. 26 and 27. During this, the controller 2 controls the engine 10 so that the engine 10 generates a torque which is required for the acceleration and matches well with the torque of the generator 11. As in the above case, the controller 2 controls the engine speed to control the regenerative electric power generation amount and the electric power consumption amount associated with the power running.

Figure 28:
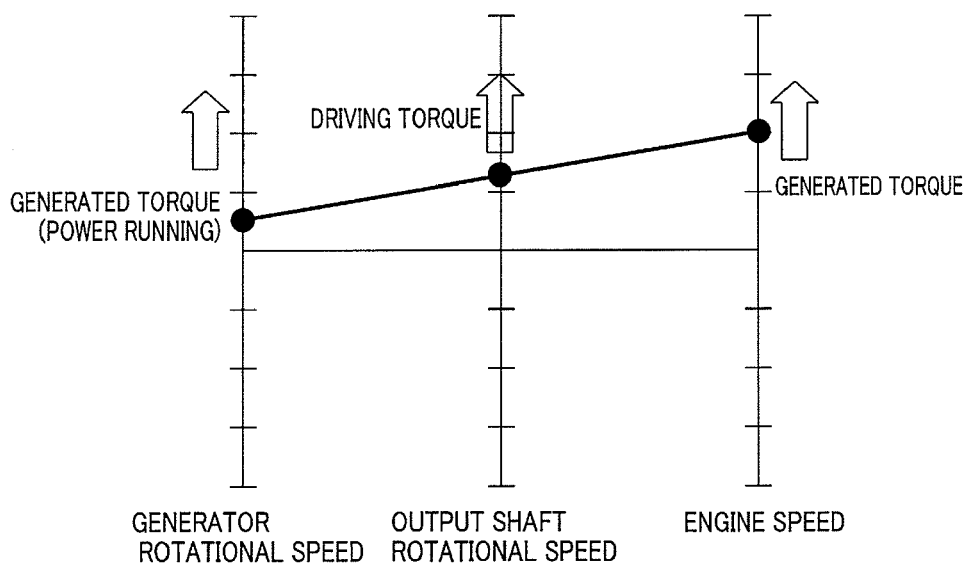
FIG. 28 is a velocity diagram of the epicyclic gearing during the switch back state.
Figure 29:
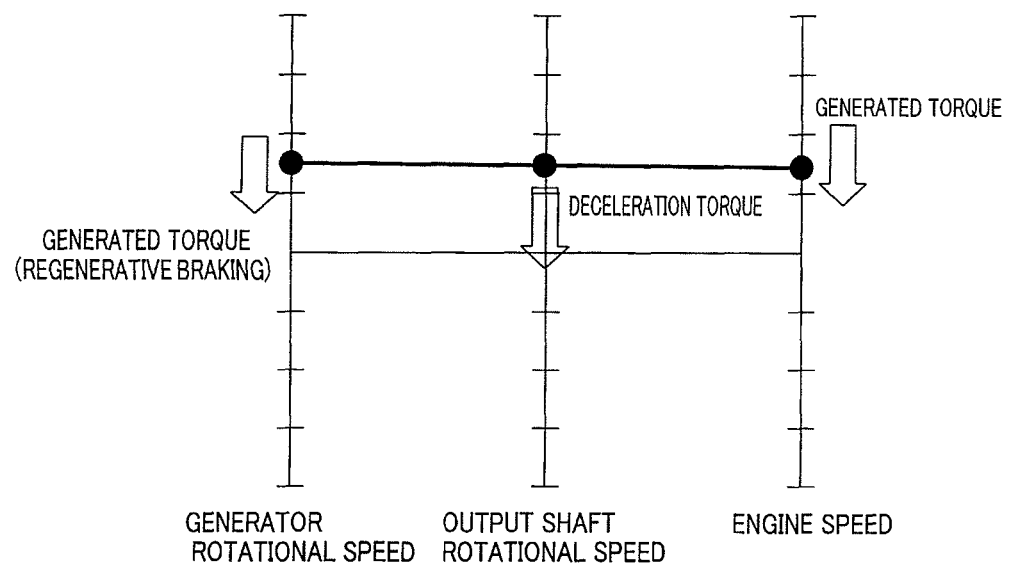
FIG. 29 is a velocity diagram of the epicyclic gearing during the switch back state.
Figure 30:
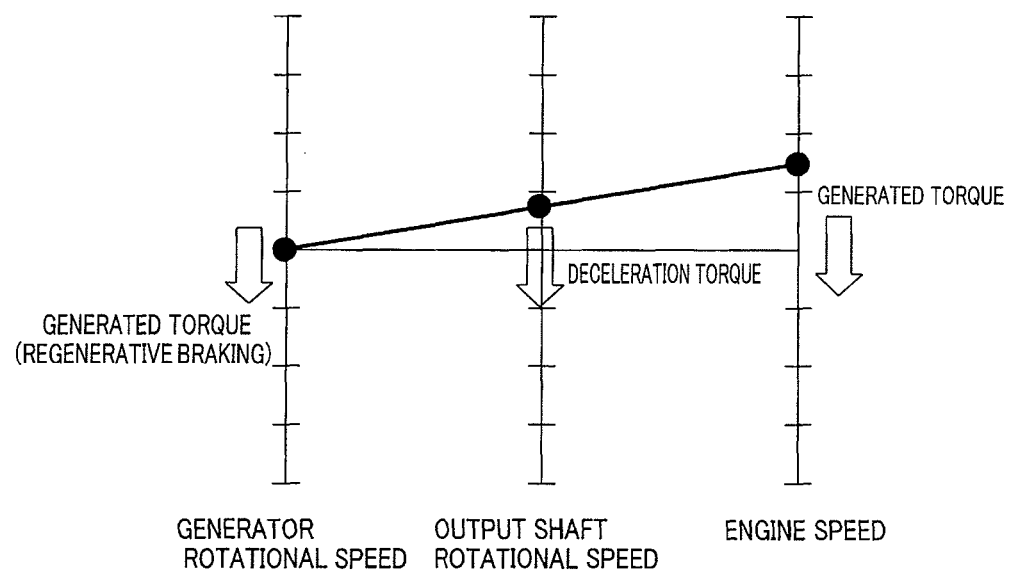
FIG. 30 is a velocity diagram of the epicyclic gearing during the switch back state.
Figure 31:
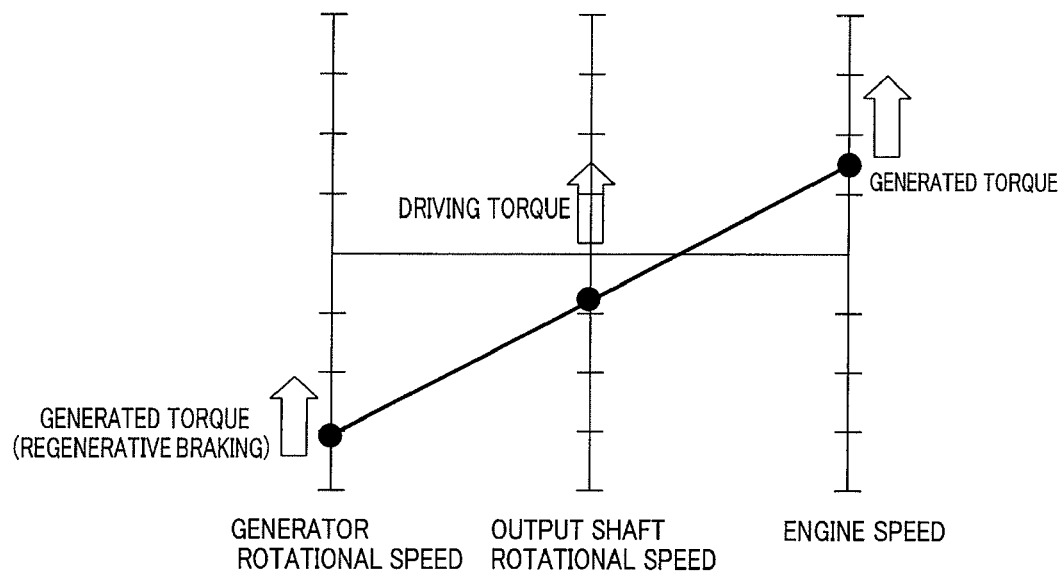
FIG. 31 is a velocity diagram of the epicyclic gearing during the switch back state.

Next, the second method will be described. FIG. 28 is a velocity diagram of the epicyclic gearing in the case where the transmission 2 is in the second gear position and the construction machine 1 is driving backward acceleratively or is driving backward at a constant speed. In this state, as shown in FIG. 28, the generator 11 is in the power running mode. In this state, when the machine operator operates the forward/backward driving lever to cause the construction machine 1 to drive forward, the controller 2 maintains the backward driving gear position, causes the engine 10 to decrease the engine speed, and causes the generator 11 to perform braking while generating the electric power in the regenerative braking mode (FIG. 29). The construction machine 1 continues to be decelerated while maintaining the above state, so that the speed is decreased to a considerable level as shown in FIG. 30. Thereafter, the controller 2 instructs the transmission 12 to shift the gear position to the forward driving gear position. As a result, as shown in FIG. 31, the construction machine 1 is accelerated in the forward driving direction.

Figure 32:
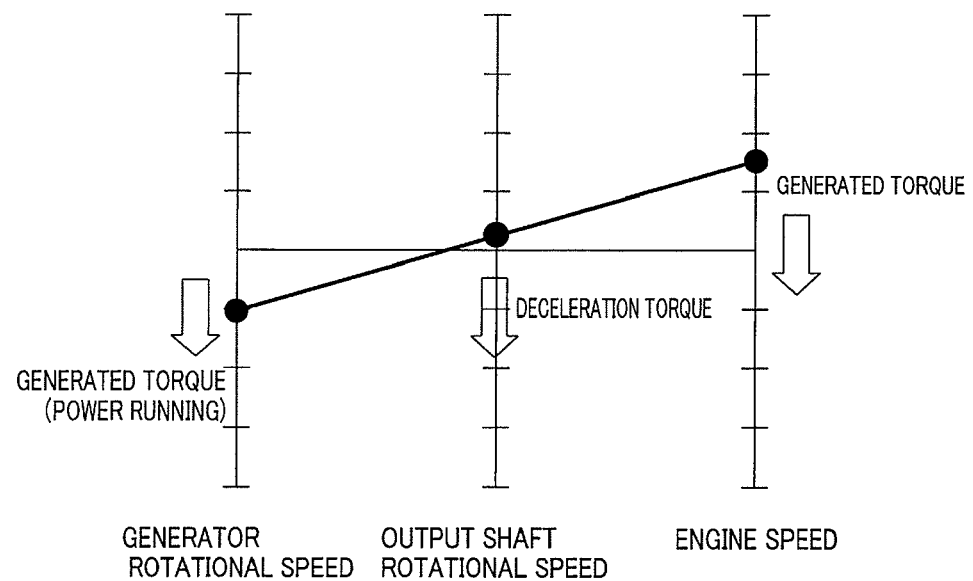
FIG. 32 is a velocity diagram of the epicyclic gearing during the switch back state.
Figure 33:
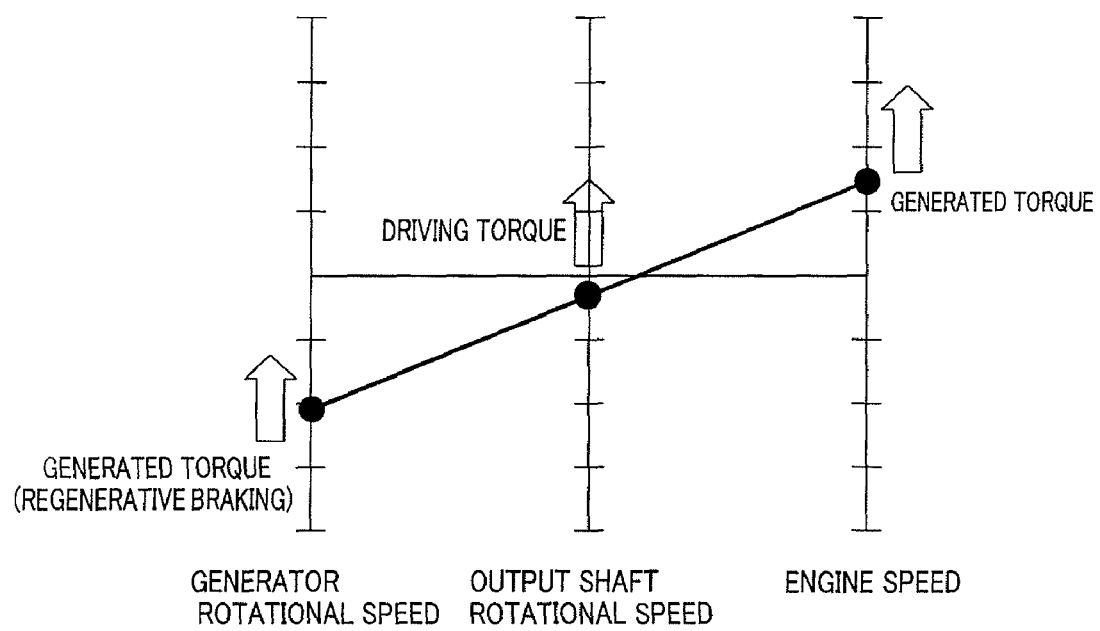
FIG. 33 is a velocity diagram of the epicyclic gearing during the switch back state.

As shown in FIGS. 32 to 33, the construction machine 1 is further decelerated in the state where the generator 11 is in the power running mode, the power running continues until the backward driving state transitions to the zero speed or the forward driving speed is reached, and then the gear position is shifted. This method is capable of lessening a mechanical load applied on the transmission 12.

In the case where the machine operator shifts the forward/backward driving lever during high-speed driving, the following takes place. If the shifting between the forward driving and backward driving is performed in the high-speed driving, the rotational speed of the generator 11 exceeds an allowable range. In the case of using the first method, normal regenerative deceleration occurs while the rotational speed of the generator 11 is in an allowable range, and thereafter shifting between the forward driving and the backward driving is performed. On the other hand, in the case of using the second method, shifting between the forward driving and the backward driving is performed after the speed is decreased to a considerable level, and therefore a problem will not arise.

In the case where the first method or the second method is used, the clutch is turned off and the deceleration diminishes once (torque free state), when the gear position is shifted during the deceleration, making the machine operator feel discomfort in steering. For this reason, the controller 2 outputs a mechanical brake command to the electronic control brake circuit 21 in the manner described above. Thus, the mechanical brake is auxiliarily used. As a result, even if the torque free state occurs when shifting between the forward driving and the backward driving, the machine operator can keep good steering feeling.

Subsequently, the driving characteristics of the construction machine 1 according to this embodiment in the case where the switch back occurs will be described with reference to FIGS. 34 to 38.

Figure 34:
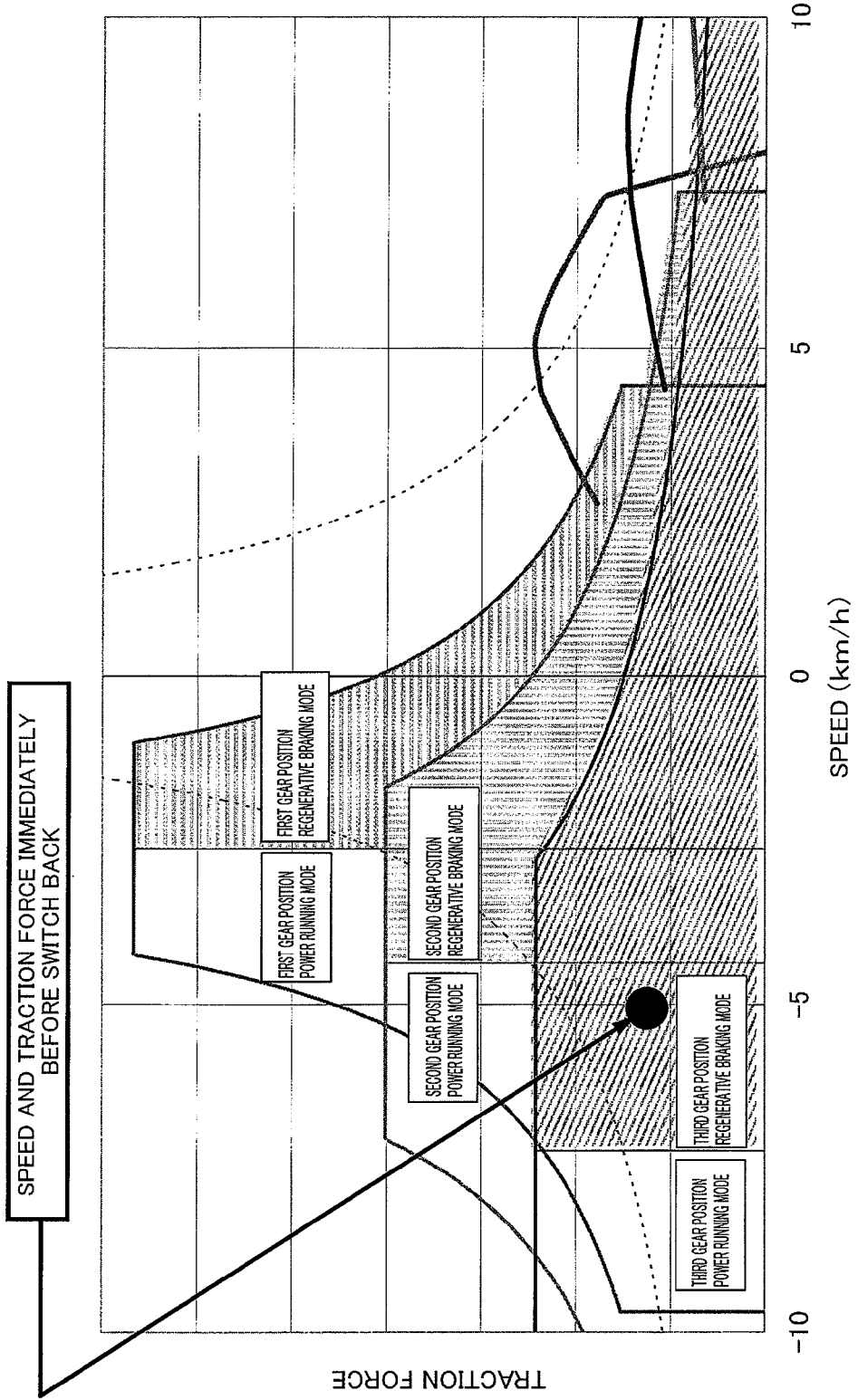
FIG. 34 is a driving characteristic view showing the relationship between a vehicle speed and a traction force in the construction machine according to Embodiment 1, in the case where switch back is performed according to a first method.
Figure 35:
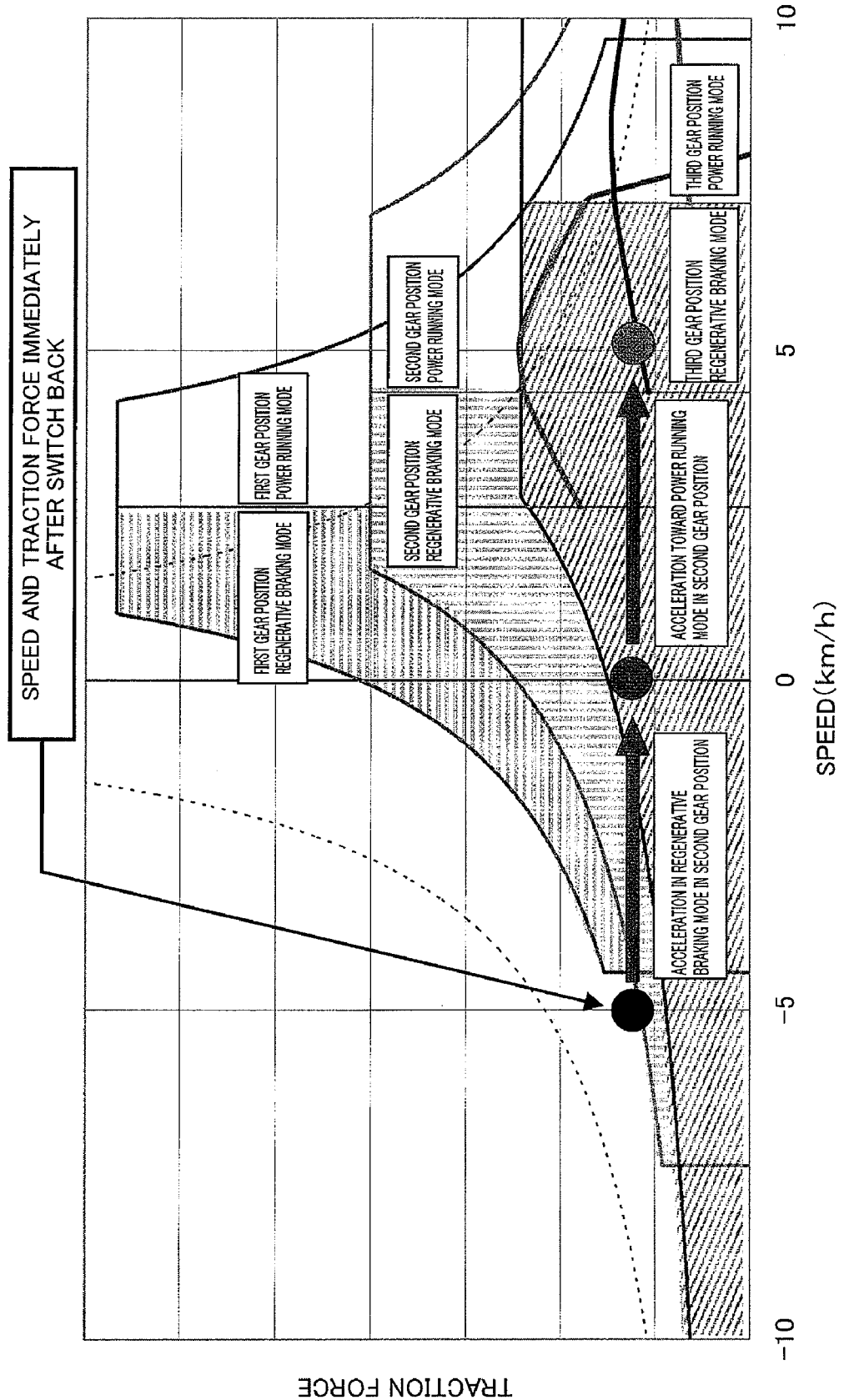
FIG. 35 is a driving characteristic view showing the relationship between the vehicle speed and the traction force in the construction machine according to Embodiment 1 of the present invention, in the case where switch back is performed according to the first method.

Initially, a case where the first method is used will be described. FIGS. 34 and 35 are driving characteristic views showing the relationship between the vehicle speed and the traction force in the construction machine 1 according to Embodiment 1, in the case where switch back is performed according to the first method. FIG. 34 shows the driving characteristics immediately before the switch back. FIG. 35 shows the driving characteristics in the case where the gear position is shifted to the forward driving gear position and the generator 11 transitions from the regenerative braking mode to the power running mode. FIG. 34 shows a case where the construction machine 1 is driving backward, and therefore the regenerative braking mode and the power running mode are reversed with respect to those of the forward driving.

The round symbol in FIG. 34 indicates the vehicle speed and traction force immediately before the switch back. Round symbols in FIG. 35 indicate the speed and the traction force immediately after the switch back and how the vehicle speed and the traction force transition in the case where the gear position is shifted to the forward driving gear position and the construction machine 1 is accelerated, under the state of the power running mode (−5 km/h) in the second gear position.

As can be seen from FIG. 35, since a great traction force is not generated because of the property of the generator 11 in the case where the gear position is shifted to the forward driving gear position, the traction force is smaller until the speed increases to a certain level (about +2 km/h in FIG. 35). However, after shifting to the forward driving gear position, the construction machine 1 can be accelerated while maintaining the second gear position. As a result, the machine operator can enjoy a good steering feeling.

Figure 36:
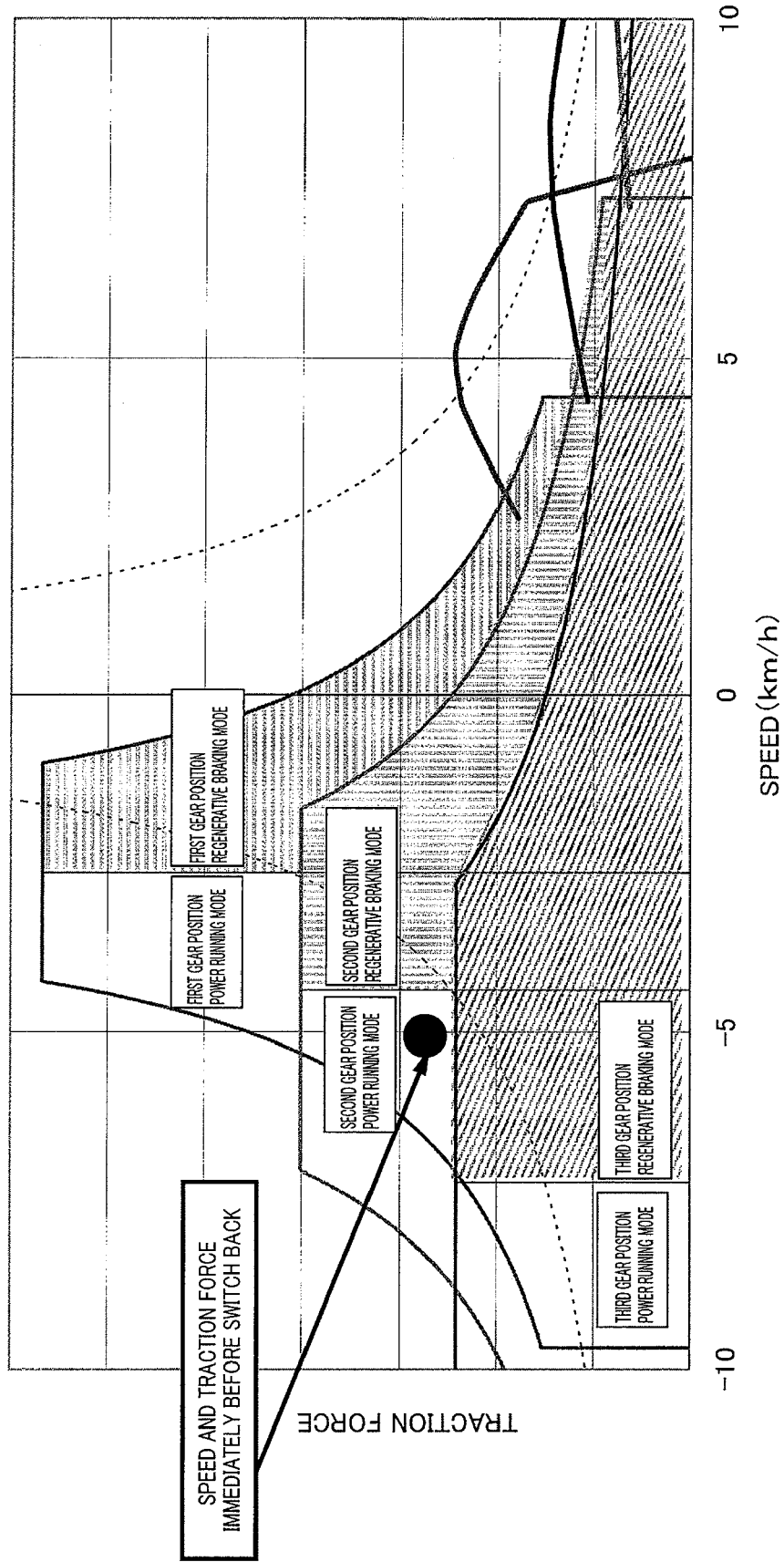
FIG. 36 is a driving characteristic view showing the relationship between the vehicle speed and the traction force in the construction machine according to Embodiment 1, in the case where switch back is performed according to a second method.
Figure 37:
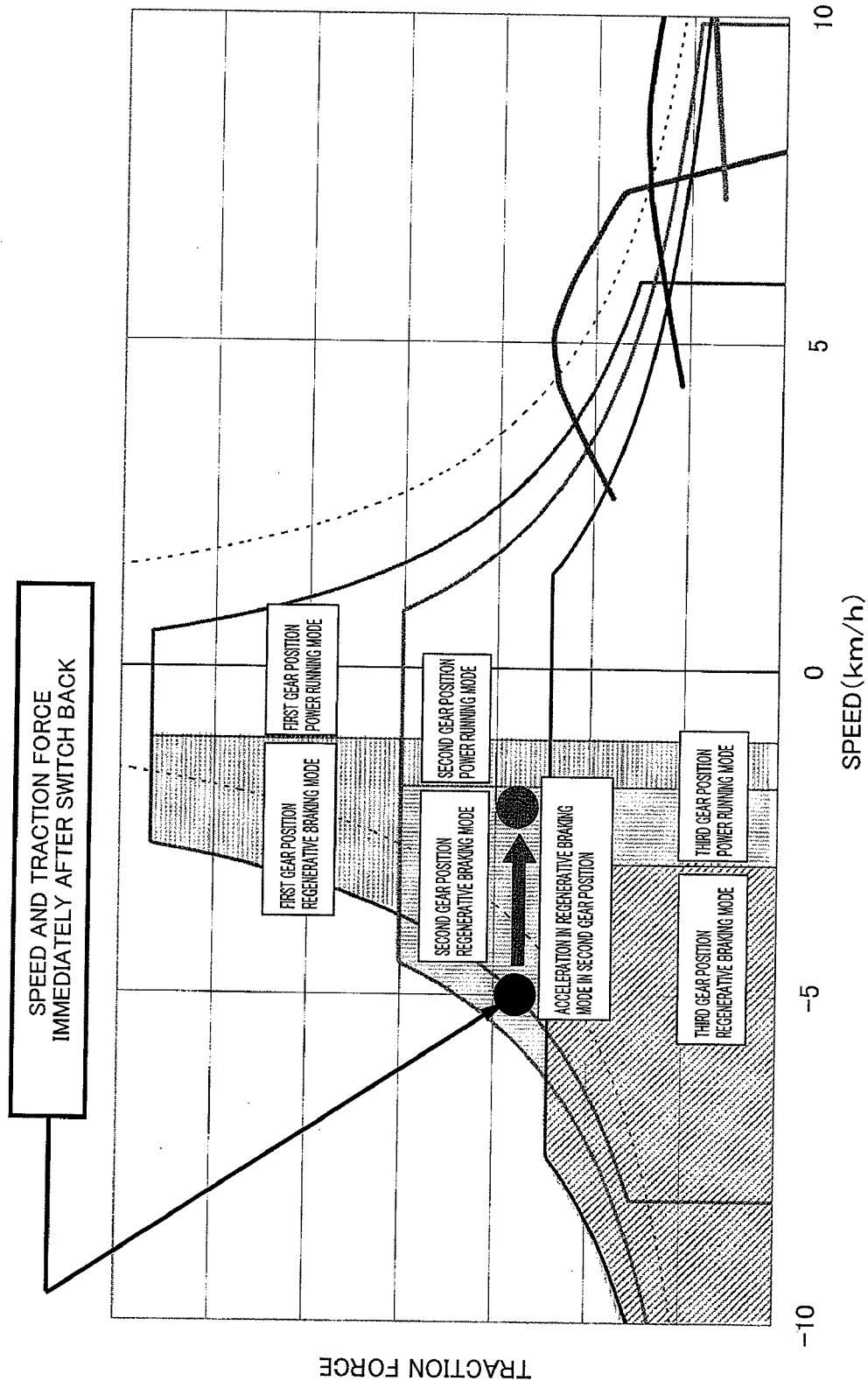
FIG. 37 is a driving characteristic view showing the relationship between the vehicle speed and the traction force in the construction machine according to Embodiment 1, in the case where switch back is performed according to the second method.
Figure 38:
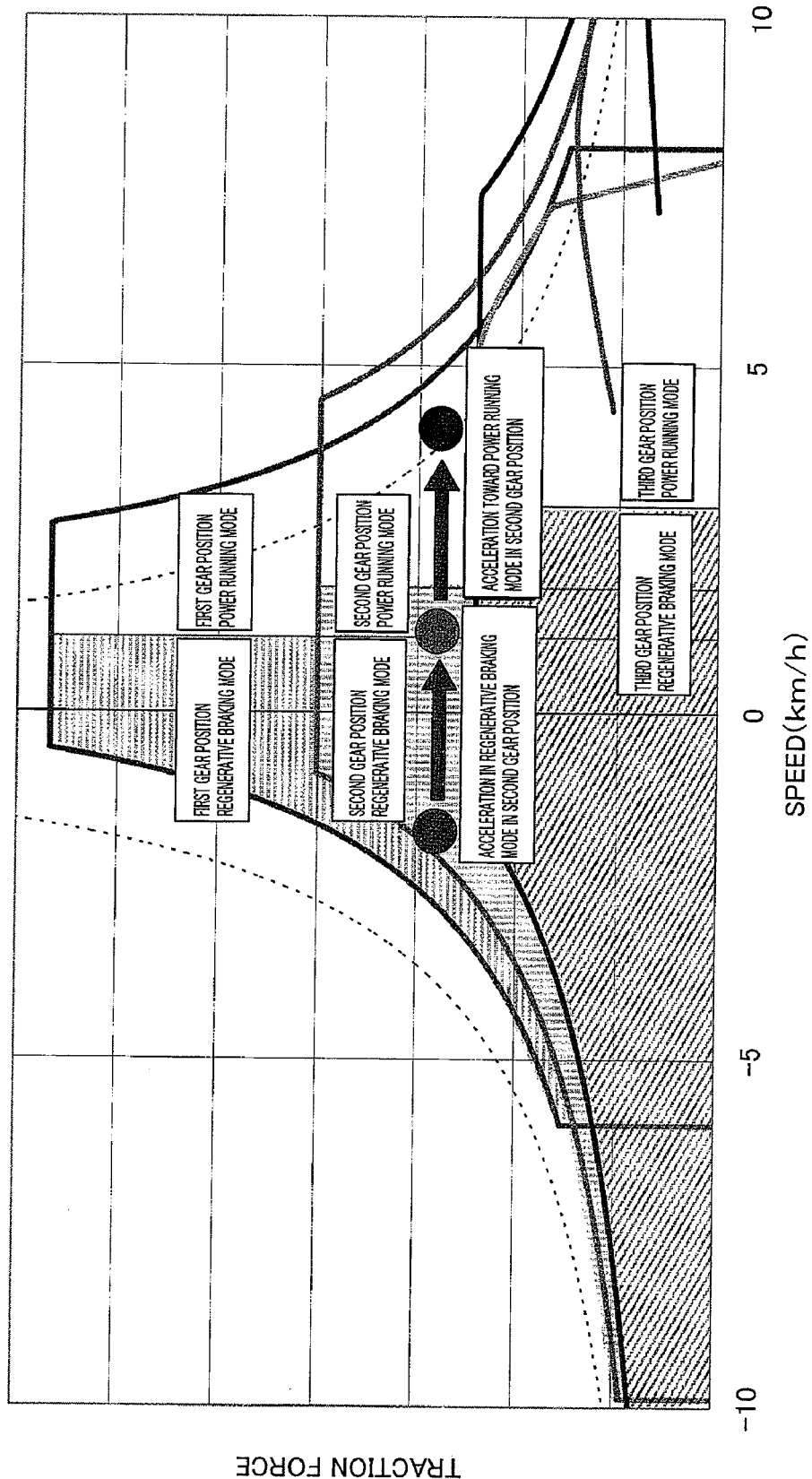
FIG. 38 is a driving characteristic view showing the relationship between the vehicle speed and the traction force in the construction machine according to Embodiment 1, in the case where switch back is performed according to the second method.

Next, a case where the second method is used will be described. FIGS. 36 to 38 are driving characteristic views showing the relationship between the vehicle speed and the traction force in the construction machine 1 according to Embodiment 1, in the case where switch back is performed according to the second method. FIG. 36 shows the driving characteristics immediately before the switch back. FIG. 37 shows the driving characteristics during a period that lapses immediately after the switch back is performed until the acceleration is performed by the regenerative braking of the generator 11. FIG. 38 shows the driving characteristics in the case where the gear position is shifted to the forward driving gear position, and the generator 11 transitions from the regenerative braking mode to the power running mode.

A round symbol in FIG. 36 indicates the vehicle speed and the traction force immediately before the switch back. Round symbols in FIG. 37 indicate the vehicle speed and traction force immediately after the switch back and how the speed and the traction force transition in the case in which the acceleration occurs without shifting of the gear position in the power running mode (−5 km/h) in the second gear position. In FIG. 38, round symbols indicate how the vehicle speed and the traction force transition in the case where the gear position is shifted to the forward gear position and the acceleration occurs in the regenerative braking mode in the second gear position. In FIGS. 36 and 37, the regenerative braking mode and the power running mode are reversed, because the acceleration directions are different although the gear positions are the same.

In the second method, the vehicle speed is decreased by the regenerative braking of the generator 11 without shifting of the gear position (FIG. 37). Thereafter, the gear position is shifted to the forward driving gear position, and the regenerative braking mode transitions to the power running mode (FIG. 38). As can be seen from FIGS. 34 to 38, in the second method, a great traction force can be obtained continuously unlike the first method.

The second method can attain a greater traction force than the first method. However, in the second method, the gear position is shifted from the backward driving gear position to the forward driving gear position while the construction vehicle 1 is accelerated forward (see change from FIG. 37 to FIG. 38). At this time, the torque free state occurs, degrading the operator's steering feeling. As a solution to this, the electronically-controlled brake may be used as described above.

In the manner as described above, the construction machine 1 is able to drive while repeating electric charging and discharging within a range of a limited electric capacitance of the electricity accumulator 14. In the case of a huge construction machine such as the wheel loader, the generator is required to have great electric charging and discharging capability. At present, the electricity accumulator which has a high input/output density has a low energy density and has a limited electric capacitance as in the capacitors. The present invention is well suited to the case where the electricity accumulator having a high input/output density and a low energy density as in the capacitors.

Embodiment 2

A construction machine according to Embodiment 2 is configured to include a one-way clutch for inhibiting reverse rotation of the output shaft of the engine 10 which is incorporated into the construction machine 1 of Embodiment 1.

In the construction machine 1 of Embodiment 1, if the situation where a great traction force is needed at a low speed, for example, pulling of heavy objects or driving up along a steep ground, continues, the gear position turns to the first gear position and the engine speed is decreased, so that the generator 11 turns to the regenerative braking mode. If the electricity amount in the electricity accumulator 14 reaches the upper limit in this situation, the construction machine 1 is unable to continue driving unless it is capable of consuming generated electric power. The fact that the construction machine 1 is unable to continue driving if the electricity amount reaches the upper limit corresponds to overheating of torque converter oil in the case of the conventional torque converter equipped vehicle. To solve this problem, a construction machine of Embodiment 2 includes the one-way clutch as described below.

Figure 39:
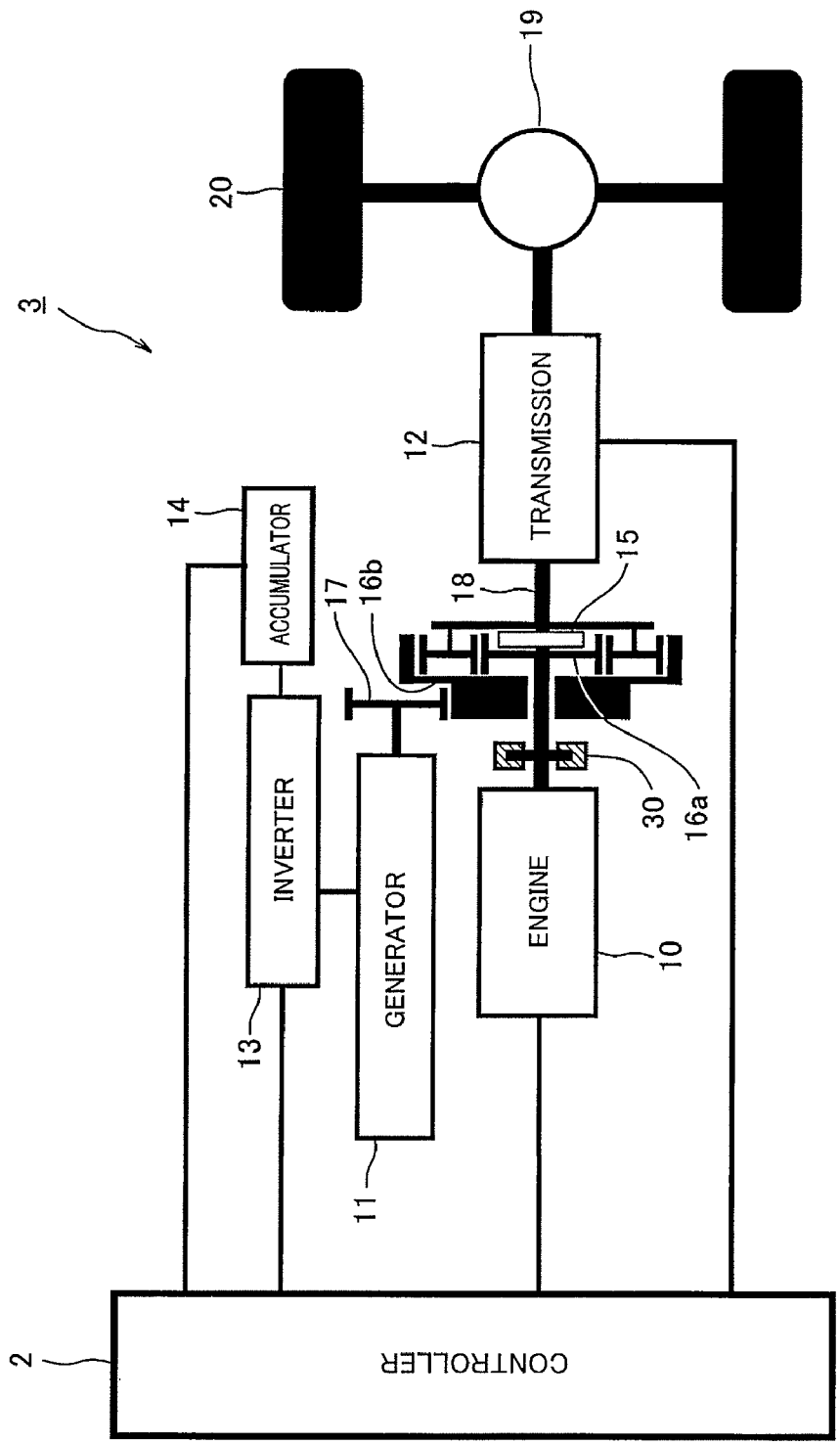
FIG. 39 is a block diagram showing a configuration of main components of a construction machine according to Embodiment 2 of the present invention.

FIG. 39 is a block diagram showing a configuration of main components of the construction machine according to Embodiment 2 of the present invention. Turning to FIG. 39, a construction machine 3 of Embodiment 2 includes a one-way clutch 30 attached to the output shaft of the engine 10 to inhibit the reverse rotation of the output shaft. The controller 2 is configured to stop the engine 10 and perform driving using only the generator 11 if the electricity amount in the electricity accumulator 14 reaches the upper limit as described above. Thus, the electricity stored in the electricity accumulator 14 is consumed. At this time, the one-way clutch 30 serves to inhibit the reverse rotation of the engine 10. This makes it possible to avoid an event that the engine 10 is rotating reversely and generates no driving force during the driving using the generator 11.

The constituents other than the one-way clutch 30 are identical to those of Embodiment 1. Therefore, they are identified by the same reference numerals and will not be further described.

Figure 40:
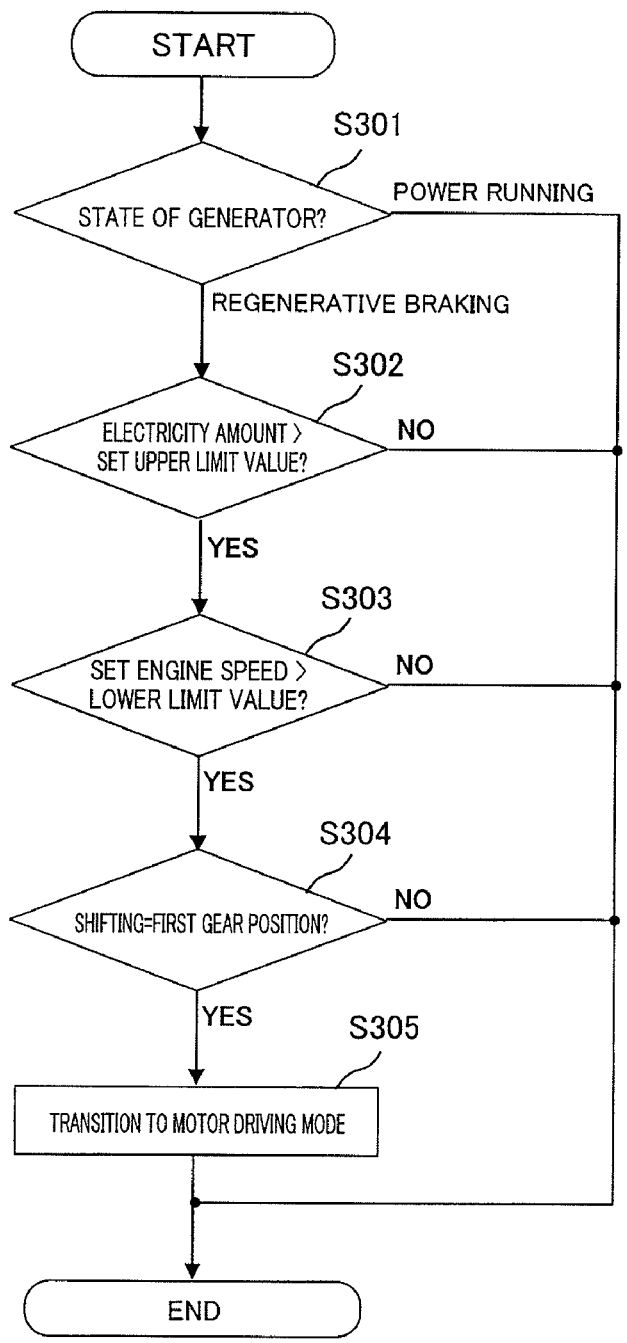
FIG. 40 is a flowchart showing a flow of the operation of a controller according to Embodiment 2 in the case where the driving mode is shifted.
Figure 41:
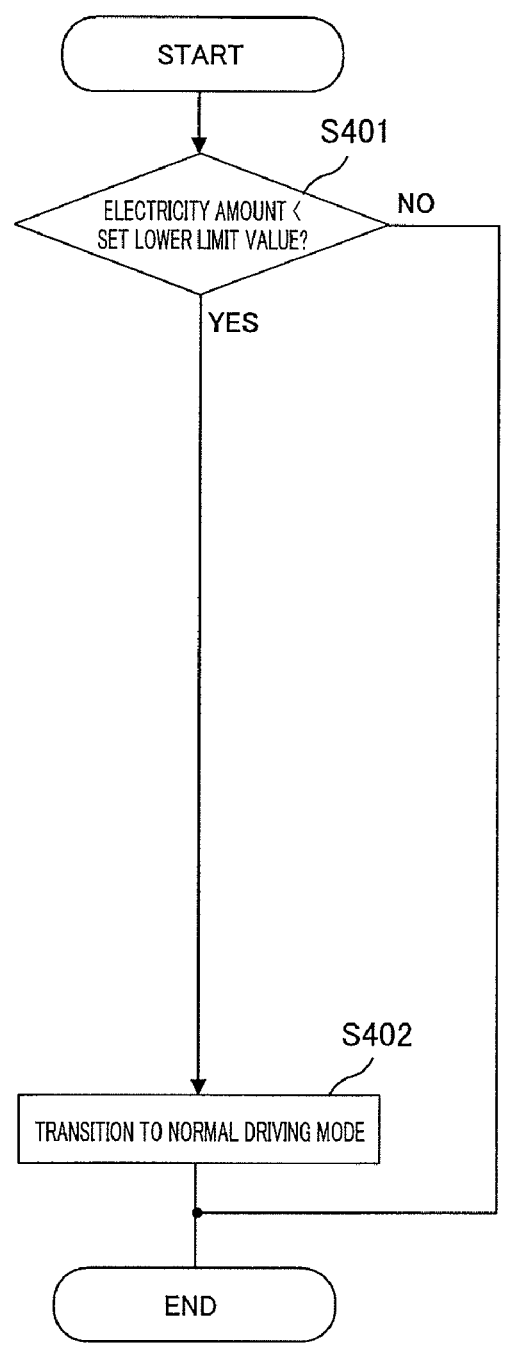
FIG. 41 is a flowchart showing a flow of the operation of the controller according to Embodiment 2 in the case where the driving mode is shifted.

FIGS. 40 and 41 are flowcharts showing a flow of the operation of the controller 2 according to Embodiment 2 in the case where a driving mode is shifted. Hereinafter, the driving mode using the engine 10 and the generator 11 is referred to as a "normal driving mode" and the driving mode using only the generator 11 is referred to as a "motor driving mode".

Initially, the process for determining whether or not to transition from the normal driving mode to the motor driving mode will be described. Turning to FIG. 40, the controller 2 determines (S301) whether the generator 11 is in the power running mode ("NO") or in the regenerative braking mode ("YES"). If it is determined that the generator 11 is in the regenerative braking mode (YES in S301), the controller 2 determines whether or not the electricity amount in the electricity accumulator 14 is larger than a set upper limit value (S302). If it is determined that the electricity amount is larger than the set upper limit value (YES in S302), i.e., the electricity amount is in excess, the controller 2 determines whether or not the set engine speed is lower than a predetermined lower limit value (S303).

If it is determined that the set engine speed is lower than the lower limit value in step S303 (YES in S303), the controller 2 determines whether or not the gear position of the transmission 12 is the first gear position (S304). If it is determined that the gear position is the first gear position (YES in S304), the controller 2 executes transition from the normal driving mode to the motor driving mode (S305). The transition to the motor driving mode is executed in such a manner that the controller 2 stops the engine 10 and sets the engine torque command to zero.

If it is determined that the generator 11 is in the power running mode in step S301 (NO in S301), if it is determined that the electricity amount is not larger than the set upper limit value in step S302 (NO in S302), if it is determined that the set engine speed is not lower than the lower limit value in step S303 (NO in S303), and if it is determined that the gear position is not the first gear position in step S304 (NO in S304), the controller 2 does not execute transition to the motor driving mode.

Subsequently, the process for determining whether or not to return the driving mode from the motor driving mode to the normal driving mode will be described. Turning to FIG. 41, the controller 2 determines whether or not the electricity amount in the electricity accumulator 14 is smaller than the set lower limit value (S401). If it is determined that the electricity amount is smaller than the set lower limit value (YES in S401), i.e., the electricity amount is deficient, the controller 2 executes transition from the motor driving mode to the normal driving mode (S402). The return to the normal driving mode is executed in such a manner that after stopping the construction machine 1, the controller 12 sets the transmission 12 in a neutral position, starts the engine 10 and shifts the gear position of the transmission 12.

Figure 42:
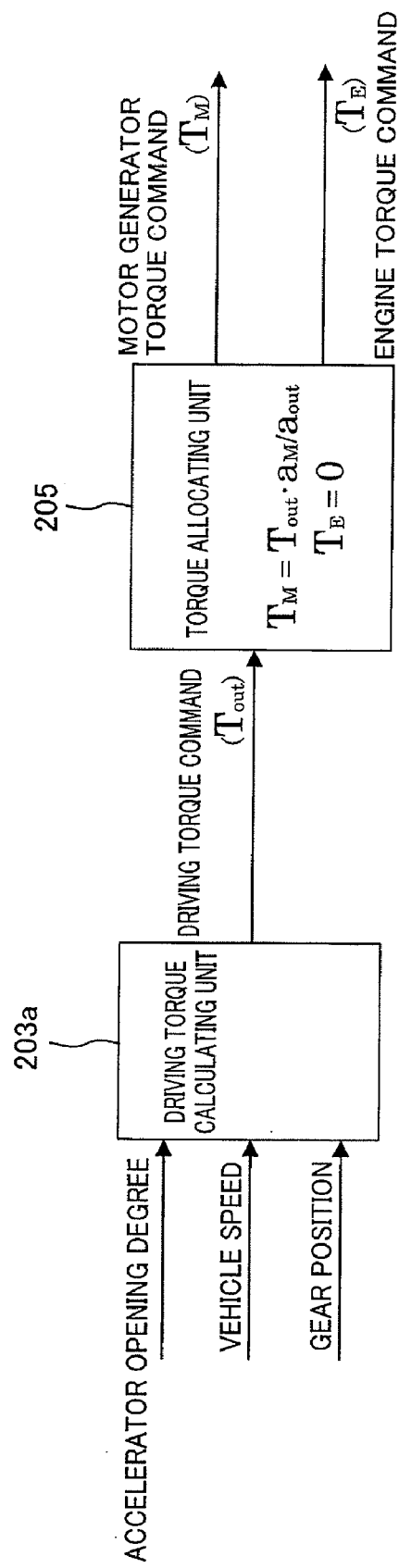
FIG. 42 is a view showing an example of a calculation process of a motor/generator torque command and an engine torque command which is executed by a torque allocating unit.

FIG. 42 is a view showing an example of the calculation process of the motor/generator torque command and the engine torque command which is executed by the torque allocating unit 205. As shown in FIG. 42, the driving torque calculating unit 203a calculates the torque required for driving based on the accelerator opening degree, the vehicle speed, and the gear position, and outputs to the torque allocating unit 205 the calculated value indicating the driving torque command (Tout).

Receiving the driving torque command (Tout), the torque allocating unit 205 calculates $T_M = T_{out} \cdot a_M/a_{out}$ and $T_E = 0$, and outputs the calculated values indicating the motor/generator torque command (T$_M$) and the engine torque command (T$_E$) to the generator 11 and the engine 10, respectively.

Figure 43:
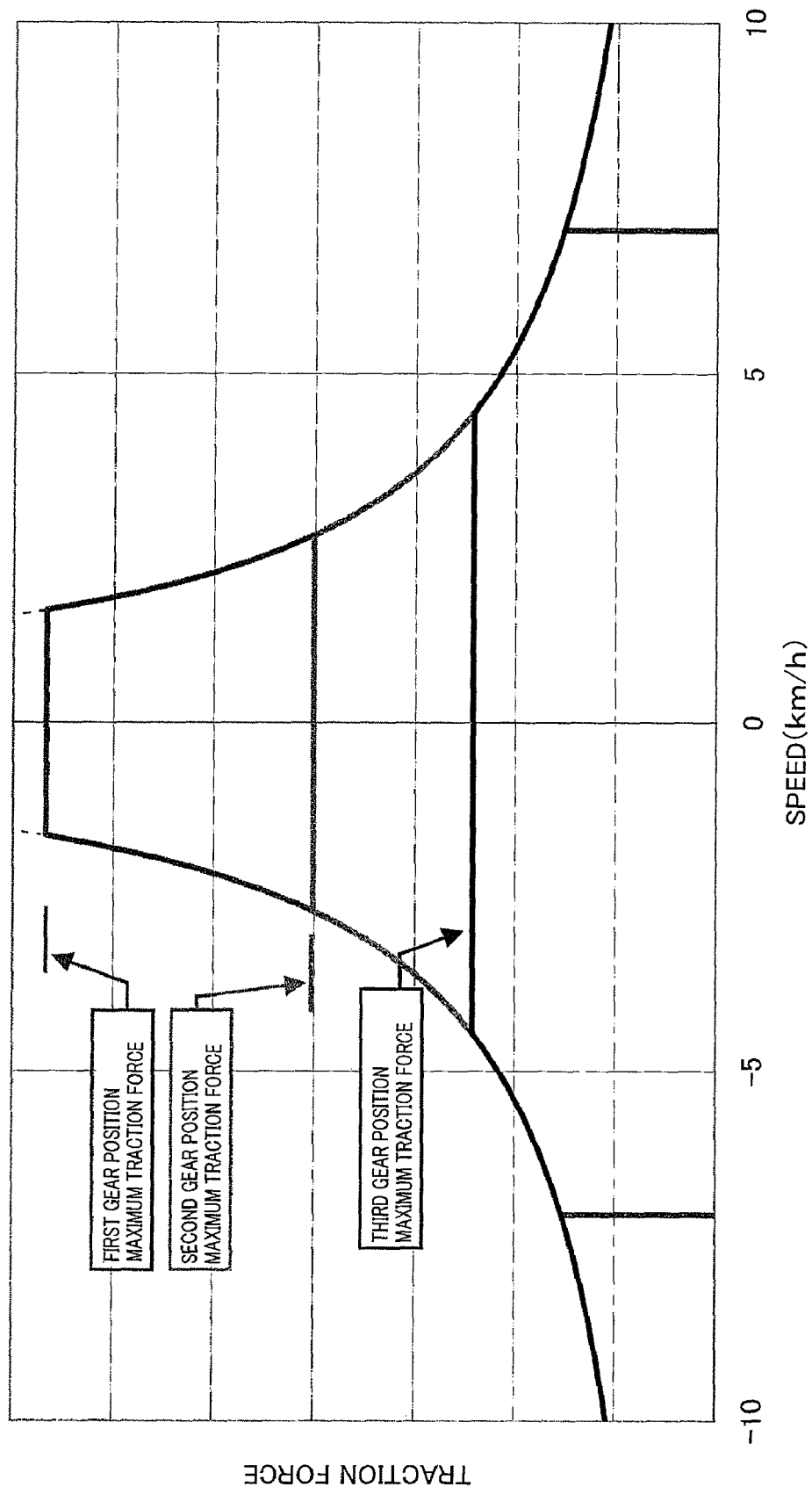
FIG. 43 is a driving characteristic view showing the relationship between the vehicle speed and the traction force in the construction machine according to Embodiment 1, in a motor driving mode.

The relationship between the vehicle speed and the traction force in the motor driving mode, i.e., the engine 10 is stopped and the power running is performed using only the generator 11, is shown in FIG. 43. This corresponds to the driving characteristics of the generator 11 itself. It should be noted that the power running can occur only in the forward driving direction when the gear position is the forward driving gear position, while the power running can occur only in the backward driving direction when the gear position is the backward driving gear position.

Embodiment 3

Figure 44:
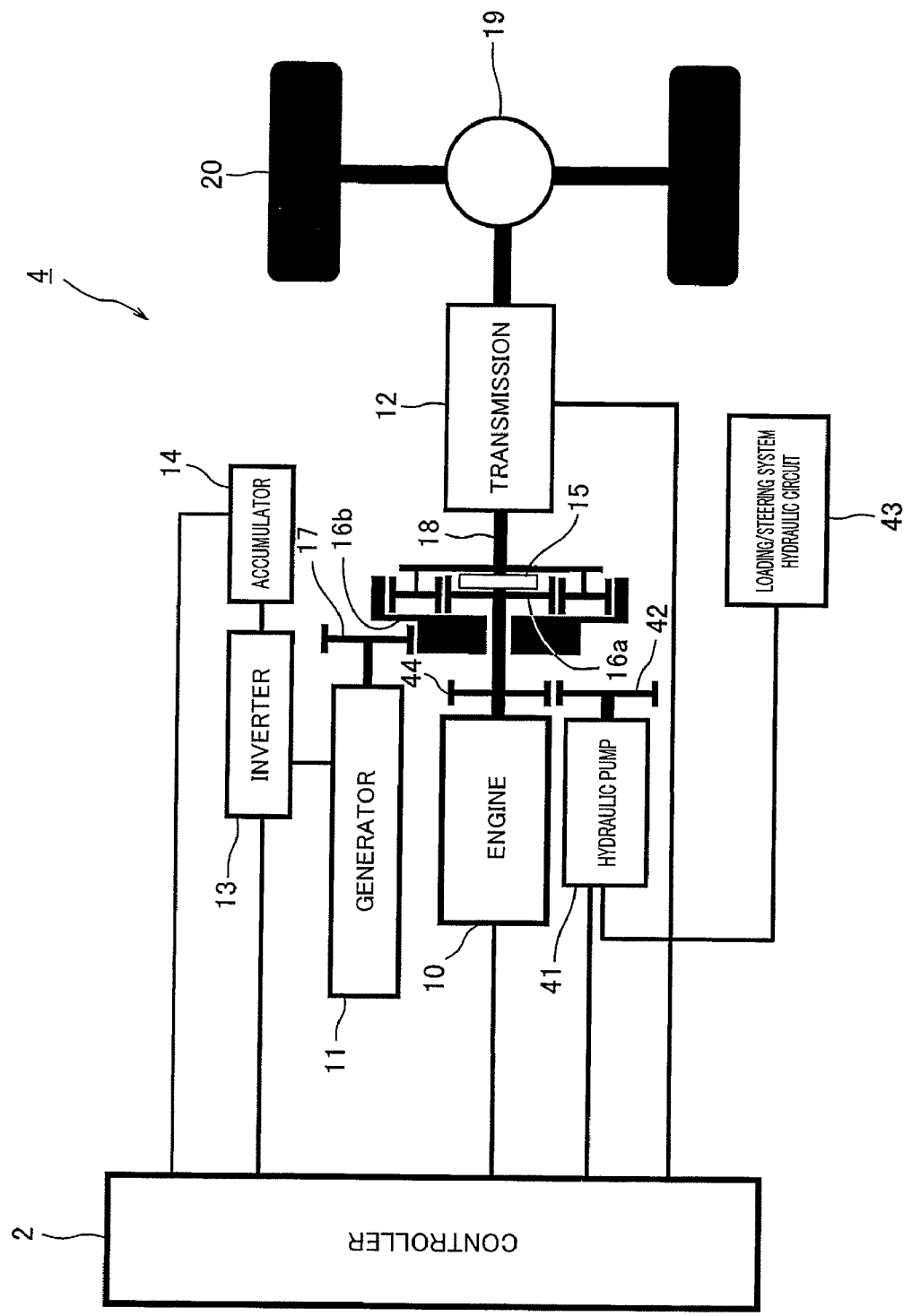
FIG. 44 is a block diagram showing a configuration of main components of a construction machine according to Embodiment 3 of the present invention.

FIG. 44 is a block diagram showing a configuration of main components of a construction machine according to Embodiment 3 of the present invention. Turning to FIG. 44, a construction machine 4 according to this embodiment includes a hydraulic pump 41 for driving a loading system including loading devices such as a bucket and an arm, and a loading/steering system hydraulic circuit 43 for actuating the hydraulic pump 41. The hydraulic pump 41 and the engine 10 are directly coupled to each other by gears 42 and 44. The other constituents are identical to those of Embodiment 1. Therefore, they are referenced by the same reference numerals and will not be further described.

Figure 45:
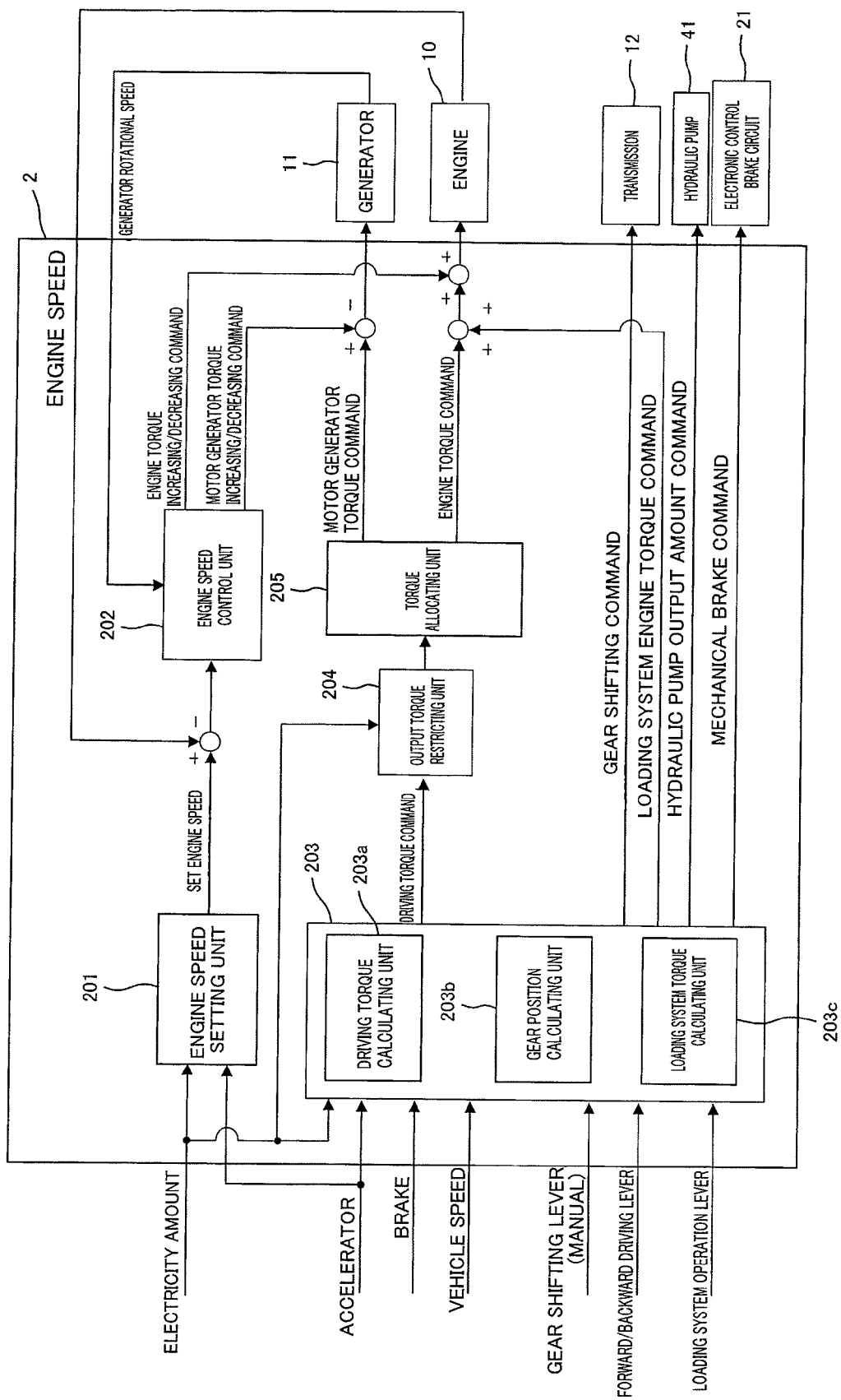
FIG. 45 is a functional block diagram showing a configuration of a controller included in the construction machine according to Embodiment 3.

FIG. 45 is a functional block diagram showing a configuration of the controller 2 included in the construction machine 4 according to Embodiment 3. Turning to FIG. 45, a calculating unit 203 includes a loading system torque calculating unit 203c. The loading system torque calculating unit 203c calculates a torque required for the hydraulic pump 41, and outputs the calculated value indicating a loading system engine torque command. The output loading system engine torque command is added to the engine torque command output from the torque allocating unit 205 and the resulting command is output to the engine 10. The other configuration of the controller 2 is identical to that of Embodiment 1 and will not be further described.

Figure 46:
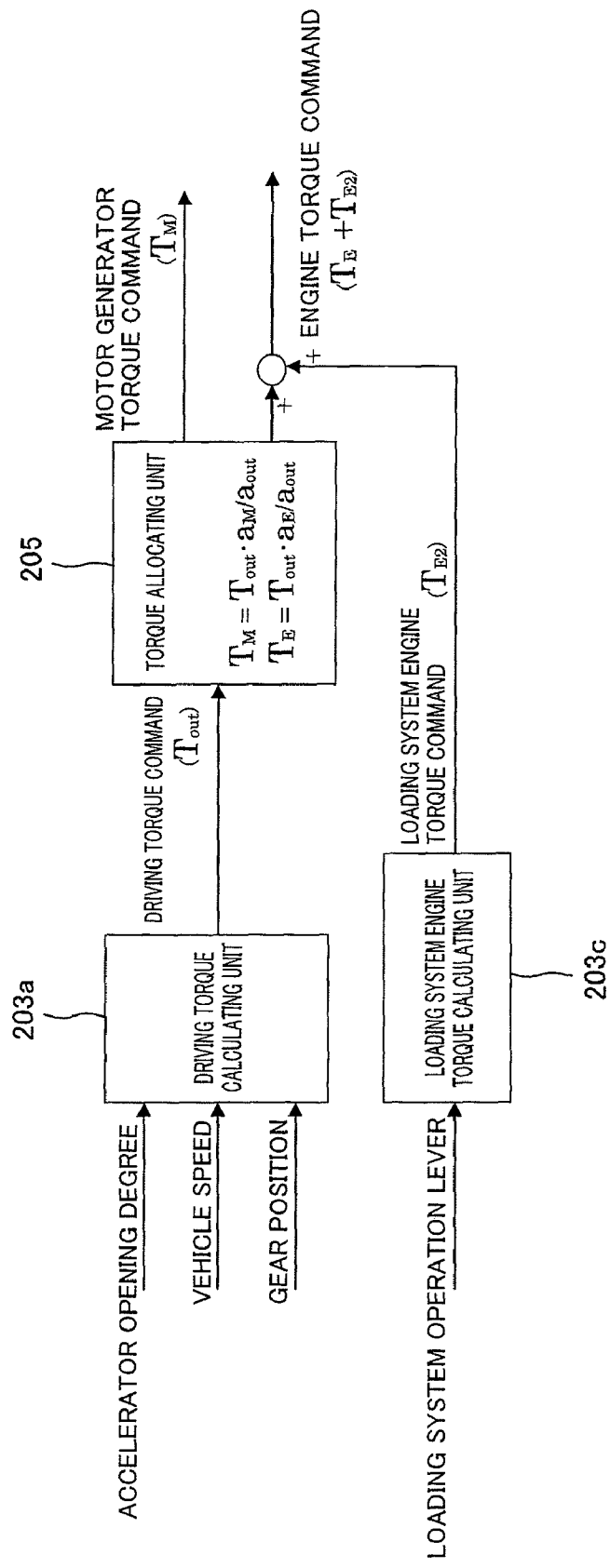
FIG. 46 is a view showing an example of the calculation process of the motor/generator torque command and the engine torque command which is executed by the torque allocating unit.

FIG. 46 is a view showing an example of the calculation process of the motor/generator torque command and the engine torque command which is executed by the torque allocating unit 205. As shown in FIG. 46, the driving torque calculating unit 203a calculates the torque required for driving based on the accelerator opening degree, the vehicle speed, and the gear position, and outputs the calculated value indicating the driving torque command (Tout) to the torque allocating unit 205.

Receiving the driving torque command (Tout), the torque allocating unit 205 calculates T$_M$=Tout·a$_M$/aout and T$_E$=Tout·a$_E$/aout, and outputs the calculated values indicating the motor/generator torque command (T$_M$) and the engine torque command (T$_E$) to the generator 11 and the engine 10, respectively.

The loading system engine torque calculating unit 203c calculates a torque T$_E$2 which is required by the hydraulic pump 41, and outputs the calculated value indicating a loading system engine torque command (T$_E$2). The loading system engine torque command (T$_E$2) is added to the engine torque command (T$_E$). The resulting engine torque command (T$_E$+T$_E$2) is output to the engine 10. Although not shown, a pump output amount is calculated and output to the hydraulic pump 41, while the pump output amount is used to calculate the torque required for the hydraulic pump 41.

In accordance with the present invention, the construction machine 4 drives under the condition in which the engine torque and the motor/generator torque are kept in a well-balanced manner. For this reason, in the case where the load is applied to the hydraulic pump 41 which is directly coupled to the engine shaft, it is necessary that the engine torque (T$_E$) necessary for the driving system and the loading system engine torque (T$_E$2) required for the loading system be added to determine the engine torque (T$_E$+T$_E$2).

In the case where the engine torque (T$_E$+T$_E$2) is beyond the torque which is capable of being generated by the engine 10, the controller 2 sets the engine torque (T$_E$) and the loading system engine torque (T$_E$2) according to a predetermined priority of the driving system and the loading system. The controller 2 calculates back the driving torque command (Tout) from the set value of the engine torque (T$_E$) and the set value of the loading system engine torque (T$_E$2) and corrects the motor/generator torque command. This makes it possible to avoid the interference between the driving system and the loading system. The priority may be set by the machine operator's operation of a lever or the like.

Embodiment 4

Figure 47:
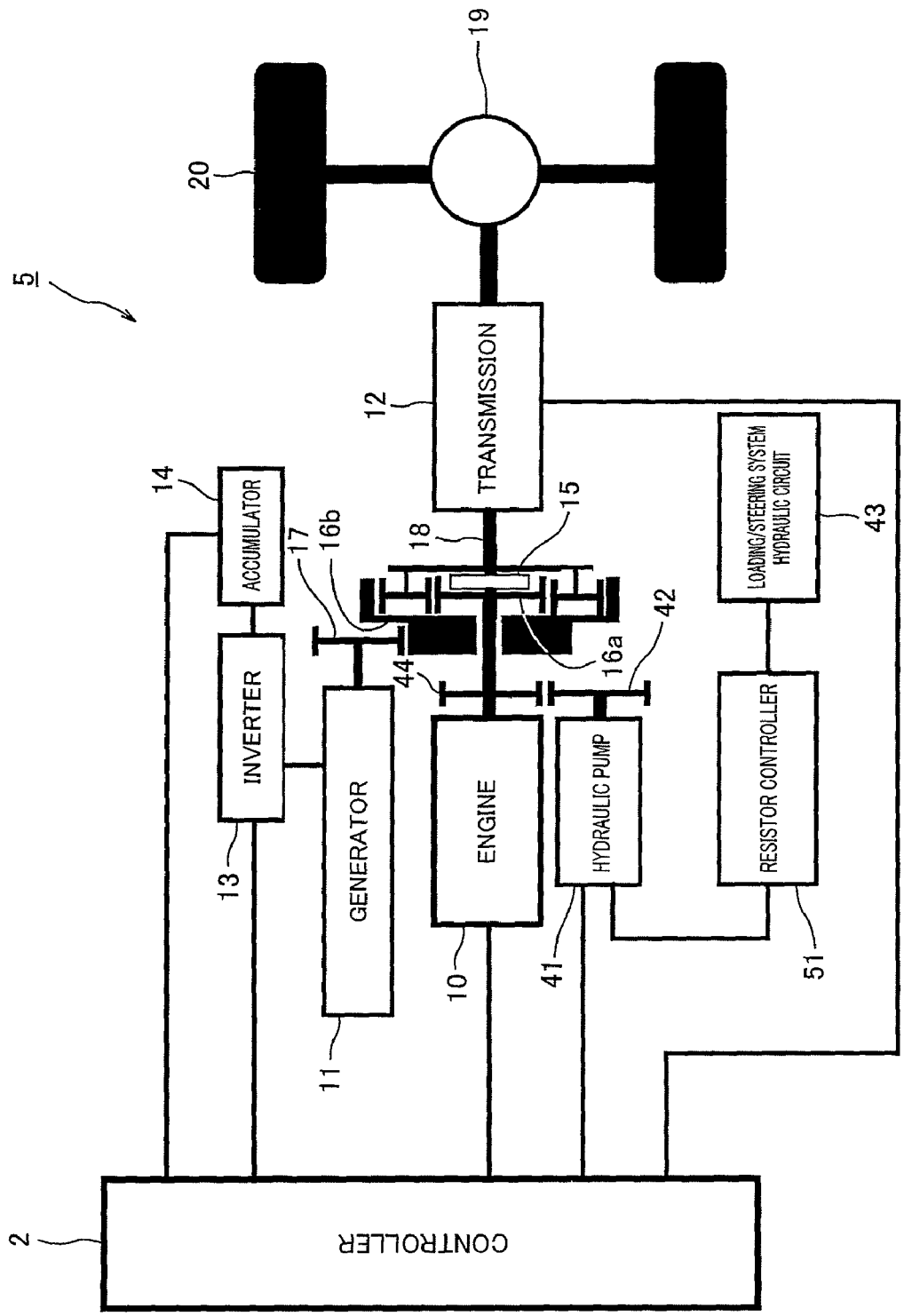
FIG. 47 is a block diagram showing a configuration of main components of a construction machine according to Embodiment 4 of the present invention.

FIG. 47 is a block diagram showing a configuration of main components of a construction machine according to Embodiment 4 of the present invention. Turning to FIG. 47, a construction machine 5 of this embodiment includes a resistor controller 51 between the hydraulic pump 41 and the loading/steering system hydraulic circuit 43. The resistor controller 51 is configured to cause the hydraulic pump 41 to serve as a resistor as described later. The other constituents are identical to those of Embodiment 3. Therefore, they are identified by the same reference numerals and will not be further described.

Figure 48:
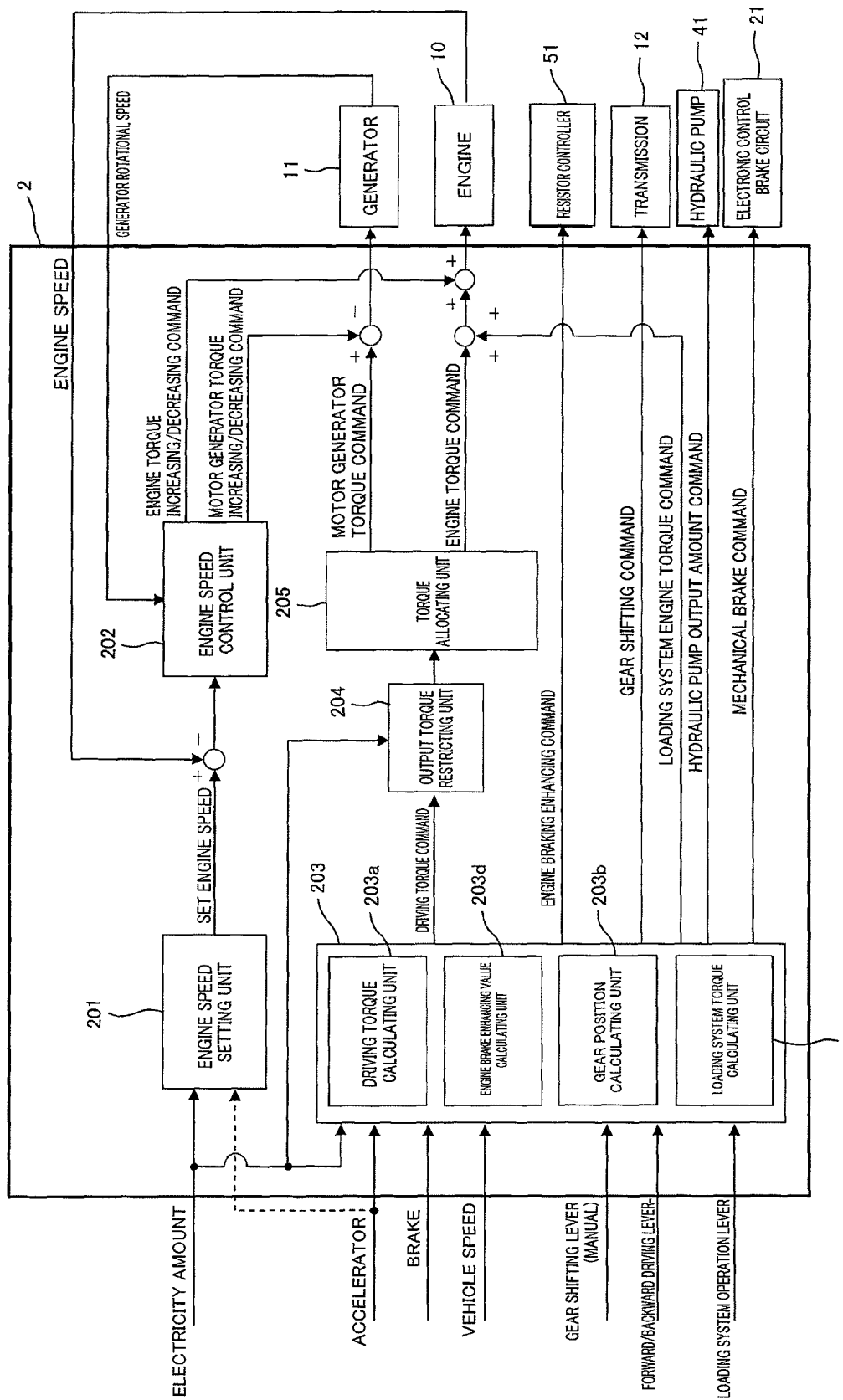
FIG. 48 is a functional block diagram showing a configuration of a controller included in the construction machine according to Embodiment 4.

FIG. 48 is a functional block diagram showing a configuration of the controller 2 included in a construction machine according to Embodiment 4. Turning to FIG. 48, the calculating unit 203 includes an engine brake enhancing value calculating unit 203d. The engine brake enhancing value calculating unit 203d calculates a desired engine brake value, and outputs to the resistor controller 51 the calculated value indicating an engine brake enhancing value command. Based on the received engine brake enhancing command, the resistor controller 51 combines the power output amount of the hydraulic pump 41, the electronically-controlled relief valve, and others, and causes the hydraulic pump 41 to operate as the resistor (engine braking enhancing device). The other constituents are identical to those of Embodiment 1. Therefore, they are identified by the same reference numerals and will not be further described.

Figure 49:
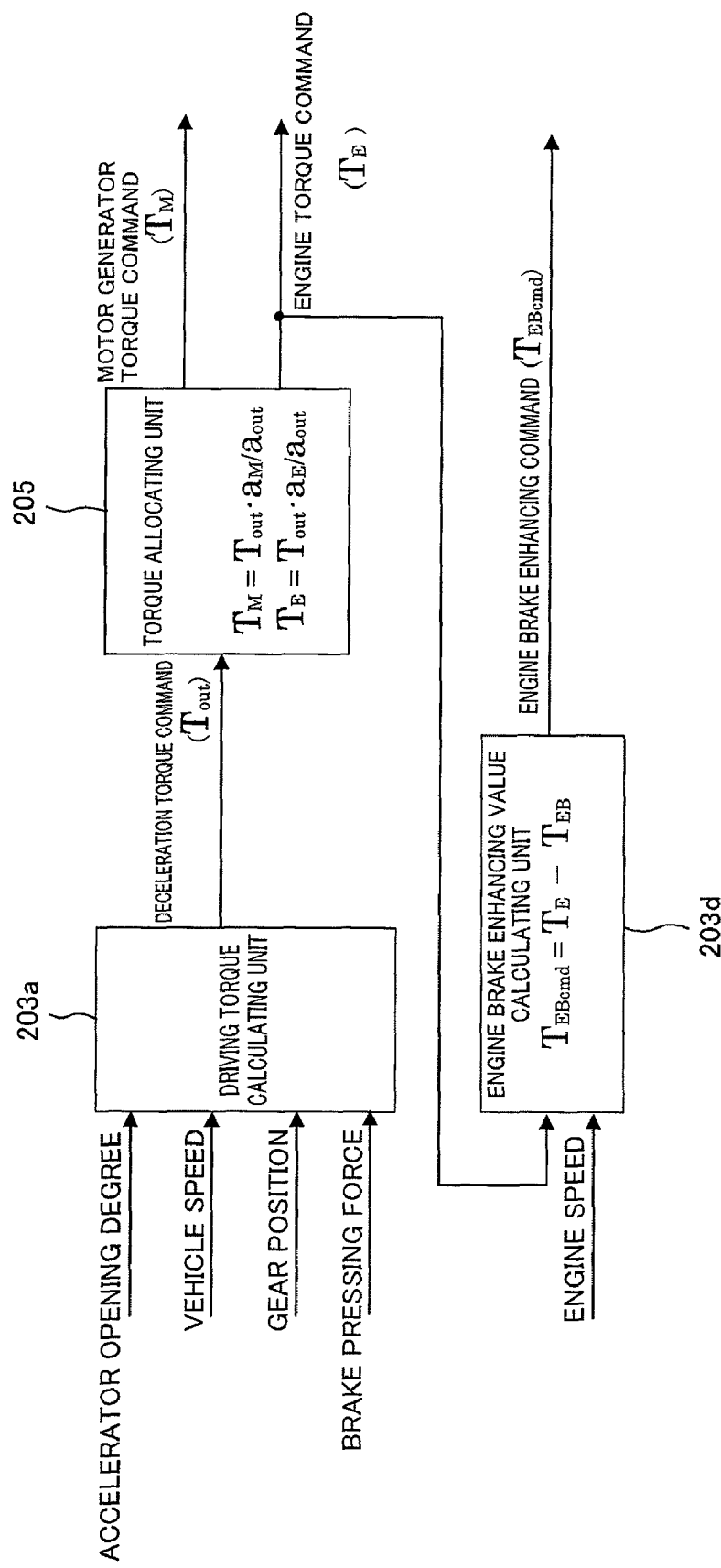
FIG. 49 is a view showing an example of a calculation process of an engine brake enhancing command which is executed by an engine brake enhancing value calculating unit.
Figure 50A:
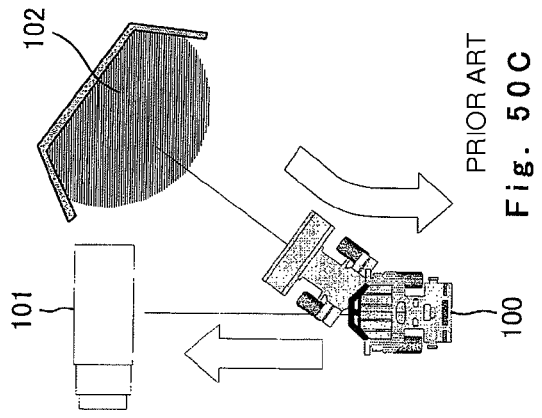
Figure 50C:
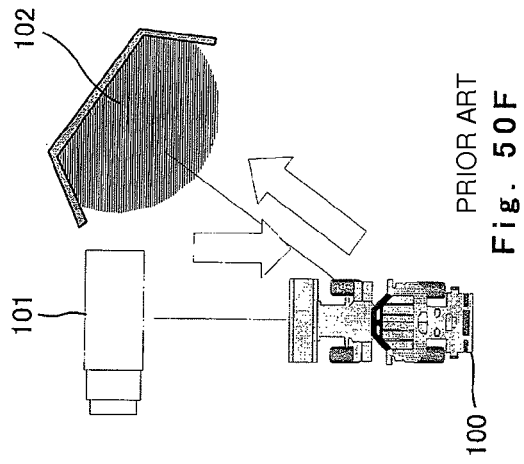
Figure 50B:
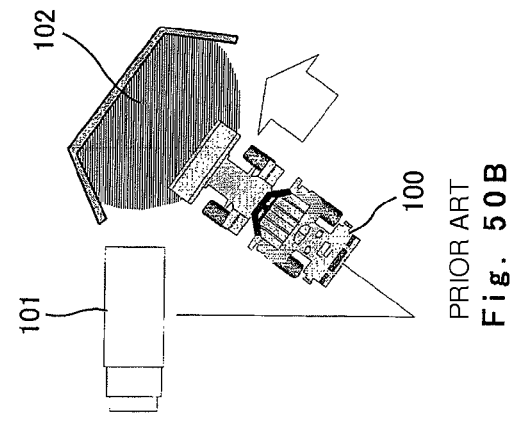
Figure 50E:
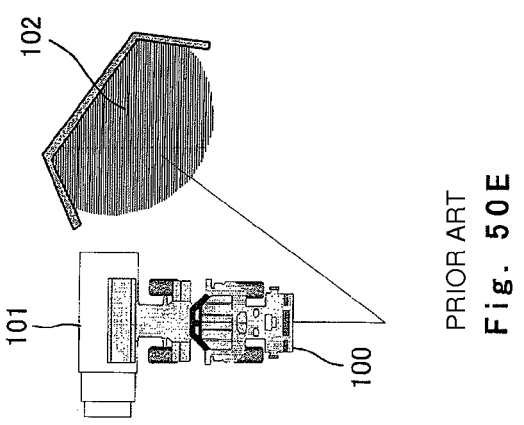
Figure 50A:
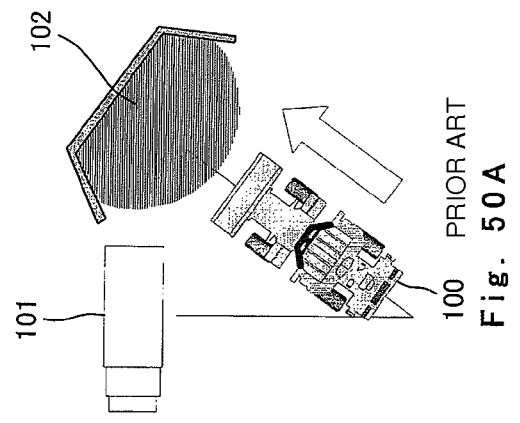
Figure 50D:
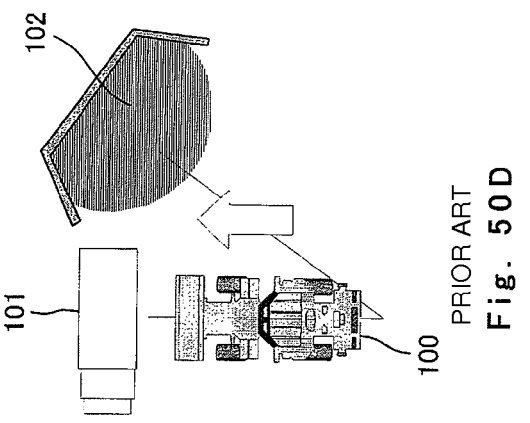

FIG. 49 is a view showing an example of the calculation process of the engine brake enhancing command which is executed by the engine brake enhancing value calculating unit 203d. Turning to FIG. 49, the driving torque calculating unit 203a calculates the torque required for driving, based on the accelerator opening degree, the vehicle speed, and the gear position, and outputs to the torque allocating unit 205 the calculated value indicating the driving torque command (Tout).

Receiving the driving torque command (Tout), the torque allocating unit 205 calculates T$_M$=Tout·a$_M$/aout and T$_E$=Tout·a$_E$/aout, and outputs the calculated value indicating the motor/generator torque command (T$_M$) and the engine torque command (T$_E$) to the generator 11 and the engine 10, respectively.

The engine brake enhancing value calculating unit 203d calculates an engine brake value (T$_{EB}$) from the engine speed of the engine 10 and subtracts the engine brake value (T$_{EB}$)

from the engine torque (T$_E$) output from the engine torque allocating unit 205 to obtain an engine brake enhancing value (T$_E$Bcmd). Thereby, the resistance of the engine 10 itself, i.e., the engine brake value (T$_E$B) and the resistance (T$_E$Bcmd) which is generated by the resistor controller 51 become a negative torque generated at the output shaft of the engine 10. As a result, a negative torque (T$_E$B−T$_E$Bcmd=T$_E$) can be generated at the output shaft of the engine 10.

In accordance with the present invention, to gain the engine braking as in the conventional vehicle during deceleration, a negative torque is imparted to the engine 10 and the generator 11. In this case, since the engine 10 is incapable of generating a negative torque actually, deceleration occurs within a range of the resistance of the engine (engine braking). To obtain a greater deceleration force when the construction machine 4 is driving down along the steep ground, performing switch back, etc, the resistor controller 51 causes the hydraulic pump 41 to serve as the resistor, to generate the negative torque at the output shaft of the engine 10. This makes it possible to recover the energy during the deceleration by the power generation of the generator 11 and to lessen a burden on the mechanical brake.

Other Embodiments

Having described so far the driving operation under the condition in which the direct-coupling clutch 15 is in an off-state, the operation of the generator 11 with the clutch 15 being in an on-state will be described below. The state in which the clutch 15 is in an on-state is the same as the state in which the generator 11 is coupled to the drive shaft. In the case of deceleration, the generator 11 generates electric power in the regenerative braking mode and the electricity is stored in the electricity accumulator 14. Also, the burden applied on the mechanical brake can be lessened. On the other hand, in the case of acceleration, the engine 10 is assisted by the power running of the generator 11 using extra electricity stored in the electricity accumulator 14.

By turning on the clutch 15 and setting the transmission 12 in a neutral position, the engine 10 is directly coupled to the generator 11. Since the generator 11 is capable of generating a power which is greater than that of a normal starter, the generator 11 can be used instead of the starter by directly coupling the engine 10 to the generator 11 in this way. In this case, the neutral position is shifted to the forward driving gear position in such a manner that the controller 2 outputs a command to the transmission 12 upon reception of a lever operation signal from the machine operator. In this case, the controller 2 may start the engine 10 using the generator 11 which serves as the starter before shifting to the forward driving gear position and thereafter output to the transmission 12 a command for shifting to the forward driving gear position.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A construction machine comprising:
    an electric motor/generator coupled to an electricity accumulator and configured to generate a torque;
    an engine configured to generate a torque;
    a transmission coupled to drive wheels and configured to shift between plural gear positions;
    an epicyclic gearing configured to couple an output shaft of the electric motor/generator, an output shaft of the engine, and an input shaft of the transmission, the torque generated by the electric motor/generator and/or the engine being transmitted to the drive wheels to enable the construction machine to drive;
    a clutch configured to directly couple two among the output shaft of the electric motor/generator, the output shaft of the engine, and the input shaft of the transmission; and
    a controller configured:
        to, under a condition in which the clutch is in an off-state, control engine speed of the engine based on the degree to which an accelerator is open and on the amount of electricity in the electricity accumulator,
        to control shifting of the transmission gear position based on the accelerator opening degree, an operational state of the electric motor/generator, and the amount of electricity in the electricity accumulator, and
        to determine the torque generated in the engine and the torque generated in the electric motor/generator, based on the accelerator opening degree, vehicle speed of the construction machine, and the transmission gear position.

2. The construction machine according to claim 1, wherein:
    the controller is configured to increase the engine speed of the engine when the amount of electricity in the electricity accumulator is small and the accelerator has been pressed down by a machine operator; and
    the controller is configured to decrease the engine speed of the engine when the amount of electricity in the electricity accumulator is large and the accelerator has been pressed down by the machine operator.

3. The construction machine according to claim 1, wherein:
    the controller is configured to upshift the transmission gear position when the accelerator has been pressed down by a machine operator, the electric motor/generator is in a power running mode, and the amount of electricity in the electricity accumulator is small; and
    the controller is configured to downshift the transmission gear position when the accelerator has been pressed down by the machine operator, the electric motor/generator is in a regenerative braking mode, and the amount of electricity in the electricity accumulator is large.

4. The construction machine according to claim 1, further comprising:
    a reverse rotation inhibiting unit configured to inhibit reverse rotation of the engine; wherein
    the controller is configured to stop the engine when it is determined that the electric motor/generator is in a regenerative braking mode and the amount of electricity in the electricity accumulator is excessive.

5. The construction machine according to claim 1, further comprising:
    a hydraulic pump directly coupled to the engine and configured to drive a loading device; wherein
    the controller is configured to determine the torque generated in the engine and the torque generated in the electric motor/generator, based on the accelerator opening degree, the vehicle speed of the construction machine, the transmission gear position, and torque required for operation of the hydraulic pump.

6. The construction machine according to claim 1, further comprising:
a hydraulic pump directly coupled to the engine; wherein the controller is configured to control an output amount and a relief pressure of the hydraulic pump to cause the engine to generate a negative torque when the construction machine is decelerated.

7. A method of controlling a construction machine that includes an electric motor/generator coupled to an electricity accumulator and configured to generate a torque, an engine configured to generate a torque, a transmission coupled to drive wheels and configured to shift between plural gear positions, an epicyclic gearing configured to couple an output shaft of the electric motor/generator, an output shaft of the engine, and an input shaft of the transmission, with the torque generated by the electric motor/generator and/or the engine being transmitted to the drive wheels to enable the construction machine to drive, and a clutch configured to directly couple two among the output shaft of the electric motor/generator, the output shaft of the engine, and the input shaft of the transmission, the method comprising:
controlling an engine speed of the engine based on the degree to which an accelerator is open and on the amount of electricity in the electricity accumulator, under a condition in which the clutch is in an off-state;
controlling shifting of the transmission gear position based on the accelerator opening degree, operational state of the electric motor/generator, and the amount of electricity in the electricity accumulator; and
determining the torque generated in the engine and the torque generated in the electric motor/generator based on the accelerator opening degree, vehicle speed of the construction machine, and the transmission gear position.

8. The method according to claim 7, wherein:
the step of controlling the engine speed of the engine includes increasing the engine speed when the electricity amount in the electricity accumulator is small and the accelerator has been pressed down by a machine operator; and
the step of controlling the engine speed of the engine includes decreasing the engine speed when the electricity amount in the electricity accumulator is large and the accelerator has been pressed down by the machine operator.

9. The method according to claim 7, wherein:
the step of controlling shifting of the transmission gear position includes upshifting of the gear position when the accelerator has been pressed down by a machine operator, the electric motor/generator is in a power running mode, and the electricity amount in the electricity accumulator is small; and
the step of controlling shifting of the gear position of the transmission includes downshifting of the gear position when the accelerator has been pressed down by the machine operator, the electric motor/generator is in a regenerative braking mode, and the electricity amount in the electricity accumulator is large.

10. The method according to claim 7, wherein:
the construction machine further comprises a hydraulic pump directly coupled to the engine and configured to drive a loading device; and
the step of determining the torque includes determining the torque generated in the engine and the torque generated in the electric motor/generator, based on the accelerator opening degree, the vehicle speed of the construction machine, the transmission gear position and torque required for operation of the hydraulic pump.

* * * * *